(12) United States Patent
Westphal

(10) Patent No.: US 10,062,414 B1
(45) Date of Patent: Aug. 28, 2018

(54) DETERMINING A FUTURE FIELD OF VIEW (FOV) FOR A PARTICULAR USER VIEWING A 360 DEGREE VIDEO STREAM IN A NETWORK

(71) Applicant: Futurewei Technologies, Inc., Plano, TX (US)

(72) Inventor: Cedric Westphal, San Francisco, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/682,939

(22) Filed: Aug. 22, 2017

(51) Int. Cl.
*H04N 9/80* (2006.01)
*G11B 27/031* (2006.01)
*H04N 21/234* (2011.01)
*H04N 21/81* (2011.01)
*G11B 27/10* (2006.01)
*H04N 21/258* (2011.01)
*H04N 21/8547* (2011.01)
*H04N 21/235* (2011.01)
*H04N 21/231* (2011.01)

(52) U.S. Cl.
CPC .......... *G11B 27/031* (2013.01); *G11B 27/10* (2013.01); *H04N 21/234* (2013.01); *H04N 21/2353* (2013.01); *H04N 21/23106* (2013.01); *H04N 21/23406* (2013.01); *H04N 21/25891* (2013.01); *H04N 21/816* (2013.01); *H04N 21/8547* (2013.01)

(58) Field of Classification Search
CPC ............. G11B 27/031; G11B 27/10;
H04N 21/23106; H04N 21/234; H04N 21/23406; H04N 21/2353; H04N 21/25891; H04N 21/816; H04N 21/8547; H04N 21/4755; H04N 21/4532; H04N 9/8205; H04N 21/435
USPC ................................ 386/262, 231, 241, 248
See application file for complete search history.

(56) References Cited

U.S. PATENT DOCUMENTS

| | | | |
|---|---|---|---|
| 9,723,223 B1* | 8/2017 | Banta | H04N 5/265 |
| 9,743,060 B1* | 8/2017 | Matias | H04N 9/87 |
| 2002/0030741 A1* | 3/2002 | Broemmelsiek | G01S 3/7864 |
| | | | 348/169 |
| 2003/0068098 A1* | 4/2003 | Rondinelli | G06T 3/0062 |
| | | | 382/276 |

(Continued)

*Primary Examiner* — Helen Shibru
(74) *Attorney, Agent, or Firm* — Vierra Magen Marcus LLP

(57) ABSTRACT

The disclosure relates to technology for providing determined future fields of view (FoVs) of a 360 degree video stream in a network having multiple video streams corresponding to multiple FoVs. FoV interest messages including requests for FoVs at time instants of the video stream are collected from viewers of the stream. A sequence of popular FoVs is created according to the messages, each representing a frequently requested FoV at a distinctive time instant. FoV transitions are created according to the FoV interest messages, each FoV transition including a current FoV a time instant and a next FoV of a next time instant, indicating a likely next FoV to be subsequent requested. Future FoVs of future time instants are determined for a user viewing the video stream with a history of requested FoVs of past time instants, based on the history of requested FoVs, the sequence and the transitions.

21 Claims, 20 Drawing Sheets

(56) References Cited

U.S. PATENT DOCUMENTS

| | | | |
|---|---|---|---|
| 2012/0105473 A1* | 5/2012 | Bar-Zeev | G02B 27/017 |
| | | | 345/633 |
| 2017/0026577 A1* | 1/2017 | You | G06F 3/167 |
| 2017/0295324 A1* | 10/2017 | Cabral | H04N 5/247 |
| 2018/0007489 A1* | 1/2018 | Lehtiniemi | H04S 7/303 |
| 2018/0063504 A1* | 3/2018 | Haines | H04N 13/004 |
| 2018/0077451 A1* | 3/2018 | Yip | H04N 21/44008 |
| 2018/0091221 A1* | 3/2018 | Bitra | H04B 10/116 |
| 2018/0098131 A1* | 4/2018 | Zhou | H04N 21/6373 |

* cited by examiner

DETERMINING A FUTURE FIELD OF VIEW (FOV) FOR A PARTICULAR USER VIEWING A 360 DEGREE VIDEO STREAM IN A NETWORK

FIELD

Embodiments described herein are related in general, to determining a future field of view (FoV) for a particular user viewing a 360 degree video stream in a network such as an information-centric network (ICN) and, more particularly, to determining the future FoV based on a history of requested FoVs.

BACKGROUND

In the traditional network TCP/IP (Transmission Control Protocol/Internet Protocol) model, the client requesting some content needs to first map the URL (Uniform Resource Locator) in the name of the content to a server. This server will mostly stay the same for the length of the session. The session is actually bound to this server, and the session's goal is to transfer the specific content held from this server. In such a host-centric networking paradigm, the core networking primitives revolve around naming hosts and network interfaces. Network devices can forward packets according to the destination addresses.

Recently, information-centric networking (ICN) has been proposed. Examples of ICN include, but are not limited to, Named Data Networking (NDN), Content Centric Networking (CCN), Content Oriented Networking (CON), Data Oriented Networking (DON), and Content Based Networking (CBN). Unlike traditional host-centric networking, information is directly named in an ICN. Thus, ICN allows a client device to focus on the data needed, as opposed to referencing a specific location from which the data may be retrieved.

A recent development in video streaming is 360 degree video streaming, where content consumers are able to select their own desired FoV in a streamed video, 360 degrees around nearly any selected axis. Given the large amount of data transfer involved in 360 degree video streaming, ICN has emerged as a promising candidate for supporting 360 degree video streams from producers, over the network, and to users. In such an instance, one problem may be how to reduce bandwidth consumed by the network when it is providing high resolution video streams to provide a better viewer experience to users watching the 360 degree video stream over the network.

BRIEF SUMMARY

According to one aspect of the present disclosure, there is provided a method that includes providing a 360 degree video stream in a network, the 360 degree video stream comprising multiple video streams corresponding to multiple FoVs, the method including collecting FoV interest messages from one or more users viewing the 360 degree video stream, each FoV interest message including a request for a FoV at one time instant of the 360 degree video stream, creating a sequence of popular FoVs along time instants of the 360 degree video stream according to the FoV interest messages, each popular FoV representing a frequently requested FoV at a distinctive one of the time instants, creating FoV transitions along the time instants according to the FoV interest messages, each FoV transition including a current FoV of one of the time instants and a next FoV of a next time instant next to the one time instant, the next FoV indicating a likely next FoV to be requested subsequent to the current FoV, determining future FoVs of future time instants for a particular user viewing the 360 degree video stream with a history of requested FoVs of past time instants, the future FoVs determined based on the history of requested FoVs, the sequence of popular FoVs and the FoV transitions, and caching video streams for the future FoVs of the future time instants, wherein the video streams for the future FoVs are cached prior to receiving requests for the future FoVs of the future time instants for the particular user viewing the 360 degree video stream.

According to one aspect of the present disclosure, there is provided a 360 degree video stream in an information-centric network (ICN) provider device, the 360 degree video stream comprising multiple video streams corresponding to multiple FoVs, the device including a memory storage comprising instructions, and one or more processors in communication with the memory, wherein the one or more processors execute the instructions to collect FoV interest messages from one or more users viewing the 360 degree video stream, each FoV interest message including a request for a FoV at one time instant of the 360 degree video stream, create a sequence of popular FoVs along time instants of the 360 degree video stream according to the FoV interest messages, each popular FoV representing a frequently requested FoV at a distinctive one of the time instants, create FoV transitions along the time instants according to the FoV interest messages, each FoV transition including a current FoV of one of the time instants and a next FoV of a next time instant next to the one time instant, the next FoV indicating a likely next FoV to be requested subsequent to the current FoV, determine future FoVs of future time instants for a particular user viewing the 360 degree video stream with a history of requested FoVs of past time instants, the future FoVs determined based on the history of requested FoVs, the sequence of popular FoVs and the FoV transitions, and cache video streams for the future FoVs of the future time instants, wherein the video streams for the future FoVs are cached prior to receiving requests for the future FoVs of the future time instants for the particular user viewing the 360 degree video stream.

According to one aspect of the present disclosure, there is provided a non-transitory computer-readable medium storing computer instructions for providing a 360 degree video stream in an information-centric network (ICN), the 360 degree video stream comprising multiple video streams corresponding to multiple FoVs, that when the instructions are executed by one or more processors, cause the one or more processors to perform the steps of collecting FoV interest messages from one or more users viewing the 360 degree video stream, each FoV interest message including a request for a FoV at one time instant of the 360 degree video stream, creating a sequence of popular FoVs along time instants of the 360 degree video stream according to the FoV interest messages, each popular FoV representing a frequently requested FoV at a distinctive one of the time instants, creating FoV transitions along the time instants according to the FoV interest messages, each FoV transition including a current FoV of one of the time instants and a next FoV of a next time instant next to the one time instant, the next FoV indicating a likely next FoV to be requested subsequent to the current FoV, determining future FoVs of future time instants for a particular user viewing the 360 degree video stream with a history of requested FoVs of past time instants, the future FoVs determined based on the history of requested FoVs, the sequence of popular FoVs and the FoV transitions, and caching video streams for the future FoVs of the future time instants, wherein the video streams for the future FoVs are cached prior to receiving requests for the future FoVs of the future time instants for the particular user viewing the 360 degree video stream.

Optionally, in any of the preceding aspects, another implementation of the aspect provides that the method further includes prefetching the video streams for the future FoVs of future time instants at a client device where the particular user is viewing the 360 degree video stream, wherein the video streams for the future FoVs are prefetched prior to the future time instants for the particular user viewing the 360 degree video stream.

Optionally, in any of the preceding aspects, another implementation of the aspect provides that the method further includes, prior to caching, storing the sequence of popular FoVs along time instants and the FoV transitions along the time instants in a memory, and querying the sequence of popular FoVs along time instants and the FoV transitions along the time instants stored in the memory to identify the determined future FoVs of future time instants for a particular user.

Optionally, in any of the preceding aspects, another implementation of the aspect provides that the collecting, the creating the sequence of popular FoVs along time instants, the creating the FoV transitions along the time instants, and the caching are performed at one of an edge router of the ICN through which the 360 degree video stream is being transmitted or a server of the ICN that is providing the 360 degree video stream to the ICN, and the method further comprising, receiving the history of requested FoVs, and in response to the receiving the history of requested FoVs, transmitting reply data messaged that include the cached video streams for the future FoVs of the future time instants.

Optionally, in any of the preceding aspects, another implementation of the aspect provides that the creating the sequence of popular FoVs along time instants includes determining a probability for each of the popular FoVs along time instants according to the FoV interest messages, and the creating FoV transitions along the time instants includes determining probabilities of each of the FoV transitions along the time instants according to the FoV interest messages.

Optionally, in any of the preceding aspects, another implementation of the aspect provides that the caching comprises performing the caching at one of a client device where the particular user is viewing the 360 degree video stream, or at an edge router of the ICN through which the 360 degree video stream is transmitted.

Optionally, in any of the preceding aspects, another implementation of the aspect provides that the caching comprises delivering a manifest to the client device at a start of transmission or periodically during transmission of the 360 degree video stream to the client, the manifest including, a name for and a probability for each of the popular FoVs along time instants, and a name for and a probability for each of the FoV transitions along the time instants.

Optionally, in any of the preceding aspects, another implementation of the aspect provides that the manifest includes one of (1) a coordinate center and resolution of each of the popular FoVs along time instants and each of the FoV transitions along the time instants, or (2) data rate variations for the video streams for the determined future FoVs of the future time instants.

Optionally, in any of the preceding aspects, another implementation of the aspect provides that the method further includes receiving the history of requested FoVs, and in response to the receiving the history of requested FoVs, transmitting reply data messages that include the cached video streams for the future FoVs of the future time instants, and wherein the caching comprises delivering meta-data to the client with the video streams for the future FoVs of the future time instants, the meta-data including a name for and a probability for each of the FoV transitions along the time instants.

Optionally, in any of the preceding aspects, another implementation of the aspect provides that the meta-data includes one of (1) a coordinate center and resolution of each of the FoV transitions along the time instants, or (2) data rate variations for the video streams for the determined future FoVs of the future time instants.

Optionally, in any of the preceding aspects, another implementation of the aspect provides that each FoV interest message includes a coordinate center of the requested FoV, the creating FoV transitions includes calculating a motion between coordinate centers of each of the current FoV of one of the time instants and each of the next FoV of the next time instant, the determining includes determining the future FoVs by adding one of additional width to the FoVs of the history of requested FoVs based on the calculated motion, or additional height to the FoVs of the history of requested FoVs based on the calculated motion.

Optionally, in any of the preceding aspects, another implementation of the aspect provides that the 360 degree video stream is a live streaming 360 degree video stream transmitted over the information-centric network, and each time instant occurs at one of a periodic period T of time over time or a ICN round trip time (RTT) between when a FoV interest message is sent by the subsequent user and when the subsequent user receives a response data message to the FoV interest message sent by the subsequent user.

Optionally, in any of the preceding aspects, another implementation of the aspect provides that the 360 degree video stream is of a live event being attended by the one or more users and the particular user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

Figure 1A:
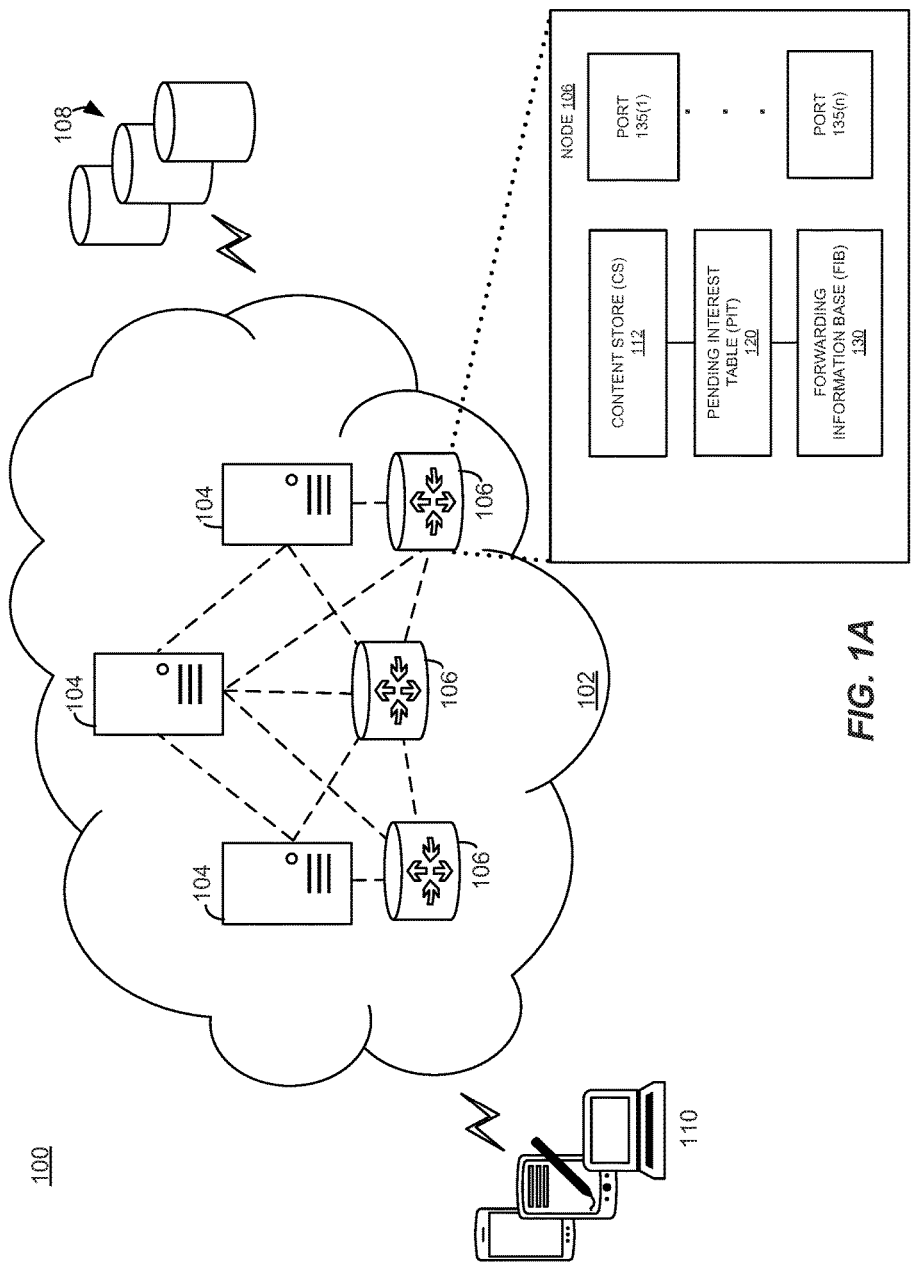
FIG. 1A illustrates a network environment an information centric network, according to example embodiments.

It may be beneficial to reduce the bandwidth of a computer network that is consumed by streaming 360 degree videos from a content provider such as a servere to a user device. Embodiments described herein can reduce such bandwidth by prefetching determined future FoVs or caching video streams for the determined future FoVs of future time instants for a particular user viewing the 360 degree video. For example, a determined future FoV of the 360 degree video may be a FoV that is determined to be what a particular user viewing the 360 degree video stream will request at a future time instant based on a history of requested FoVs of past time instants by that user, a sequence of popular FoVs requested by prior users who watched that video, and FoV transitions requested by prior users who watched that video.

This prefetching or caching may occur at an edge router, network manager or user device for a 360 degree video stream in the network. In more detail, embodiments described herein reduce such bandwidth by determining future FoVs (e.g., at a content provider/store, edge router, manager, or user device) of future time instants for a particular user viewing the 360 degree video stream; and prefetching or caching the determined future FoVs (e.g., at edge router, manager, or user device). In some embodiments, such determining future FoVs of the video stream may be described as "determining a future field of view (FoV) for a particular user viewing a 360 degree video stream in an information-centric network (ICN)" and is now discussed. It is also considered that the descriptions herein may apply to computer networks other than ICNs.

360 degree videos, also known as 360 videos, immersive videos, or spherical videos, may be video recordings of a real-world panorama, where the view in every direction is recorded at the same time, shot using an omnidirectional camera or a collection of cameras, and filming overlapping angles simultaneously. The quality of these videos can be low unless they are bumped up to super high resolution such as 4K video having a horizontal resolution in the order of 4,000 pixels (e.g., see the Digital Cinema Initiatives (DCI) 4K standard), super high definition video, or 8K video having a horizontal resolution in the order of 8,000 pixels. In some cases, streaming 360 degree videos take up to 6 times as much bandwidth as a traditional video.

Once created, 360-degree videos (e.g., streams) may be viewed, such as via personal computers, mobile devices such as smartphones, or dedicated head-mounted displays (e.g., a headset). During viewing, the FoV may be changed by the behavior of a user viewing the 360 degree video, such as by movement by the user during viewing. For example, when viewed on PCs, a mouse may be used to pan around the video by clicking and dragging. On smartphones, internal sensors such as the gyroscope may be used to pan the video based on the orientation of the device. Dedicated head-mounted displays may use internal sensor and dedicated screens of their own. 360-degree videos may be described as a form of virtual reality (VR).

Embodiments described herein are directed to determining, caching and/or prefetching a future FoV immediately following a current FoV being viewed by a particular user. Some embodiments described herein determine future FoVs of a particular user based on a history of requested FoVs of that user, a sequence of popular FoVs of other prior viewers of the video, FoV transitions from a current to a next FoV by other prior viewers of the video, and/or adding height and width to a currently requested FoV of that user based on movement of center coordinates of prior FoVs requested by that user when watching the video.

By predicting a future FoV from a current FoV, the present technology can reduce bandwidth consumed by a network that is providing high resolution 360 degree video streams to users, and increase resolution of the streams. This can provide a smooth video experience for the user without a large increase in network bandwidth that would be required to prefetch or send on the network all the possible FoVs following the currently viewed FoV. In some instances, determining, caching and/or prefetching a future FoV immediately following a current FoV for a particular user may be part of or described as a computer implemented process for providing a 360 degree video stream in an information centric network (ICN) where the 360 degree video stream includes multiple video streams corresponding to multiple FoVs.

FIG. 1A illustrates a network environment 100 to provide content as requested by different users in an ICN. Herein, the term "ICN" can refer to either an information centric network or information centric networking, depending on the context. The ICN 102 may be, but is not limited to, a Named Data Network (NDN), Content Centric Network (CCN), Content Oriented Network (CON), Data Oriented Network (DON), or Content Based Network (CBN). The network environment 100 may include the ICN 102 having controllers, such as ICN managers 104. The ICN managers 104 may be, for example, a network entity that may have control over a set of network resources in a data plane. In one embodiment, the ICN managers 104 maintain a synchronized record of content hosted by different network entities in the ICN 102. For example, the ICN functionalities may include ICN name resolution, routing, and management. The ICN managers 104 may be deployed in a distributed or in a centralized or in a hybrid manner depending upon the Internet Service Providers (ISPs).

ICN 102 may also include routers (or nodes) 106, which may include storage to cache content as it propagates through the ICN 102. The routers 106 may also be communicatively coupled with the ICN managers 104 and may be configured to process requests received from users for accessing the content via user devices 110, such as a mobile device or computer. In one embodiment, the ICN is compliant with a NDN protocol.

In some instances, ICN 102 can be used to stream 360 degree video from "producers", over the network using routers 106 (and optionally managers 104), and to users or viewers of the video at devices 110. The producer may be a content provider, a content store (e.g., data stores 108 as noted below), a server, or a data origin server that provides 360 degree video content. In some cases, ICN 102 can be used for prefetching or caching video streams that are determined to be future FoVs of the 360 degree video as explained below.

The routers 106 may collaborate for caching content with one or more other routers 106 in the network, such as an ICN, which may be configured as follows. A router 106 may comprise at least three main data structures: the Forwarding Information Base (FIB) 130 that may associate the content names (e.g., streaming 360 degree video content) to the forwarding face(s) towards the producer(s), the Pending Interest Table (PIT) 120 that may record the incoming faces where the interests came from and have not replied by producer, and the Content Store (CS) 112 that may cache content from a producer when it is forwarded to the requesters. It may also include input/output (I/O) ports 135(1) to 135(n). The interest may be a desired FoV of a streaming 360 degree video that is requested in a FoV interest message. The I/O ports are configured to receive and transmit data from/to other nodes.

The CS 112 may be used (e.g., in non-transitory memory storage) to cache (for relatively short time) or store (for relatively longer time) content data. Content data may include streamed 360 degree video content, and data used for prefetching or caching video streams for determined future FoVs of the 360 degree video. The CS 112 may also receive and associate interests with corresponding requested content data. These interests may be user requests for content, such as streaming 360 degree video FoV interest messages; and data used for prefetching determined future FoVs or caching video streams for those FoVs of the 360 degree video.

In embodiments, PIT 120 may be any data structure used to record and keep track of the received interests (requests for content, such as streaming 360 degree video FoV interest messages) that are being served or pending (until the corresponding requested content data is received). Thus, the PIT may be used to route data packets back to the requester.

The FIB 130 may be any data structure (e.g., a table, list, or database) used to associate content data (e.g., streaming 360 degree video content) with corresponding ports (for next hops) on which the interests (such as streaming 360 degree video FoV interest messages) and content data are received and forwarded. The FIB 130 entries may indicate the next hops on which content (interests) may be forwarded.

The network environment 100 may further include data stores 108, which may store the content (e.g., streaming 360 degree video content; and data used for prefetching or caching (e.g., video streams for) determined future FoVs of the 360 degree video) or collections of content, such as files, images, videos (e.g., streaming 360 degree videos; and data used for prefetching or caching (e.g., video streams for) determined future FoVs of the 360 degree video), and the like. Accordingly, the managers 104 and the routers 106 may communicate with the data stores 108 to provide (e.g., be a "producer" of) the streaming 360 degree video content to different users. In some instances, stores 108 may be computer servers capable of providing streaming 360 degree video content; and providing data used for prefetching determined future FoVs or caching video streams of determined future FoVs of the 360 degree video.

Additionally, the network environment 100 may include one or more user devices 110 for viewing streamed video, including for example and without limitation, desktop computers, hand-held devices, laptops or other portable computers, network computers, mobile phones, landline phones, and the like. In some instances, devices 110 may be described as computer clients capable of receiving and displaying streamed video and other content to a user. In some instances, devices 110 may be capable of receiving data used for prefetching determined future FoVs or caching video streams of determined future FoVs of the 360 degree video. In some instances, the devices 110 may send FoV interest messages and receive FoV data messages in response to those interest messages. Examples of a device 110 include a mobile wireless communication device, wireless transmit/receive unit (WTRU), mobile station, fixed or mobile subscriber unit, pager, cellular telephone, personal digital assistant (PDA), smartphone, laptop, computer, touchpad, or consumer electronics device.

The ICN 102 may be compliant with an evolved packet core (EPC). However, the ICN 102 is not required to be EPC compliant. In one embodiment, the ICN 102 includes a Serving Gateway (Serving GW), a Packet Data Network Gateway (PDN GW), a Mobility Management Entity (MME) and a Home Subscriber Server (HSS). However, it is not required to include these elements in the ICN 102.

Figure 1B:
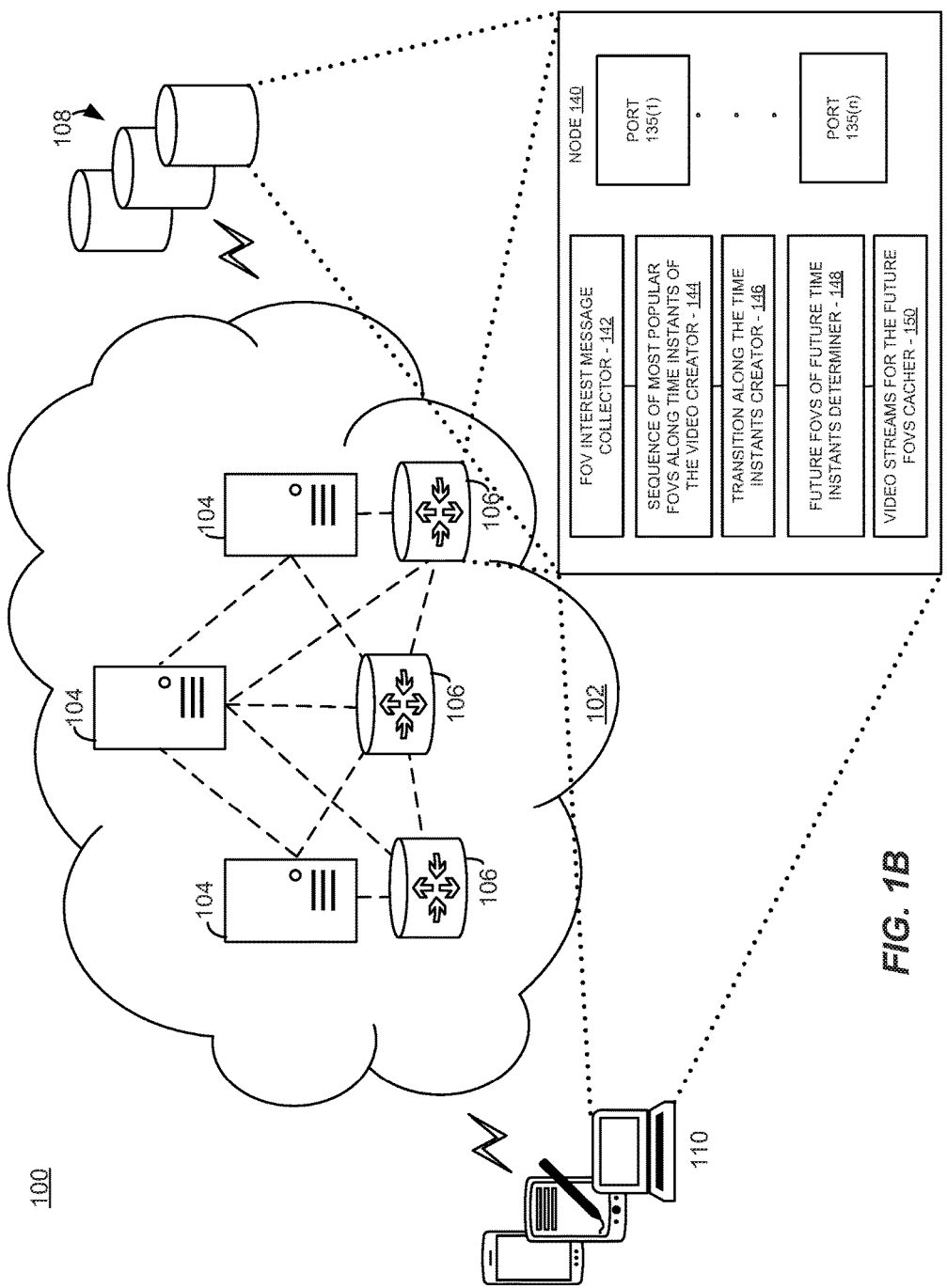
FIG. 1B illustrates a network environment an information centric network with structures related to streaming 360 degree video content, according to example embodiments.

FIG. 1B illustrates a network environment 100 with structures related to providing streaming 360 degree video content as requested by different users in an information centric network (ICN). FIG. 1B includes many of the same network devices as FIG. 1A but also may have one or more of node 140 with the structures shown. In some instances, node 140 may be any of an edge router of routers 106, a manager 104, a data store 108 or a user device 110 which are part of network 102.

The node 140 may be capable of prefetching or caching data such as video streams for determined future FoVs for a 360 degree video stream in network 102. In some instances, node 140 may be a node used to stream 360 degree video from producers 108, over the network 102, and to users of devices 110, while reducing bandwidth consumed by network 102 due to performing the prefetching or caching. This provides higher resolution video streams (creating a better viewer experience) for users who are watching a 360 degree video over the network at devices 110.

In some embodiments, node 140 may comprise at least four main data structures related to prefetching or caching video streams for determined future FoVs for a 360 degree video stream. This video stream may be a 360 degree video stream that has multiple video streams (e.g., substreams of the video, each substream including one of multiple FoVs) corresponding to multiple FoVs. First, node 140 may comprise collector 142 that collects FoV interest messages from one or more users viewing the 360 degree video stream, each FoV interest message including a request for a FoV at one time instant of the 360 degree video stream. Second, node 140 may include creator 144 that creates a sequence of most popular FoVs along time instants of the 360 degree video stream according to the FoV interest messages collected. Here, each popular FoV may represent a frequently requested FoV at a distinctive one of the time instants of the video. Third, node 140 may comprise creator 146 that may create FoV transitions along the time instants according to the FoV interest messages. Here, each FoV transition may include a current FoV of one of the time instants and a FoV of a next successive time instant, the next FoV indicating a likely next FoV to be requested immediately after the current FoV. Fourth, node 140 may have future FoVs determiner 148 that determines future FoVs of future time instants for a particular user viewing the 360 degree video stream with a history of requested FoVs of past time instants. Here, the future FoVs may be determined based on the history of requested FoVs, the sequence of popular FoVs (e.g., created by creator 144) and the FoV transitions (e.g., created by creator 146). Fifth, node 140 may have video streams for future FoVs cacher 150, that may cache or cause to be cached (e.g., at an edge router through which the video is being transmitted or streamed; or at a client at which the video is being displayed or viewed) video streams for the future FoVs of the future time instants. Here, the video streams for the future FoVs may be cached prior to receiving requests for the future FoVs of the future time instants for the particular user viewing the 360 degree video stream.

Node 140 may also include input/output (I/O) ports 135(1) to 135(n). The I/O ports are configured to receive and transmit data from/to other nodes, such as other ones of nodes 140.

Although FIGS. 1A-B illustrate one example of a communication system, various changes may be made to FIGS. 1A-B. For example, the network environment 100 could include any number of devices 110, nodes 106, managers 104, data stores 108, or other components in any suitable configuration.

The functional components (e.g., collector 142, creator 144, creator 146, determiner 148 and cacher 150) may be referred to as processors, modules or components, and may each be executed on a single processor or separate processors. In some embodiments, they could be implemented with any combination of hardware and/or software. They may further include one or more elements for performing any one or combination of processes described in the embodiments.

As discussed above, it may be beneficial to reduce the bandwidth of network 102 consumed by streaming 360 degree videos to a user at device 110 by prefetching or caching (e.g., video streams for) determined future FoVs of future time instants for a particular user viewing the 360 degree video. Embodiments described herein reduce such bandwidth by determining future FoVs of future time instants for a particular user viewing the 360 degree video stream; and prefetching or caching the determined future FoVs. In some embodiments, such determining future FoVs of the video stream may be described as "a method to predict the next FoV for 360 video for network prefetching and live streaming" and is now discussed.

360 degree videos, also known as 360 videos, immersive videos, or spherical videos, may be video recordings of a real-world panorama, where the view in every direction is recorded at the same time using one or more cameras. The quality of these videos can be low unless you they are bumped up to super high resolution and streaming 360 degree videos take up to 6 times as much bandwidth as a traditional video.

Once created, 360-degree videos (e.g., streams) may be viewed, such as via personal computers, mobile devices such as smartphones, or dedicated head-mounted displays (e.g., a headset). During viewing, the FoV may be changed by the behavior of a user viewing the 360 degree video, such as by clicking and dragging with a mouse, changing orientation of a smartphone, or changing orientation of a dedicated head-mounted displays.

During playback the viewer or user has control of the viewing direction or FoV. In some such video, a FoV may be identified or described by a vector in spherical coordinates pointing from the origin (0,0,0) in the direction of center of the FoV at center $(\alpha,\beta)$. In some cases, this FoV may be a front tile or front FoV of multiple FoVs that can be decomposed into tiles corresponding to areas around the front tile or front FoV (e.g., see FIG. 3).

Figure 2:
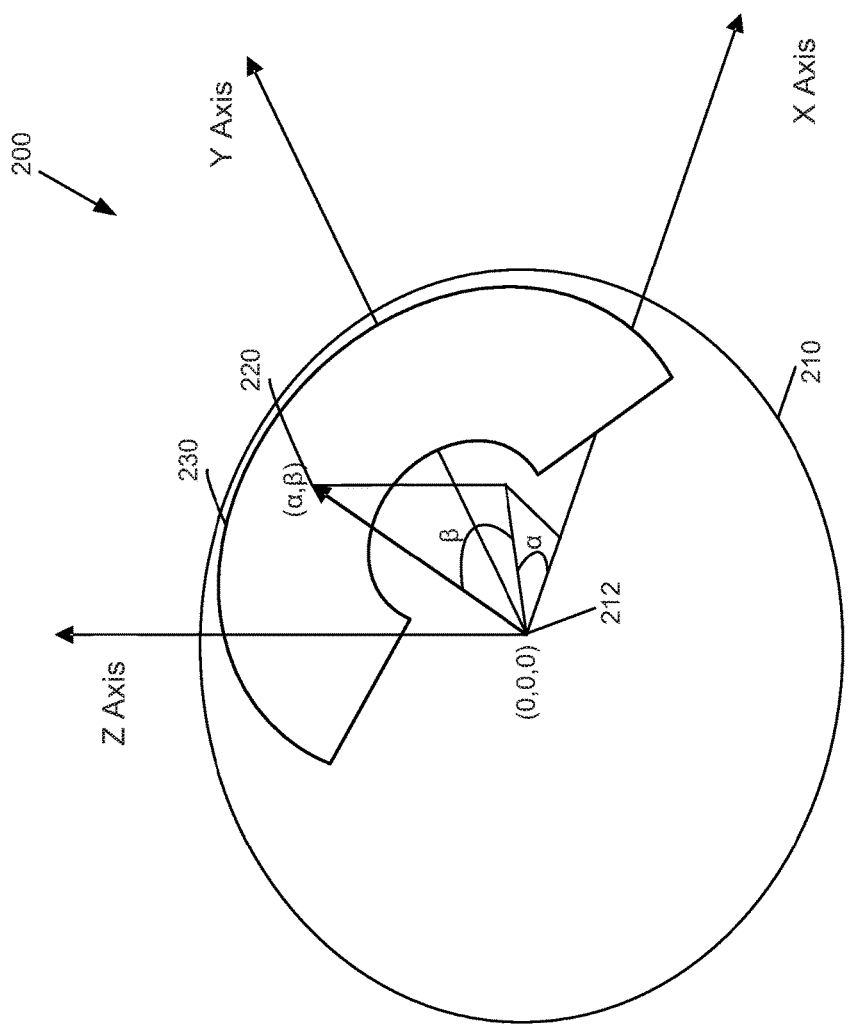
FIG. 2 illustrates an example 360 degree video stream field of view (FoV) having a center defined in spherical coordinates, according to example embodiments.

FIG. 2 illustrates an example 200 of a 360 degree video stream FoV (e.g., front tile) having a center defined in spherical coordinates, according to example embodiments. The spherical coordinates of example 200 are shown with X Axis, Y Axis and Z Axis for easy reference, although as explained below, spherical coordinates are not in, but can be mapped into, the X,Y,Z coordinate space. This 360 degree video stream may be streamed in network environment 100 of FIGS. 1A-B, such as on network 102 from stores 108 through nodes 106 and/or managers 104 to user devices 110. FIG. 2 shows 360 degree video stream with multiple FoVs 210 and specific FoV 230 having a center 220 at $(\alpha,\beta)$ defined in spherical coordinates of example 200. FoV 230 may represent a "next", "current", "determined future" or "future" FoV as described herein. FIG. 2 shows FoV 230 having center 220. In some instances, FoV 230 may be identified or described by the vector in spherical coordinates pointing from the origin (0,0,0) to the center of the FoV at $(\alpha,\beta,r)$. Here, since we are concerned with the direction vector is pointing to in spherical coordinates, the radial distance r is not required. In one case, r can be presumed to be 0, or 1 as the radius of the sphere that we consider to have FoVs 210. It can be appreciated that other coordinate systems, such as Cartesian coordinates or polar coordinates may be used instead of spherical coordinates to define or identify the FoV.

In some embodiments, the video stream of FIG. 2 may be a 360 degree video stream in a computer network. In some cases, the stream may be a 360 degree video stream in an ICN, where the stream includes multiple video streams (e.g., subsets of the stream) corresponding to multiple FoVs. In some cases, the video stream extends over a number of time instants, each instant having a corresponding FoV 230 that is displayed to the user (e.g., at front tile 310 of FIG. 3). In some cases, the stream may be described as a 360 degree video stream extending over a time period and comprising a time ordered sequence of multiple FoVs, such as FoVs 210, each of the multiple FoVs occurring at a time instant, such as an instant as shown by FIG. 2. Multiple FoVs 210 may be all possible FoVs at such a time instant for the video stream, and thus be the entire 360 degree view for that instant. FoVs 210 may extend between −180 degrees and +180 degrees horizontally; and between −90 degrees and +90 degrees vertically from the origin. However, it is noted that a FoV may have various shapes and cover various amounts of area of the sphere or FoVs 210. For example, FoV 230 may be rectangular shaped and cover various other horizontal and vertical angles from the center coordinate.

In some cases, based on the user's behavior, FoV 230 may point in one particular direction (e.g., at FoV center 220) and the rest of FoVs 210 may complete the 360 degree view around the user (e.g., at coordinate center 212) for that time instant of the video.

Figure 3:
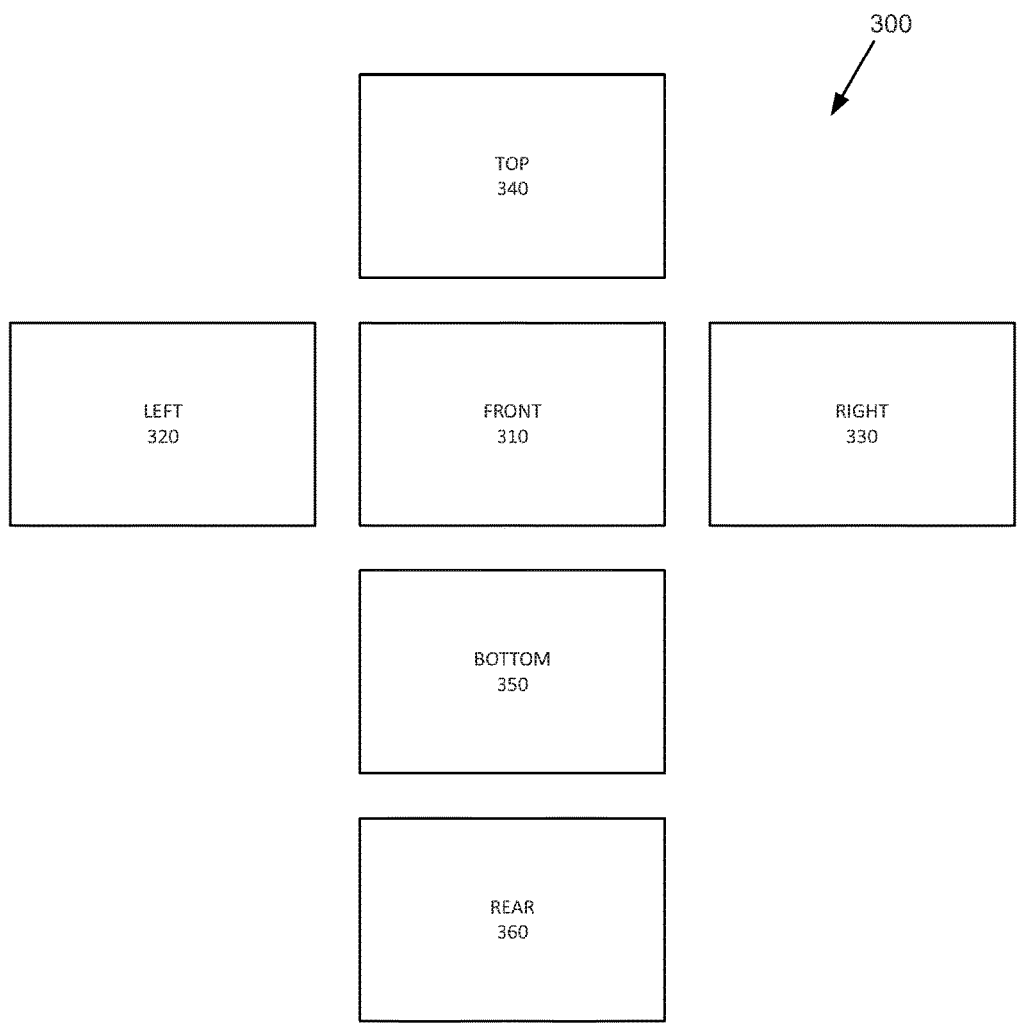
FIG. 3 illustrates an example of multiple FoVs at a time instant of the 360 degree video stream of FIG. 2, according to example embodiments.

FIG. 3 illustrates an example 300 of multiple FoVs at a time instant of the 360 degree video stream of FIG. 2 decomposed into 6 tiles corresponding to areas around the center $(\alpha,\beta)$ 220 defined in spherical coordinates, according to example embodiments. In one instance, the FoV center a coordinate defines left right coordinate along the plane of the X and Y axes directions, rotating around the vertical Z Axis; while the FoV center 13 coordinate defines an up down coordinate in the direction of the plus and minus Z Axis. In this example, spherical coordinates $(r, \alpha, \beta)$ are used, where the $\alpha$ coordinate defines polar angle $\theta$, and the $\beta$ coordinate defines azimuthal angle $\varphi$. Radial distance r may not be defined since a FoV may be described by pointing from the origin 212 in the direction of center of the FoV at center $(\alpha,\beta)$ 220 for which radial distance r is not relevant.

The 6 tiles are shown as front tile 310 (e.g., in front of the viewer's eyes), left tile 320 (e.g., to the left), right tile 330 (e.g., to the right), top tile 340 (e.g., above), bottom tile 350 (e.g., below) and rear tile 360 (e.g., behind) corresponding to areas around the center $(\alpha,\beta)$ 220. Front tile 310 may correspond to the front FoV 230 around the center $(\alpha,\beta)$ 220. Left tile 320 may correspond to the left FoV or area that is immediately left of and not overlapping with FoV 230, around the center $(\alpha,\beta)$ 220. Right tile 330 may correspond to the right FoV or area that is immediately right of and not overlapping with FoV 230, around the center $(\alpha,\beta)$ 220. Top tile 340 may correspond to the top FoV or area that is immediately above and not overlapping with FoV 230, around the center $(\alpha,\beta)$ 220. Bottom tile 350 may correspond to the bottom FoV or area that is immediately below and not overlapping with FoV 230, around the center $(\alpha,\beta)$ 220. Rear tile 360 may correspond to the rear FoV or area that is not immediately adjacent to but is opposite FoV 230, around the center $(\alpha,\beta)$ 220. It can be appreciated that although this example is with respect to 6 tiles, there may be more or fewer tiles (e.g., 360 tiles), depending on a size or granularity of the tiles. In some cases, there may be 30 tiles, 60 tiles, 360 tiles or more than 360 tiles.

As discussed above, a FoV interest message may request a FoV by requesting tiles that compose (e.g., display) the FoV requested (e.g., or FoV 230 or front FoV 310). In other instances a FoV interest message may request a FoV by individually requesting each of tiles that compose the multiple FoVs (e.g., FoVs 210 or all tiles of example 300) for the requested front FoV (e.g., or FoV 230 or front FoV 310). In some instances a FoV interest message may request a FoV by requesting once, under a common name, the group of tiles that compose the multiple FoVs (e.g., FoVs 210 or all tiles of example 300) for the requested front FoV (e.g., or FoV 230 or front FoV 310). In some instances, such a FoV interest message may request FoV as:

"name: video/time1/FoValpha-beta/Xangle180/Yangle90/ResolutionHigh/"

In one example, using FoV 230 as the requested FoV, "name" may be a name of FoV 230, "video" may be a name of the video stream, "time1" may be a time instant, "FoValpha-beta" may be the coordinates of center 220, "Xangle180" may describe the range of the FoV 230 in the X direction from the center coordinates, "Yangle90" may describe the range of the FoV 230 in the Y direction from the center coordinates, and "ResolutionHigh" may describe that a high resolution is requested for that FoV.

A 360 degree video stream may give the user the opportunity to select the FoV to display at a time instant during the 360 degree video. In some instances, the time instant may be an instant where a 360 degree view or multiple possible FoVs for that time instant exist and the time period in which the video exists may be an amount of time between when the first 360 degree view exists and when the last 360 degree view exists of the video.

For instance, depending on the user's behavior, a user device 110 may select a different FoV, such as a "next" FoV of a time instant immediately following the "current" FoV of one of the time instants of the video. Such user behavior may include selecting a different FoV during the video using a keyboard, mouse or other device such as a headset with a display being worn by the user. For a headset, such user behavior may be a user moving his or her head to change the FoV. However, if the network does not have enough available bandwidth, it will not be able to provide a smooth high resolution 360 degree video stream experience for the user (e.g., avoiding any low resolution, blank for frozen views in the video).

As previously discussed, during streaming of a 360 degree video stream over a network (e.g., an ICN) higher resolution or smoother video can be accomplished by prefetching or caching determined future FoVs of future time instants for a particular user. However, when the network transmits, prefetches or caches for all the possible future FoVs after a FoV being currently viewed by a user, there may be up to a 6× increase in bandwidth consumed in the network (in embodiments including for example 6 tiles of FIG. 3) as compared to transmitting, prefetching or caching the actual future FoV the user will select after the one currently viewed. In some instances, to reduce such increase in bandwidth, network 102 can determine and transmit determined future FoVs that include some or all of future FoVs of future time instants for a particular user (and the least amount of FoV data buffer around the desired future FoV) instead of all 6 views. In addition or independently, in some instances, to reduce such increase in bandwidth, network 102 can adapt the resolution of the 6 views or tiles so that the ones for determined future FoVs have a higher resolution and the others have a lower resolution (since they are less likely to be the desired future FoV).

For example, to obtain FoV 230 at a user device, the device may send a FoV interest message through the network to a producer or streamer of the video, which will reply with a FoV data message providing the FoV image data (e.g., for FoV 230 or tile 310). This data message may also provide the other views or tiles to complete the 360 degree view for that time instant of the video (e.g., multiple FoVs 210 or all tiles of example 300).

In some cases, the FoV data of the requested FoV (e.g., for FoV 230 or tile 310) will be sent with a higher resolution than the other views or tiles around the FoV that complete the 360 degree view. In some instances, prior to receiving a FoV interest message requesting a FoV for a time instant of the video stream, a producer or streamer of the video may send the user device lower resolution data message having of all the views or tiles to complete the 360 degree view for that time instant (e.g., multiple FoVs 210 or all tiles of example 300). This may provide the user with a low resolution view (e.g., background view) which can be improved upon, such as by adding resolution or pixels in the direction of the FoV that will be requested by the user device based on the user's behavior. In some cases, this low resolution data message may be prefetched or cached, such as by a function or process similar to that used for prefetching or caching a determined future FoV as described herein (e.g., see FIGS. 6-8 and 11-12).

In some instances, once the FoV interest message is received, the producer may subsequently send another data message with higher resolution FoV data of the FoV requested. It can be appreciated that determining a future FoV as described herein, allows the user device the ability to obtain ahead of time, a high resolution version of the FoV that will be requested by the user device based on the user's behavior. The FoV that is to be requested (e.g., the future FoV) may be determined and prefetched or cached as a determined future FoV, such as described herein (e.g., see FIGS. 5-17).

More particularly, to reduce such increases in bandwidth, embodiments described herein are able to accurately determine future FoVs of future time instants for a particular user viewing 360 degree video stream in a network. Such determining may use historical data of where the user looked from a current FoV. In some cases, performing such determining may include clustering the FoV (e.g., trajectories) collected from multiple users who watched (or are currently watching) the same video as historical data. In some instances, such determining future FoVs may include presuming that a subsequent particular user viewing the video after collection of the historical data for a time instant of the video, will have similar user behavior with respect to what the future FoV will be from a current FoV being viewed. Based on such determining, it may be possible to prefetch or cache (e.g., cache video streams for) a determined future FoV that overlaps or partially overlaps a future FoV the user will actual request after a current FoV, based on the clustered FoVs collected from the multiple users.

Such determining future FoVs allows the network (e.g., a node in the network such as node 104) to provide prefetching or caching of the user's future requested FoV (e.g., what will be the next FoV after the current FoV based on the user's behavior). This, prefetching of the correct future FoV can provide a smooth video experience for the user without a large (e.g., 6× in size) increase in network bandwidth that would be required to prefetch all the possible FoV following the currently viewed FoV since the data (e.g., high resolution pixels) in the future FoV that follows the current FoV is already prefetched at the client. Thus, when the client determines from the user's motion that it is about to fetch a future FoV that has been prefetched, there is no need to prefetch all the possible FoV following the currently viewed FoV since the data, since it already has the high resolution data providing for that future FoV. Thus, prefetching or caching the user's future requested FoV can keep the network bandwidth consumption low, while providing higher resolution FoVs, and providing a smooth video experience for the user.

Figure 4:
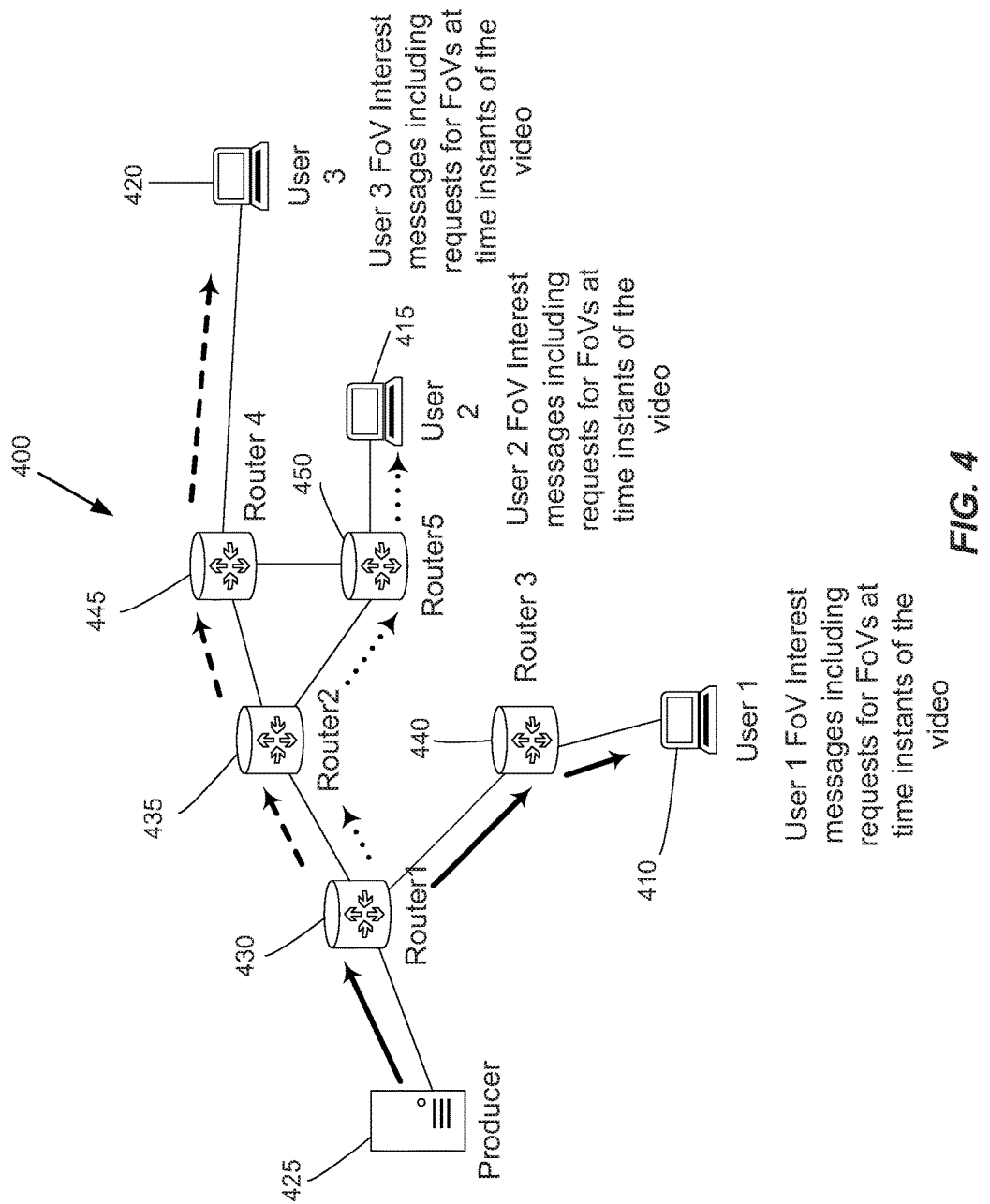
FIG. 4 is a block diagram of a network topology with NDN routers, a 360 degree video stream producer, and 360 degree video stream users, according to example embodiments.

FIG. 4 is a block diagram of a network topology 400 with NDN routers, a 360 degree video stream producer, and 360 degree video stream users, according to example embodiments. Topology 400 may be part of network environment 100 of FIGS. 1A-B used to stream 360 degree video stream as described in FIG. 2, such as where routers 1-5 are examples of router 106, managers 104, or nodes 140; producer 425 is one of stores 108 or node 140; and users 1-3 are devices 110 or nodes 140. More particularly, topology 400 is shown having three 360 degree video stream users 410, 415, and 420 (e.g., such as user devices 110, node 140 or a client); one 360 degree video stream producer 425 (e.g., such as data store 108, node 140 or a server); and a number of 360 degree video stream routers 430, 435, 440, 445, 450, and 455 (e.g., router 106, node 140, an edge router or routers 106, or a manager 104) in topology 400.

Topology 400 may illustrate how the functional components of nodes 140 support reducing the bandwidth of network 102 consumed by prefetching or caching determined future (e.g., "next") FoVs of future time instants for a particular user at an edge router 106, manager 104 or user device 110.

In some instances, router 1 at 430 may be considered an edge router because it is the first router adjacent to producer 425. In some instances router 1 at 430 is an edge router because it is between producer 425 and each of users 1-3.

In one example, referring to FIG. 4, user 1 at 410 is viewing a 360 degree video stream being provided by producer 425. As shown by the arrows, the video is being streamed from producer 425, through router 1 at 430, and from there through router 3 at 440, to user 1 at 410. In some instances, user 1 at 410 is viewing the 360 degree video stream comprising multiple video streams corresponding to multiple FoVs, each of the multiple FoVs occurring at a time instant of a time period of the video. As part of viewing the video, as a result of user 1's behavior, user 1 at 410 sends a first set of FoV interest messages including requests for FoVs at time instants of the video (e.g., see FIGS. 5-7). In some cases, each of these FoV interest message may request a "next" FoV after the "current" FoV, the currently viewed FoV by user 1. These messages are transmitted in a direction opposite that of the shown arrows. The viewing at user 1 at 410 may be all of or a portion of the entire the time period of the video, from the beginning to the end of the video.

In this example, user 2 at 415 is viewing the same 360 degree video stream, which is also being provided by producer 425. The viewing at user 2 at 415 may be before, during, partially during, or after that of user 1 at 410.

As shown by the arrows, the video is being streamed from producer 425, through router 1 at 430, through router 2 at 435, through router 5 at 450, to user 2 at 415. In some instances, user 2 at 415 is viewing the 360 degree video stream comprising multiple video streams corresponding to multiple FoVs, each of the multiple FoVs occurring at a time instant of a time period of the video.

In some cases, the time instants of the video stream are periodic time instants, such as the frame rate period of time for sending the 360 degree video stream FoVs to be viewed by the user. In some cases, the 360 degree video stream is a live streaming 360 degree video stream transmitted over the information-centric network. In these cases, each time instant occurs at one of a periodic time period T, or a ICN round trip time (RTT) between when a FoV interest message is sent by a user who is currently watching the video and when that user receives a response data message.

Figure 6A:
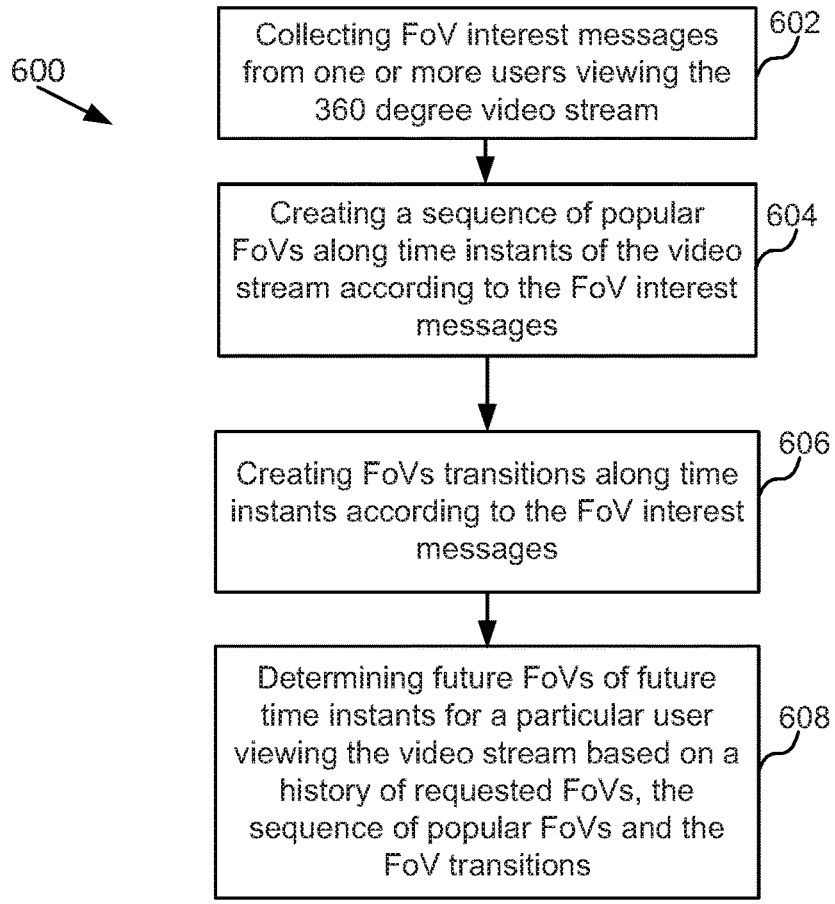
FIG. 6A is a flow diagram of a process for determining a future FoV for a 360 degree video stream, according to example embodiments.
Figure 6B:
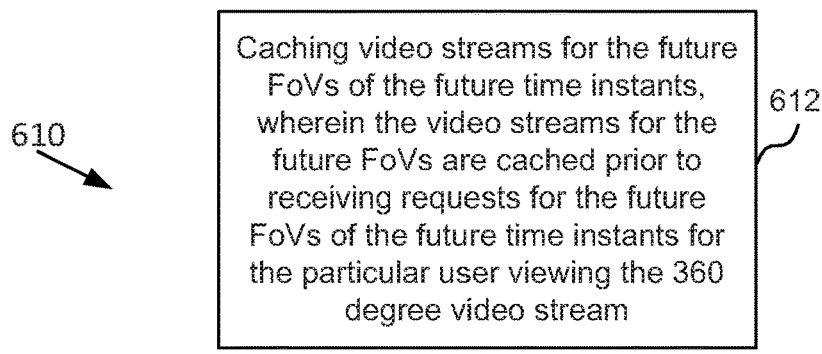
FIG. 6B is a flow diagram of a process for caching a determined future FoVs for a 360 degree video stream, according to example embodiments.
Figure 7:
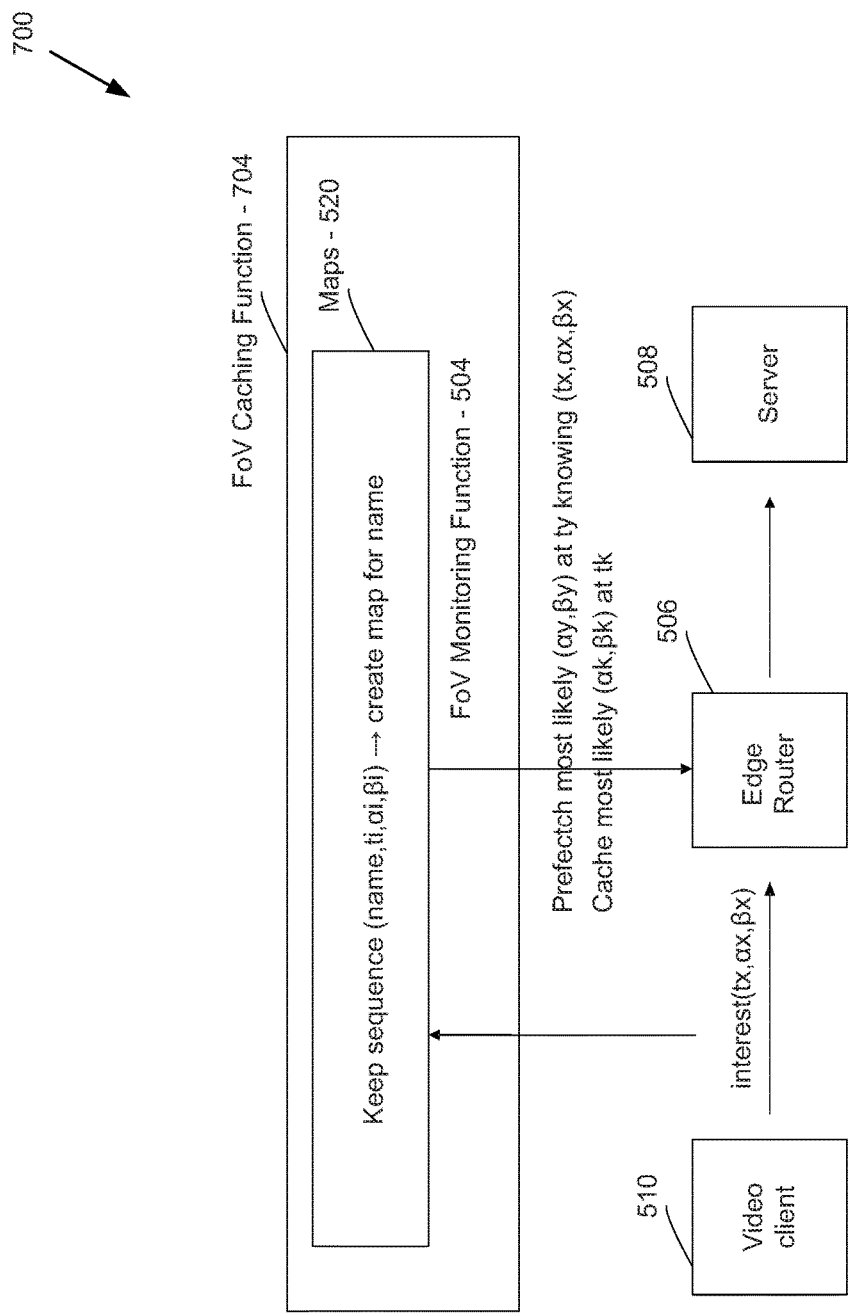
FIG. 7 illustrates an example 360 degree video stream determined future FoV caching function, according to example embodiments.

As part of viewing the video (e.g., while viewing and as a result of user 2's behavior), user 2 at 415 sends a second set of FoV Interest messages (e.g., different than those of user 1 at 410) including requests for FoVs at time instants of the video (e.g., see FIGS. 5-7). These may be called a second set of FoV Interest messages because they are sent by User 2 at 415 and not User 1 at 410, though some of the requests for FoVs of the second set may be for the same FoVs as requested in the first set. In some cases, each of these FoV interest messages may request a "next" FoV after the "current" FoV viewed by user 2. These messages are transmitted in a direction opposite that of the shown arrows. The viewing at user 2 at 415 may be all of or a portion of the entire time period of the video, from the beginning to the end of the video.

In this example, user 3 at 420 is viewing the same 360 degree video stream, which was also provided by producer 425. The viewing at user 3 at 420 will be partially during, or after that of user 1 at 410 and user 2 at 415. As shown by the arrows, the video is being streamed from producer 425, through router 1 at 430, through router 2 at 435, through router 4 at 445, to user 3 at 420. User 3 at 420 is viewing the 360 degree video stream possibly comprising multiple video streams corresponding to multiple FoVs, each of the multiple FoVs occurring at a periodic time instant of a time period of the video. In some instances, as part of viewing the video and as a result of user 3's behavior, user 3 at 420 may send a third set of FoV interest messages including requests for FoVs at time instants of the video (e.g., see FIGS. 5-7). In some cases, each of these FoV interest message may request a next FoV after the current FoV. These messages are transmitted in a direction opposite that of the shown arrows. The viewing at user 3 at 420 may be all of or a portion of the entire the time period of the video, from the beginning to the end of the video. In some instances, the FoV interest message sent by user 3 at 420, for any specific periodic time instant of the time period of the video, will be delayed or behind the corresponding interest messages, for that specific periodic time instant of the time period, sent by of user 1 at 410 and user 2 at 415.

In some instances, as part of viewing the video and as a result of user 3's behavior, user 3 at 420 may send some of a third set of FoV Interest messages including requests for FoVs at time instants of the video (e.g., see FIGS. 8-18).

In embodiments, some of the above-described interest messages may need to be sent by user 3 (thus reducing bandwidth in the network) because the other FoV interest messages that would have been sent by user 3 will be completely or partially satisfied by prefetching or caching determined future FoVs of future time instants for user 3. The actual future FoV that would have been requested in the future interest messages by user 3, now may not need to be sent due to the overlap. Here, the other FoV interest messages that would be sent by user 3 do not need to be or are not sent because the determined future FoV completely overlaps all of the actual future FoV that would have been requested in the future interest messages by user 3. In other instances, when determined future next FoV partially overlaps the actual future FoV that would have been requested in the future interest messages by user 3, the other FoV interest messages may or may not be sent.

In some instances, once user 3 has received the determined future FoV, it can take various actions based on the accuracy of that FoV as compared to the actual future FoV to be requested. Basically, once the device knows the future FoV it actually wants (e.g., based on user/viewer motion) it can compare the received determined future FoV to the actual future FoV to determine accuracy or the amount of overlap in FoV area (e.g., see FoV 230 or tile 310) between the two.

In the case that there is overlap greater than a first threshold (e.g., 20, 30 or 50 percent), the device can display for the viewer whatever part of the received determined future FoV overlaps the actual future FoV. The device may or may not then request more data for the actual future FoV, such as depending on an amount of the overlap. In this example, if the overlap is greater than a second threshold (e.g., 60, 80 or 90 percent), the device may not then request more data for the actual future FoV. If it is less than the second threshold, the device may then request more data for the actual future FoV.

If the overlap is not greater than the first threshold the device can render the low resolution FoV from the low resolution other FoVs 210 and request (or not) more data for the actual future FoV. In any event, if the device requests more data for the actual future FoV, it can wait for that data and display a high resolution FoV 230 and low resolution FoVs 210.

In some embodiments, the determined future FoVs for user 3 may be determined future FoVs of future time instants for user 3 viewing the 360 degree video stream with a history of requested FoVs of past time instants. Here, the future FoVs may be determined based on the history of requested FoVs, a sequence of popular FoVs (e.g., a first map 532 of maps 520 as described for FIGS. 5-12) and FoV transitions (e.g., a second map 552 of maps 520 as described for FIGS. 5-12).

In some embodiments, the determined future FoVs for user 3 may be determined future FoVs of future time instants for user 3 with additional height and width based on movement of coordinate centers in a history of requested prior FoVs by the user (e.g., see FIGS. 13-16).

Figure 5A:
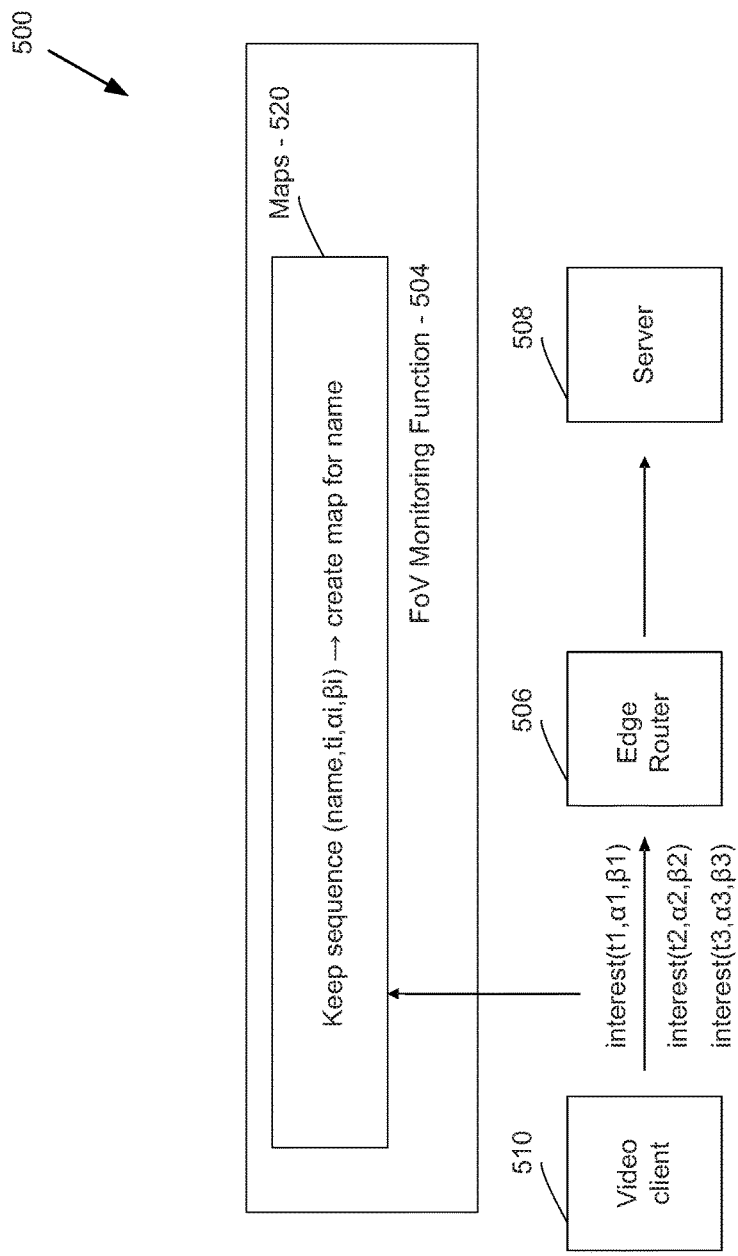
FIG. 5A illustrates an example 360 degree video stream FoV collecting function, according to example embodiments.

FIG. 5A illustrates an example 500 of 360 degree video stream FoV collecting (e.g., receiving, or monitoring) function 504 for creating maps 520 that track the position of FoV centers. For example, function 504 may track or keep sequences for FoV requests for FoVs (name,ti,$\alpha i,\beta i$) in FoV interest messages of users for the video "name" at times ti where the requested FoV has center ($\alpha i,\beta i$), and create maps 520 of popular FoVs and FoV transitions for that named video as further described below. In some instances, maps 520 may allow for or be a basis for determining, prefetching or caching future FoVs of future time instants for a particular user viewing the 360 degree video stream with a history of requested FoVs of past time instants. Here, the future FoVs may be determined based on the history of requested FoVs, a sequence of popular FoVs (e.g., a first map 532 of maps 520 as described for FIGS. 5-6) and FoV transitions (e.g., a second map 552 of maps 520 as described for FIGS. 5-6). Example 500 may be described as a map extraction example.

In some instances, video client 510 represents one of user devices 110; edge router 506 represents an edge router of routers 106; and server 508 represents one of stores 108 of FIG. 1. In some instances, video client 510 represents user 1 at 410 and/or user 2 at 415; edge router 506 represents router 1 at 430; and server 508 represents producer 425 of FIG. 4.

In some instances, function 504 and maps 520 are performed at one of nodes 140 (e.g., a network control plane, such as client 510, edge router 506 and/or server 508). In some instances, function 504 and maps 520 are performed at a 360 degree video stream producer (e.g., producer 425 or store 108), a client computer (e.g., device 110), an edge router of routers 106 (e.g., router 1 430) or a control plane manager (e.g., manager 104).

FIG. 5A shows function 504 including 3 FoV interest messages being transmitted through the network (e.g. environment 100 or network 102) from client 510, through router 506 and to server 508. These interest messages are shown as "interest(t1,α1,β1)", "interest(t2,α2,β2)" and "interest(t3, α3,β3)". Here, t1, t2, t3 . . . may indicate the time instants during the time period of the video stream. Here, α1, α2, α3 may be the spherical coordinate α component of the center of the FoV of the video stream for that periodic time instant. Here, β1, β2, β3 . . . may be the spherical coordinate β component of the center of the FoV of the video stream for that periodic time instant.

FIG. 5A shows FoV monitoring function 504 collecting (e.g., monitoring or keeping track) of the position of the FoV center, of interest messages being transmitted through the network, such as in this case, the 3 interest messages being transmitted through the network from client 510, through router 506 and to server 508. These 3 interest messages may be from the same user or different users of one or more users viewing the 360 degree video stream, where each FoV interest message includes a request for a FoV at one time instant of the 360 degree video stream.

FIG. 5A shows function 504 including maps 520, such as maps created based on the position of the FoV centers of the collected or kept time ordered sequence (name,ti,αi,βi) over the instants of time, of the interest messages being transmitted through the network. In some instances, maps 520 may be first map 532 and second map 552 created for the "name" of the video stream, such as maps for time ordered sequence (name,ti,αi,βi) over the instants of time, such as shown in FIGS. 5B-C.

In some instances, maps 520 may be maps created by clustering the FoV trajectories of one or more users that are viewing a 360 degree video stream to determine a future FoV for a particular user or viewer of that video (e.g., when streamed at a later time). In some instances, maps 520 may then be used for determining, prefetching or caching future FoVs of future time instants for a particular user viewing the 360 degree video stream with a history of requested FoVs of past time instants.

In some instances, function 504 may include collecting FoV interest messages from one or more users viewing the 360 degree video stream, where each FoV interest message includes a request for a FoV at one time instant of the 360 degree video stream. In some instances, maps 520 may include creating first map 532 (FIG. 5B) of a sequence of popular FoVs along time instants of the 360 degree video stream according to the FoV interest messages, where each popular FoV represents a frequently requested FoV at a distinctive one of the time instants. In some embodiments, each popular FoV represents a most frequently requested FoV at a distinctive one of the time instants. It can be appreciated that a "most frequently requested" FoV may be a most requested or a FoV having the greatest count, such as by counting the number of requests collected for that FoV as compared the number of requests collected for another FoV by the users at the same periodic time instant of the time period of the video stream.

Figure 5B:
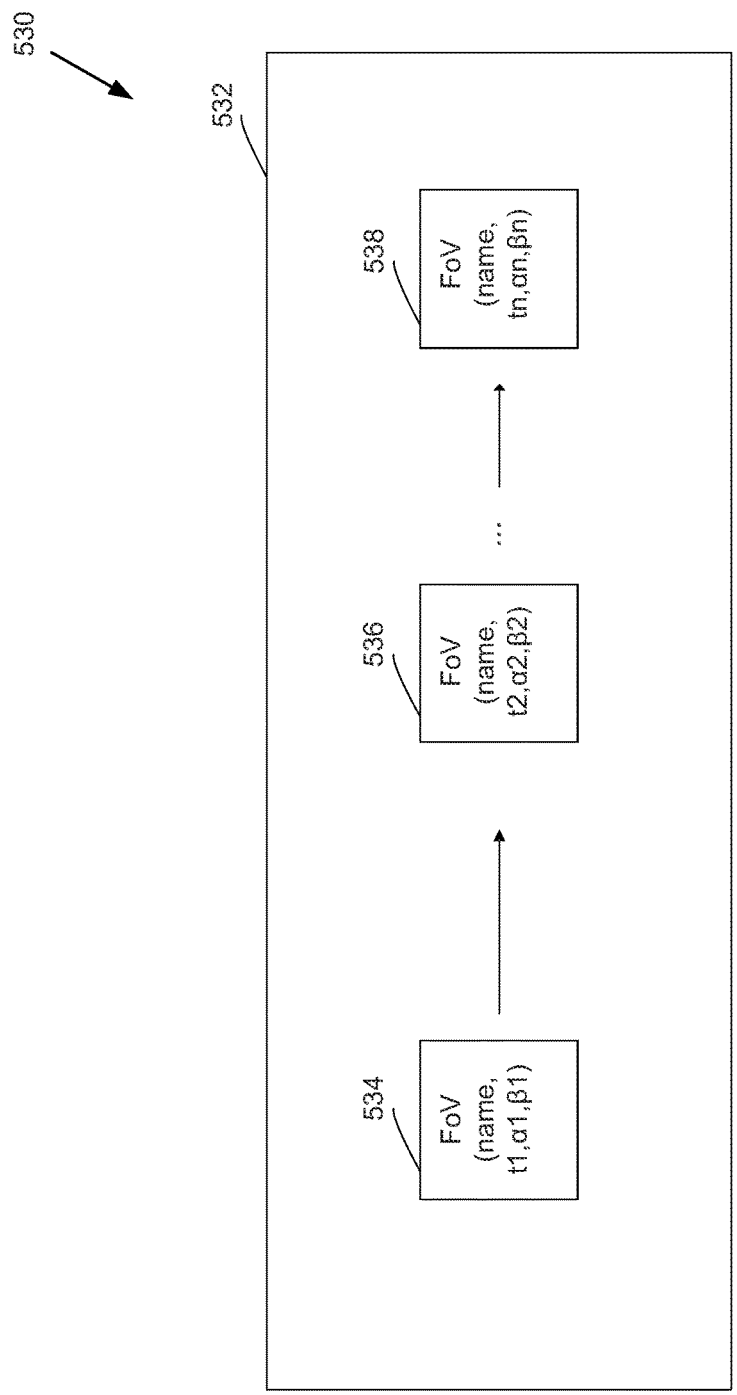
FIG. 5B illustrates an example of a first map of a sequence of popular FoVs along time instants of the 360 degree video, according to example embodiments.
Figure 5C:
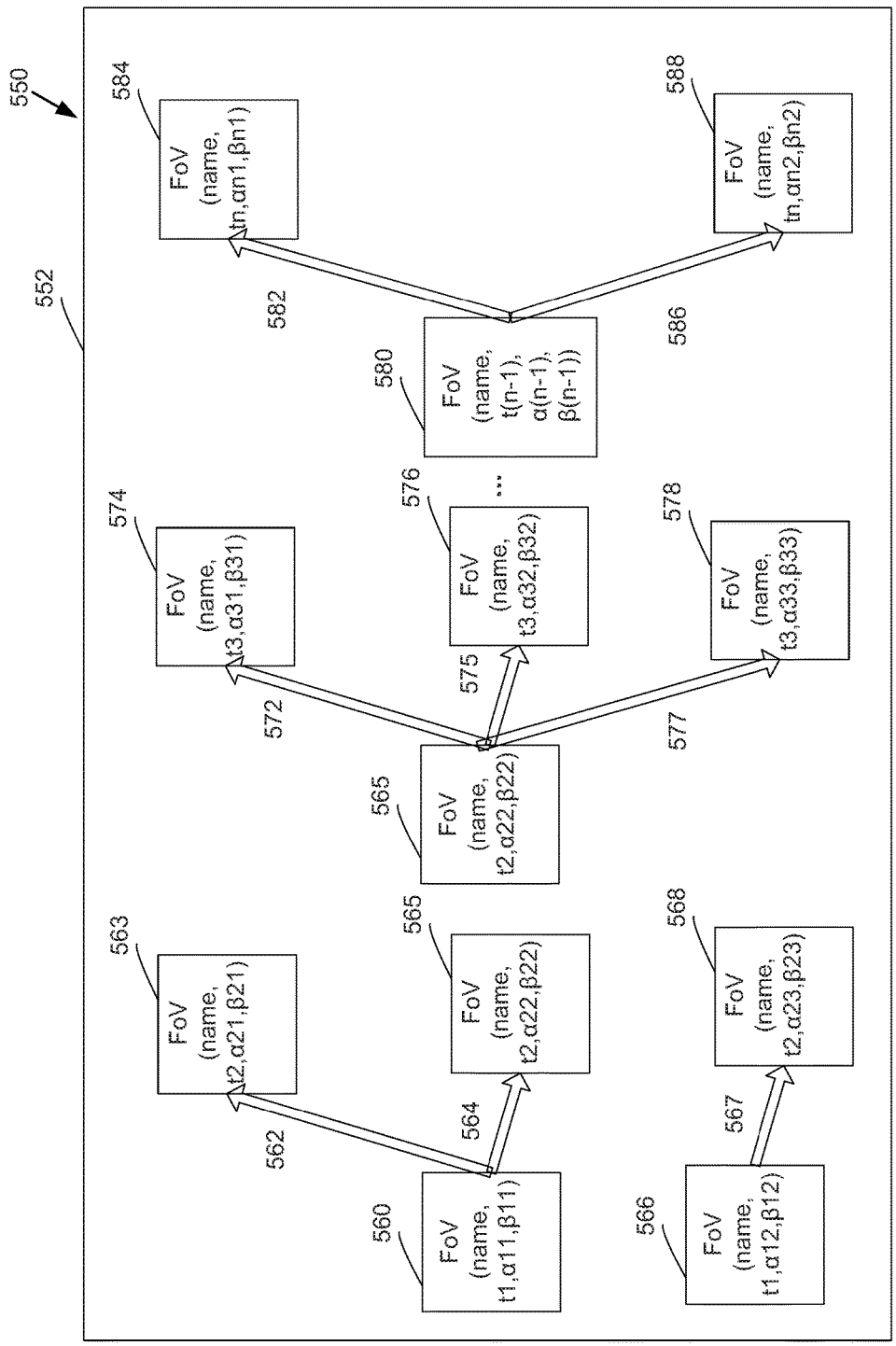
FIG. 5C illustrates an example of a second map of FoV transitions along time instants of the 360 degree video, according to example embodiments.

FIG. 5B illustrates an example 530 of a first map of a sequence of popular FoVs along time instants of the 360 degree video stream according to the FoV interest messages, according to example embodiments. Example 530 shows first map 532 of a sequence of popular FoVs along time instants t1, t2, . . . tn, of the 360 degree video stream according to the FoV interest messages (e.g., see FIG. 5A and step 602 of FIG. 6A), where each popular FoV represents a most frequently requested FoV at a distinctive one of the time instants. Map 532 has popular FoVs 534, 536 and 538. Popular FoV 534 at time instant t1 (e.g., may be the first or beginning time instant of the video) is shown as FoV (name,t1,α1,β1). Popular FoV 536 at time instant t2 is shown as FoV(name,t2,α2,β2). Popular FoV 538 at time instant tn is shown as FoV(name,tn,αn,βn) (e.g., which may be the final or end time instant of the video). There may be additional popular views between 536 and 538.

In some instances, maps 520 may include creating a second map of FoV transitions along the time instants according to the FoV interest messages, where each FoV transition includes a current FoV of one of the time instants and a next FoV of a next time instant next to the one time instant, the next FoV indicating a likely next FoV to be requested subsequent to the current FoV.

FIG. 5C illustrates an example 550 of a second map of FoV transitions along the time instants according to the FoV interest messages, according to example embodiments. Example 550 shows second map 552 of FoV transitions along the time instants t1, t2, . . . tn, of the 360 degree video stream according to the FoV interest messages (e.g., see FIG. 5A and step 606 of FIG. 6A), where each FoV transition includes a current FoV of one of the time instants and a next FoV of a next successive time instant, the next FoV indicating a likely next FoV to be requested subsequent to the current FoV.

Map 552 has FoV 560 shown as FoV(name,t1,α11,β11) at time instant t1 with FoV transition 562 (e.g., a direction of moving from the center of FoV 560 to the center of FoV 563) from FoV 560 to FoV 563 shown as FoV(name,t2, α21,β21) at time t2. The map also shows FoV 560 at time instant t1 with FoV transition 564 (e.g., a different direction than transition 562, moving from the center of FoV 560 to the center of FoV 565) from FoV 560 to FoV 565 shown as FoV(name,t2,α22,β22) at time t2. Transitions 562 and 564 may be two possible transitions from FoV 560 that exist in the historical data collected at step 602 (e.g., also see FIG. 5A). In some instances transitions 562 and 564 may be each be a transition of one or more different users having interest messages collected (e.g., see step 602 of FIG. 6A) that began at current FoV 560 at time t1 and then due to their behavior, ended up at next FoVs 563 and 565, respectively, at time t2.

The map also shows FoV 566 shown as FoV(name,t1, α12,β12) at time instant t1 (e.g., a different FoV than FoV 560) with FoV transition 567 from FoV 566 to FoV 568 shown as FoV(name,t2,α22,β22) at time t2. Transition FoV 566 may be a possible transitions from FoV 566 that exist in the historical data collected at step 602 (e.g., also see FIG. 5A).

In some instances transition FoV 566 may be transitions of one or more different users having interest messages collected (e.g., see step 602 of FIG. 6A) that began at current FoV 566 at time t1 and then due to the user's behavior, ended up at next FoV 568 at time t2. FoVs 560, 563, 565, 566 and 568 may be possible FoVs that exist in the historical data collected at step 602 (e.g., also see FIG. 5A). FoV 560 or 566 may or may not be the same as FoV 532 at time t1. FoV 563, 565 or 568 may or may not be the same as FoV 536 at time t2. In some embodiments, one of transitions 562 or 564 may represents a most frequently requested transition from FoV 560 in the historical data. In some cases, the transitions from time t1 to time t2 are filtered to maintain the most frequent transitions in the historical data and not the less frequent transitions.

Map 552 has FoV 565 shown as FoV(name,t2,α22,β22) at time instant t2 with FoV transition 572 from FoV 566 to FoV 574 shown as FoV(name,t3,α31,β31) at time t3. FoV 565 also has FoV transition 575 from FoV 565 to FoV 576 shown as FoV(name,t3,α32,β32) at time t3. In addition, FoV 565 also has FoV transition 577 from FoV 565 to FoV 578 shown as FoV(name,t3,α33,β33) at time t3.

Transitions 572, 575 and 567 may be three possible transitions from FoV 565 that exist in the historical data collected at step 602 (e.g., also see FIG. 5A). In some instances transitions 572, 575 and 567 may be each be a transition of one or more different users having interest messages collected (e.g., see step 602 of FIG. 6A) that began at current FoV 565 at time t2 and then due to their behavior, ended up at next FoVs 574, 576 and 578, respectively, at time t3. FoVs 565, 574, 576 and 578 may be possible FoVs that exist in the historical data collected at step 602 (e.g., also see FIG. 5A). In some embodiments, one of transitions 572, 575 or 577 may represents a most frequently requested transition from FoV 565 in the historical data. In some cases, the transitions from time t2 to time t3 are filtered to maintain the most frequent transitions in the historical data and not the less frequent transitions.

It can be appreciated that there may be FoV transitions between each time instant x−1 and x between time t3 and t(n−1), such as described herein.

Then, map 552 has FoV 580 shown as FoV(name,t(n−1), α(n−1),β(n−1)) at time instant t(n−1) (e.g., which may be the time instant immediately before the subsequent final or end time instant of the video) with FoV transition 582 from FoV 580 to FoV 584 shown as FoV(name,tn,αn1,βn1) at time n. FoV 580 also has FoV transition 586 from FoV 580 to FoV 588 shown as FoV(name,tn,αn2,βn2) at time n. Transitions 582 and 586 may be two possible transitions from FoV 580 that exist in the historical data collected at step 602 (e.g., also see FIG. 5A). In some instances transitions 582 and 586 may be each be a transition of one or more different users having interest messages collected (e.g., see step 602 of FIG. 6A) that began at current FoV 580 at time t(n−1) and then due to their behavior, ended up at next FoVs 584 and 588, respectively, at time tn. FoVs 580, 584, and 588 may be possible FoVs that exist in the historical data collected at step 602 (e.g., also see FIG. 5A). FoV 584 or 588 may or may not be the same as FoV 538 at time tn. In some embodiments, one of transitions 582 or 586 may represent a most frequently requested transition from FoV 580 in the historical data. In some cases, the transitions from time t(N−1) to time tn are filtered to maintain the most frequent transitions in the historical data and not the less frequent transitions.

FIG. 6A is a flow diagram of a process 600 for determining a future FoV for a 360 degree video stream in an ICN, according to example embodiments. Process 600 may be a process that includes the 360 degree video stream FoV collecting function 504 of FIG. 5A at step 602; creating maps 520 of FIG. 5A at step 604 and step 606; as well as a determining future FoV at step 608. Step 608 allows for or is a basis for determining, prefetching or caching future FoVs of future time instants for a particular user viewing the 360 degree video stream with a history of requested FoVs of past time instants.

Process 600 may be a process performed by one of nodes 140 (e.g., a network control plane, such as client 510, edge router 506 and/or server 508). In some instances, process 600 may be performed by a 360 degree video stream producer (e.g., producer 425 or store 108), an edge router of routers 106 (e.g., router 1 at 430) or a control plane manager (e.g., manager 104).

Process 600 begins at step 602 where FoV interest messages from one or more users viewing the same 360 degree video stream are collected. Step 602 may include descriptions for (FoV) collecting function 504 of FIG. 5. Step 602 may include collecting FoV interest messages from one or more users viewing the 360 degree video stream, where each FoV interest message includes a request for a FoV at one time instant of the 360 degree video stream.

In some instances, step 602 includes collecting at the producers (e.g., server) or an edge router, the next FoV selected following the current FoV viewed by multiple users that previously viewed the same video sequence. This collecting may include monitoring or tracking previously requested interest messages from one or more users as the next FoV following the current FoV viewed by a user in the sequences of FoVs where the monitored/tracked data is stored as historic messages. Using these historic messages, two sequential maps may be created (where the maps are sequences of the FoVs), such as described at step 604 for a first map and step 606 for a second map.

At step 604 a sequence of popular FoVs is created along time instants of the 360 degree video stream according to the FoV interest messages, where each popular FoV represents a frequently requested FoV at a distinctive one of the time instants. Step 604 may include descriptions for creating the first one of maps 520 of FIG. 5.

Step 604 may include creating a sequence of FoVs most frequently requested of the multiple FoVs, at each of the periodic time instants, by the one or more users as indicated in the FoV interest messages. It can be appreciated that a "most frequently requested" of the multiple FoVs may be a FoV having the greatest count, such as by counting the number of requests collected for that FoV as compared the number of requests collected for another FoV by the users at the same periodic time instant of the time period of the video stream.

In some instances, step 604 may be described as extracting a map from the collected interest messages by expressing the sequence of FoV most frequently requested of the multiple FoVs, at the network layer (e.g., an edge router, network manager, network controller, or video stream provider).

In some instances, step 604 may include creating a first map as a sequence of FoV over time for the video: FoV(t1), FoV(t2), FoV(tn) where each FoV is a popular FoV (e.g., most frequently requested) of the multiple FoVs, at each of the time instants t1, t2, . . . tn, by the one or more users as indicated in the FoV interest messages. In some instances, step 604 may include creating a first map as a sequence of popular FoVs along time instants of the 360 degree video as described for map 532 of FIG. 5B.

In some instances, step 604 may include compressing that map; generating that map at the producer (e.g., a server); generating that map at the user (e.g., a client) and sharing that map with the producer. In some cases, the producer provides or exposes that map to the user in a manifest (e.g., see FIG. 11).

In some instances, step 604 includes creating at the producers (e.g., server) or an edge router, a first map or a sequence of FoVs that were most requested along time instants of the video by the multiple users for each FoV in the original sequence of FoVs. The first map may then be used to predict the most likely FoVs, determined future or highest probability FoVs along time instants of the video for subsequent users viewing the video sequence, such as at step 608.

At step 606, FoV transitions along the time instants are created according to the FoV interest messages, where each FoV transition includes a current FoV of one of the time instants and a next FoV of a next time instant next to the one time instant, the next FoV indicating a likely next FoV to be requested subsequent to the current FoV. Step 606 may include descriptions for creating the second one of maps 520 of FIG. 5.

In some instances, step 606 may include creating transitions at each of the periodic time instants during the time period, each transition being to a FoV most frequently requested from an immediately prior requested FoV at each of the periodic time instants, by the one or more users as indicated in the FoV interest messages. It can be appreciated that a FoV "most frequently requested" from an immediately prior requested FoV (e.g., that transition) may be a FoV having the greatest count from an immediately prior requested FoV, such as by counting the number of requests collected for that FoV from that immediately prior requested FoV, as compared the number of requests collected for another FoV from that immediately prior requested FoV, by the users at the same periodic time instant of the time period of the video stream.

In some instances, step 606 may be described as extracting a map from the collected interest messages by expressing the sequence of most frequent FoV transitions requested of the multiple FoVs, at the network layer (e.g., an edge router, network manager, network controller, or video stream provider).

In some instances, step 606 may include creating a second map as sets of most requested transitions of any FoV of the FoVs over time for the video: set of transition FoVs(t1), set of transition FoVs FoV(t2), . . . set of transition FoVs FoV(tn) where each set of transition FoVs includes a FoV transition (e.g., that are the most frequently requested) of the multiple possible transitions from any FoV, at each of the time instants t1, t2, . . . tn, by the one or more users as indicated in the FoV interest messages. In some instances, step 606 may include creating a second map as FoVs transitions along time instants of the 360 degree video as described for map 552 of FIG. 5C.

In some instances, step 606 may include compressing that map; generating that map at the producer (e.g., a server); generating that map at the user (e.g., a client) and sharing that map with the producer. In some cases, the producer provides or exposes that map to the user in metadata (e.g., see FIG. 12).

In some instances, step 606 includes creating at the producers (e.g., server) or an edge router, a second map or transition to "next" FoV that were most requested along time instants of the video by the multiple users immediately following any currently viewed FoV by the users in the sequences of FoVs. The second map may then be used to predict the most likely FoV, determined future, or highest probability FoV immediately following any currently viewed FoV along time instants of the video by a user in the sequence of FoVs, such as at step 608.

At step 608 a future FoVs of future time instants are determined for a particular user viewing the 360 degree video stream with a history of requested FoVs of past time instants, where the future FoVs are determined based on the history of requested FoVs, the sequence of popular FoVs (e.g., see FIG. 5B and at step 604) and the FoV transitions (e.g., see FIG. 5C and at step 606). Step 608 may include descriptions for using or determining future FoVs based on the first map 532 and/or second map 550 of maps 520 as described for FIGS. 5A-C.

In some instances, step 608 may include determining a future FoV for a time instant during the time period of the 360 degree video stream to be the most frequently requested FoV of one of the sequence of the popular FoVs or the most frequently requested FoV transition of the FoV transitions for the periodic time instant during the time period of the 360 degree video stream, wherein the requested FoV is in a FoV interest message sent by a subsequent user viewing the 360 degree video stream.

In some instances, step 608 includes determining at the producers (e.g., server) or an edge router, future FoVs of future time instants for a particular user viewing the 360 degree video stream with a history of requested FoVs of past time instants, where the future FoVs are determined based on the history of requested FoVs and the sequence of popular FoVs (e.g., FoVs that are the most requested at each time instants in the historical data). In other instances, step 608 includes where the future FoVs are determined based on the history of requested FoVs and FoV transitions (e.g., FoV transitions at time instants in the historical data).

The determined future FoVs may then be cached at the client (or router) (e.g., see FIGS. 6B-12). The cached sequence of popular FoVs and/or FoV transitions may be used to provide a smooth video experience for the user without a large increase in network bandwidth that would be required to prefetch all the possible FoV following the currently viewed FoV. This caching will be described further with respect to FIGS. 6B-12.

FIG. 6B is a flow diagram of a process 610 for caching video streams for the determined future FoVs for the future time instants of the 360 degree video stream in an ICN, according to example embodiments. Process 610 may occur after step 608 of process 600 of FIG. 6A.

Process 610 includes step 612 where video streams are cached for the future FoVs of the future time instants, where the video streams for the future FoVs are cached prior to receiving requests for the future FoVs of the future time instants for the particular user viewing the 360 degree video stream (e.g., see step 608 of FIG. 6A). In some instances, at step 612, a requested FoV by a subsequent user viewing the video stream is cached as the most frequently requested FoV of the sequence of popular FoVs or the most frequently requested next FoV of the FoV transition for the next time instant of the video being watched by a particular users. Step 612 may include descriptions for caching a predicted next FoV for a subsequent user, using the first map 532 and/or second map 552 of maps 520 as described for FIGS. 5A-C and 6A.

In some embodiments, from the edge network point of view (e.g., producer 425, server 508, and edge router, or edge router 506) when a video in ICN or network 102 exhibits a 360 degree video stream, the FoV interest messages are collected and the maps are created. Here, the maps may be kept track of, which may include function 504 creating maps 520. For example, maps 520 may be created to, at a first level, maintain the probability of most requested FoV for each time step of the stream as part of the first map 532, and to, at a second level, maintain the transition probability at each time step of the stream as part of the second map 552 (e.g., see FIGS. 5A and 11). This edge of network point of view may then cache accordingly at the first level with a cache policy to keep most likely (e.g., the determined future or most requested) next FoV at each time step (e.g., the predicted next FoV from the first and/or second map of maps 520), and at the second level, based upon a current request, prefetch most likely future requests at next time step if not cached (e.g., the predicted next FoV from the first and/or second map of maps 520) (e.g., see FIGS. 7-8).

FIG. 7 illustrates example 700 of 360 degree video stream determined future FoV caching function 704, according to example embodiments. Example 700 shows FoV caching (e.g., prefetching in some instances, see FIGS. 11-12) function 704 including FoV monitoring function 504 as described for FIG. 5A-C, and creating maps 520 (e.g., maps 532 and 552) that track the position of FoV centers as described for FIGS. 5A-6A. In some instances, caching function 704 includes caching video streams for the future FoVs of the future time instants, where the video streams for the future FoVs are cached prior to receiving requests for the future FoVs of the future time instants for the particular user viewing the 360 degree video stream. In some instances, caching function 704 includes caching video streams for the future FoVs of the future time instants as describe at step 612 of FIG. 6B.

In some instances, function 704 is performed at one of nodes 140 (e.g., a network control plane, such as client 510, edge router 506 and/or server 508). In some instances, function 704 is performed at a 360 degree video stream producer (e.g., producer 425 or store 108), a client computer (e.g., device 110), an edge router of routers 106 (e.g., router 1 at 430) or a control plane manager (e.g., manager 104).

FIG. 7 shows function 704 including 1 FoV interest message being transmitted through the network (e.g. environment 100 or network 102) from client 510, through router 506 and to server 508 as "interest(tx,αx,βx)". Here, tx may indicate a time instant at any of the time instants 1, 2, 3, . . . n (e.g., in the time ordered sequence) during the time period of the video stream. Here, αx may be the spherical coordinate α component of the center of the FoV of the video stream for that time instant tx. Here, βx may be the spherical coordinate β component of the center of the FoV of the video stream for that time instant tx.

As noted, in some instances, function 704 may include FoV monitoring function 504 of FIG. 5A; and creating maps 520 such as described for maps 532 and 552 of FIGS. 5B-C. However, in other instances, the function 504 and maps 520 are performed separately (such as described for FIGS. 5A-6A) and function 704 is performed in addition to function 504 and maps 520 (such as described for FIG. 6B).

In some instances, FoV caching function 704 may prefetch a determined future FoV (or video stream having that FoV) centered at (αy,βy) for time instant ty by knowing the immediately prior FoV center (tx,αx,βx) at the immediately prior time instant tx. This determined future FoV may be based on or be one of the FoV transitions (e.g., of map 552) along the time instants according to the FoV interest messages, where FoV transition including a current FoV of one of the time instants and a next FoV of a next time instant next to the one time instant, the next FoV indicating a likely next FoV to be requested subsequent to the current FoV. In some instances, function 704 determines the future FoV as the most requested FoV transition from the FoV having center (tx,αx,βx) (e.g., in the FoV interest message "interest(tx,αx,βx)" received from client 510). In some instances, function 704 determines the future FoV as the most requested next FoV of a FoV transition that is immediately after FoV having center (tx,αx,βx).

The determined future FoV may be prefetched by function 704 in response to client 510 sending the request for the FoV having center (tx,αx,βx) (e.g., sending the FoV interest message "interest(tx,αx,βx)"). In cases where function 704 exists at edge router 506 (e.g., a node 140 that is the router), in response to receiving this request, function 704 may prefetch the determined future FoV by requesting it from server 508 using a FoV interest message, and then sending the determined future FoV it receives from the server to client 510. In cases where function 704 exists at server 508 (e.g., a node 140 that is the server), in response to receiving this request, function 704 may prefetch the determined future FoV by replying to the request from the client with a FoV data message having the determined future FoV.

In some instances, this prefetching is prefetching a determined future FoV center (αy,βy) at time instant ty. The determined future FoV may be as the next FoV of the most frequent transition of the FoV transitions as after the current FoV at time instant tx described for second map 552 of FIGS. 5A and 5C, at step 606 of FIG. 6A, or at step 612 of FIG. 6B. As discussed above, this may be in addition to or separate from function 704 performing functions of function 504 and maps 520.

In some instances, FoV caching function 704 may cache a determined future FoV (or video stream having that FoV) center (αk,βk) for time instant tk by knowing the immediately prior time instant tk−1 (−1 time instant of the video sequence). According to embodiments, it may not be necessary for function 704 to know the immediately prior FoV center (e.g., in the example above (tx,αx,βx)), but to know the immediately prior time instant (e.g., in the example above tx). This determined future FoV may be based on or be one of the sequence of popular FoVs (e.g., of map 532) along the time instants according to the FoV interest messages, where popular FoV represents a frequently requested FoV at a distinctive one of the time instants. In some instances, function 704 determines the future FoV as the most requested FoV in the sequence of popular FoVs at time tk immediately after the FoV having center (tx,αx,βx) (e.g., in the FoV interest message "interest(tx,αx,βx)" received from client 510).

The determined future FoV may be cached by function 704 in response to client 510 sending the request for the FoV having center (tx,αx,βx) (e.g., sending the FoV interest message "interest(tx,αx,βx)"). In some cases, that determined future FoV may have been cached at client 510 or router 506 prior to time tx.

Figure 11:
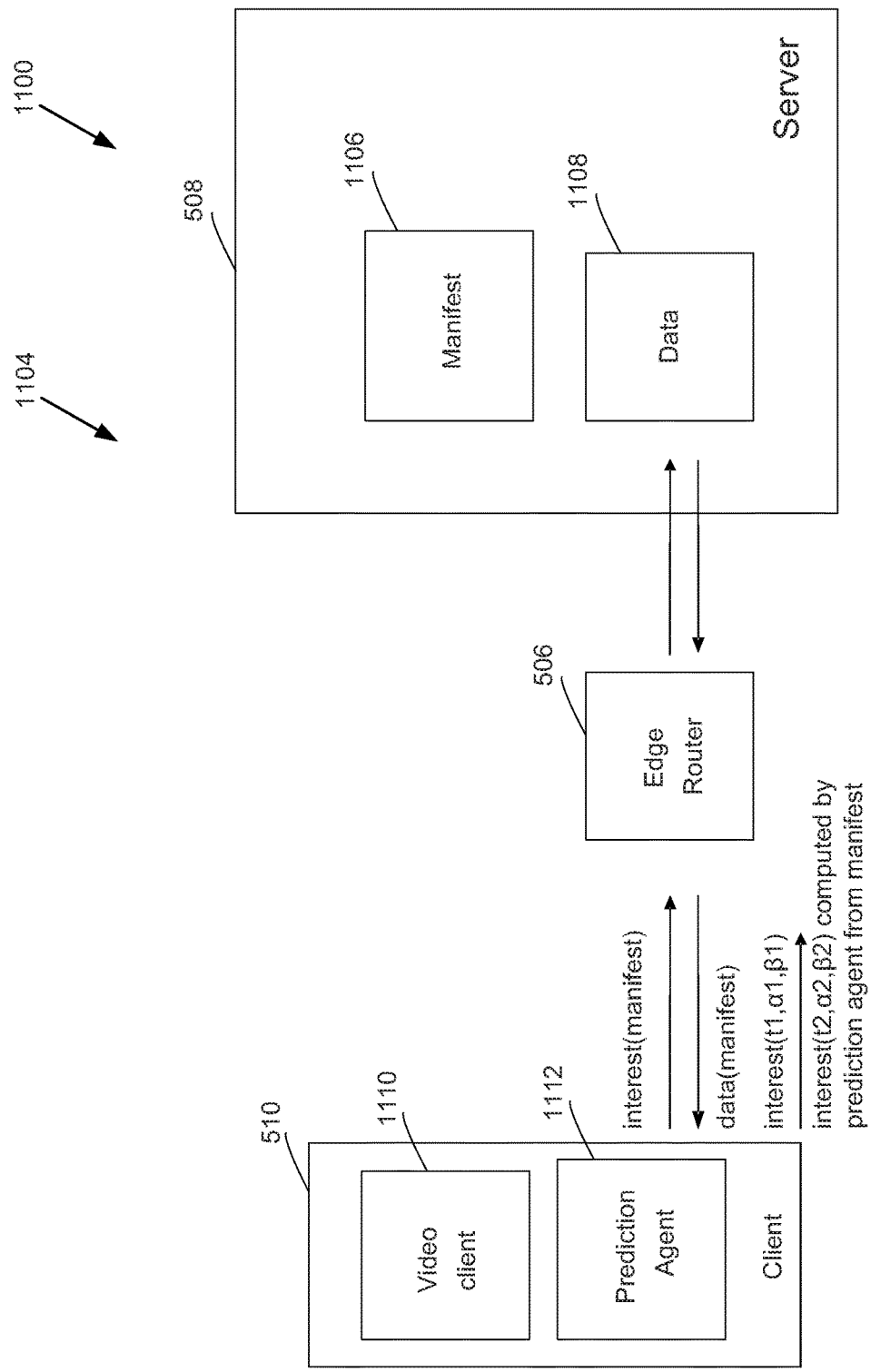
FIG. 11 illustrates an example 360 degree video stream determined future FoV manifest function, according to example embodiments.

In some cases, that determined future FoV as well as other (or all) determined future FoVs over the time instants of the video may have been cached at client 510 or router 506 prior to time tx (e.g., see manifest of FIG. 11). In some instances, that determined future FoV as well as other (or all) determined future FoVs may have been cached upon the user beginning viewing of the video.

In cases where function 704 exists at edge router 506 (e.g., a node 140 that is the router), in response to receiving the FoV interest message for time tx, or beginning the video, function 704 may cache the determined future FoV by requesting it from server 508 using a FoV interest message, and then sending the determined future FoV it receives from the server to client 510. This caching may also apply to that determined future FoV as well as other (or all) determined future FoVs as noted above.

In cases where function 704 exists at server 508 (e.g., a node 140 that is the server), in response to receiving this request, function 704 may cache the determined future FoV by replying to the request from the client with a FoV data message having the determined future FoV. This caching may also apply to that determined future FoV as well as other (or all) determined future FoVs as noted above.

In some instances, this caching is caching a determined future (e.g., most probable or likely) FoV (or video stream having that FoV) center ($\alpha k, \beta k$) at time instant tk as the most frequently requested FoV of the sequence of popular FoVs at time instant tk as requested by multiple users, such as in the first map 532 of FIGS. 5A-B, at step 604 of FIG. 6A, or at step 612 of FIG. 6B. As discussed above, this may be in addition to or separate from function 704 performing functions of function 504 and maps 520.

For caching function 704 prefetching or caching a determined future FoV, the immediately prior FoV having center ($tx, \alpha x, \beta x$) may be part of a history of requested FoVs of past time instants for a particular user viewing the same video stream as the FoV interest messages collected by function 504.

Figure 8:
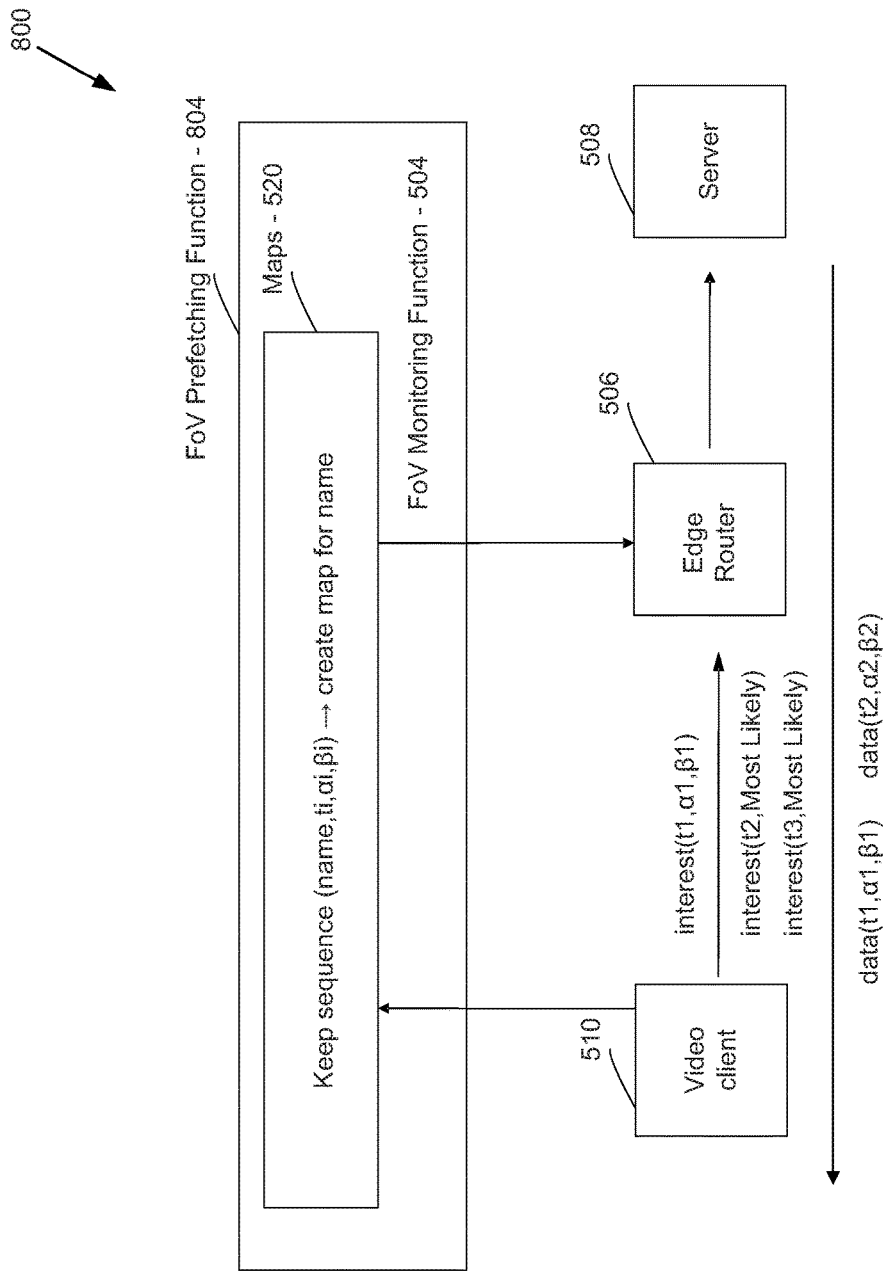
FIG. 8 illustrates an example 360 degree video stream determined future FoV prefetching function, according to example embodiments.

FIG. 8 illustrates an example 800 of a 360 degree video stream determined future FoV prefetching function 804, according to example embodiments. Example 800 shows FoV prefetching (e.g., prefetching by a user device 110) function 804 including FoV monitoring function 504 as described for FIG. 5A, and creating maps 520 (e.g., maps 532 and 552) that track the position of FoV centers as described for FIGS. 5A-C. In some instances, prefetching function 804 includes determining and prefetching the video streams for the future FoVs of future time instants at a client device where the particular user is viewing the 360 degree video stream, wherein the video streams for the future FoVs are prefetched prior to the future time instants for the particular user viewing the 360 degree video stream.

Example 800 may be described as a map extraction example that looks up the determined future (e.g., most requested) FoV or FoV transition for time t2 based upon the FoV of a subsequent user viewed at time t1 and using first map 532 and/or second map 552 as described for FIG. 5, 6, or 7.

In some instances, function 804 is performed at one of nodes 140 (e.g., a network control plane, such as client 510, edge router 506 and/or server 508). In some instances, function 804 is performed at a 360 degree video stream producer (e.g., producer 425 or store 108), a client computer (e.g., device 110), an edge router of routers 106 (e.g., router 1 at 430) or a control plane manager (e.g., manager 104).

FIG. 8 shows function 804 including 3 FoV interest messages being transmitted through the network (e.g. environment 100 or network 102) from client 510, through router 506 and to server 508. These interest messages are shown as "interest(t1,$\alpha$1,$\beta$1)", "interest(t2,Most Likely)" and "interest(t3,Most Likely)". Here, t1, t2, t3 . . . tn may indicate the (e.g., periodic) time instant at time instants 1, 2, 3, . . . n (e.g., in a time ordered sequence) during the time period of the video stream. Here, $\alpha$1, $\beta$1 may be the spherical coordinate $\alpha$ and $\beta$ components of the center of the FoV of the video stream for that periodic time instant.

In some embodiments, interest(t2,Most Likely) may be a request by the user device (e.g., in a FoV interest message) for the spherical coordinates (e.g., $\alpha, \beta$ component) of the center of a Most Likely next FoV for that user, such as a determined future FoV that is determined based on maps 520 or as described otherwise herein. Here, this most likely FoV may be a determined future FoV of the video stream for that user, for the time instant t2, immediately after time instant t1 (which may be the first or represent any time instant during the video stream). In some embodiments, interest(t3, Most Likely) may be a request by the user device (e.g., in a FoV interest message) for the spherical coordinates (e.g., $\alpha, \beta$ component) of the center of a determined future FoV of the video stream for the time instant t3, immediately after time instant t2. Interest(t2,Most Likely) and interest(t3,Most Likely) may be requests for a determined future FoV (e.g., after the FoV at time instants t2 and t3, respectively) that is determined using or being based on first map 532 and/or second map 552 of FIG. 5; at step 608 of FIG. 6A, at step 612 of FIG. 6B, or as cached or prefetched in FIG. 7.

As noted, in some instances, function 804 may include FoV monitoring function 504 of FIG. 5A; and creating maps 520 such as describe for maps 532 and 552 of FIGS. 5B-C. However, in other instances, the function 504 and maps 520 are performed separately (such as described for FIGS. 5A-6A) and function 804 is performed in addition to function 504 and maps 520 (such as described for FIG. 6B).

FIG. 8 shows 2 FoV data messages being transmitted through the network (e.g. environment 100 or network 102) from server 508, through router 506 and to client 510. These data messages are shown as "data(t1,$\alpha$1,$\beta$1)" and "data(t2, $\alpha$2,$\beta$2)". Here, t1, t2, t3 . . . may indicate the periodic time instant at time instants 1, 2, 3, . . . (e.g., in the time ordered sequence) during the time period of the video stream. Here, $\alpha$1, $\beta$1 may be the spherical coordinate $\alpha$ and $\beta$ components of the center of the FoV of the video stream for that periodic time instant.

In some examples, data(t1,$\alpha$1,$\beta$1) is a FoV data message sent to a particular user in response to that user sending FoV interest message interest(t1,$\alpha$1,$\beta$1) which requested a FoV for time instant t1 having FoV center ($\alpha$2,$\beta$2) of the video stream. This FoV interest message may be received by and the FoV data message may be sent in response to that interest message, buy a 360 degree video stream producer (e.g., producer 425 or store 108), an edge router of routers 106 (e.g., router 1 430) or a control plane manager (e.g., manager 104).

In some instances, FoV prefetching function 804 may provide a prefetched determined future FoV centered at ($\alpha$2,$\beta$2) for time t2 (e.g., data(t2,$\alpha$2,$\beta$2)) by knowing the immediately prior FoV center and time (t1,$\alpha$1,$\beta$1), of the time ordered sequence (name,ti,$\alpha$i,$\beta$i) of the position of the FoV centers, of interest messages being transmitted through the network for that video. In some examples, data(t2,$\alpha$2,$\beta$2) is sent to a particular user in response to that user sending FoV interest message interest(t2,Most Likely) which requested a determined future FoV for time instant t2, where the data(t2,$\alpha$2,$\beta$2) is determined using or based on first map 532 and/or second map 552 of FIGS. 5A-C; at step 608 of FIG. 6A, at step 612 of FIG. 6B, or as cached or prefetched in FIG. 7.

In some cases, data(t2,$\alpha$2,$\beta$2) is cached video streams for future FoVs of the future time instants, wherein the video streams for the future FoVs are cached prior to receiving requests for the future FoVs of the future time instants for the particular user viewing the 360 degree video stream, as described herein.

This FoV interest message may be received by, and in response to that interest message, a FoV data message may be sent. The FoV data message may be sent in response, by a 360 degree video stream producer (e.g., producer 425 or store 108), an edge router of routers 106 (e.g., router 1 430) or a control plane manager (e.g., manager 104).

In some instances, providing the prefetched determined future FoV centered at ($\alpha$2,$\beta$2) for time t2 is done by function 804 sending a FoV data message having this FoV from the node 140 of an edge router 506 or server 508 that function 804 exists at. Sending the data message may be based on using the first map 532 and/or second map 552 of FIGS. 5A-C, at step 608 of FIG. 6A, at step 612 of FIG. 6B, or as cached or prefetched in FIG. 7.

A data message data(t3,α3,β3) (not shown) may be sent to the particular user in response to the FoV interest message interest(t3,Most Likely) similar to the description for sending data(t2,α2,β2) sent to the particular user in response to that user sending FoV interest message interest(t2,Most Likely).

In one example, the interest message may use different nomenclature than "interest(tx,Most Likely)" to request a most likely next FoV. This nomenclature may include a resolution or rate or transmission rate of the video over the network. In this example, function 804 may provide the determined future (e.g., most likely) FoV interest (e.g., FoV requested by the subsequent user) using what may be described as a prefetching interest mechanism. This mechanism may use the following naming semantics (with italicized parameters):

/video/*time_segment*/*rate*/*MostLikelyFoV*/*currentFoV*

In this example, "video" may be the name of the video stream; "time_segment" may be the time instant such at t1, t2, . . . tn; "rate" may be a resolution or rate or transmission rate of the video over the network; "MostLikelyFoV" may indicate the request for the determined future FoV; and "currentFoV" may indicate the name or center coordinates of the currently viewed FoV by the user.

In some instances of example 800, client 510 may request more than one most likely FoV at a time. This will now be explained using condensed nomenclature such as where FoV(t1) represents a FoV interest message that requests interest(t1,FoV), which is a request for the FoV having center coordinates (α1,β1) at time instant t1. The condensed nomenclature may also include "ML_FoV(tx,tx+1,tx+2)" to represent a sequence of FoV interest messages that requests at the same time for, interest(tx,Most Likely), interest(tx+1,Most Likely), and interest(tx+2,Most Likely). In this example, client 510 may send the FoV interest message for FoV(t1) and messages for interests ML_FoV(t2,t3,t4,|t1). Here, ML_FoV does not specify a specific FoV, that the client requests the "most likely" (e.g., determined future FoV) based upon requesting FoV(t1) as well. For example, by knowing what FoV is requested at time t1, function 804 can determine a most likely or future FoV for time instants t2, t3, and t4. Then, function 804 can prefetch the determined most likely or future FoV for time instants t2, t3, and t4. In this example, when client 510 knows what the actual FoV will be for time instant t2, it can compare that FoV(t2) with the received prefetched FoV, ML_FoV(t2). If FoV(t2)=ML_FoV(t2), then client 510 sends the interest message requesting ML_FoV(t5|t2). This nomenclature represents the request for interest(t5,Most Likely) based on the prior known FoV(t2). Here, function 804 updates the determining a future FoV from being based on knowing that FoV(t1) was requested at time t1, to being based on knowing ML_FoV(t2) was =FoV(t2) and is the FoV at time instants t2.

If FoV(t2)≠ML_FoV(t2), then client 510 sends interest messages requesting δ(FoV(t2),ML_FoV(t2)), δ(ML_FoV(t3|t2),ML_FoV(t3)), δ(ML_FoV(t4|t2),ML_FoV(t4)) and ML_FoV(t5|t2). The nomenclature δ(FoV(t2),ML_FoV(t2)) represents the request for the difference in FoV data between (1) a FoV having a center as specified in the interest message for FoV(t2), which is not equal to the center of ML_FoV(t2), and (2) a FoV having a center at the prior prefetched ML_FoV(t2). Here, the client requests the difference because client 510 already has the data for ML_FoV(t2). Here, also function 804 updates the determining a future FoV from being based on knowing that FoV(t1) was requested at time t1, to being based on now knowing that FoV(t2)≠ML_FoV(t2), and that FoV(t2) in the interest message is the FoV at time instants t2.

The nomenclature δ(ML_FoV(t3|t2),ML_FoV(t3)) represents the request for the difference in FoV data between (1) a FoV having a center for interest(t3,Most Likely) based on the center as specified in the interest message for FoV(t2), which is not equal to the center of ML_FoV(t2), and (2) a FoV having a center at the prior prefetched ML_FoV(t2). Again, the client requests the difference because client 510 already has the data for ML_FoV(t3).

The nomenclature δ(ML_FoV(t4|t2),ML_FoV(t4)) represents the request for the difference in FoV data between (1) a FoV having a center for interest(t4,Most Likely) based on the center as specified in the interest message for FoV(t2), which is not equal to the center of ML_FoV(t2), and (2) a FoV having a center at the prior prefetched ML_FoV(t4). Again, this is useful because client 510 already has the data for ML_FoV(t4).

Since client 510 did not prefetch a FoV for time instant t5, it also requests ML_FoV(t5) based on a FoV having a center as specified in the interest message for FoV(t2).

In this example 800, client 510 may instead or in addition, send a FoV interest message requesting "send me the ML_FoV at time t+1 based upon FoV at time t", to request the determined future FoV most requested to be provided by function 804 (e.g., with network intervention). Here, at time instant t1, client 510 may send the FoV interest message for FoV(t1) and interest for ML_FoV(t2). Then, at time instant t2, client 510 may send the FoV interest message for FoV(t2) and interest for ML_FoV(t3). This may continue for future time instants.

Figure 9:
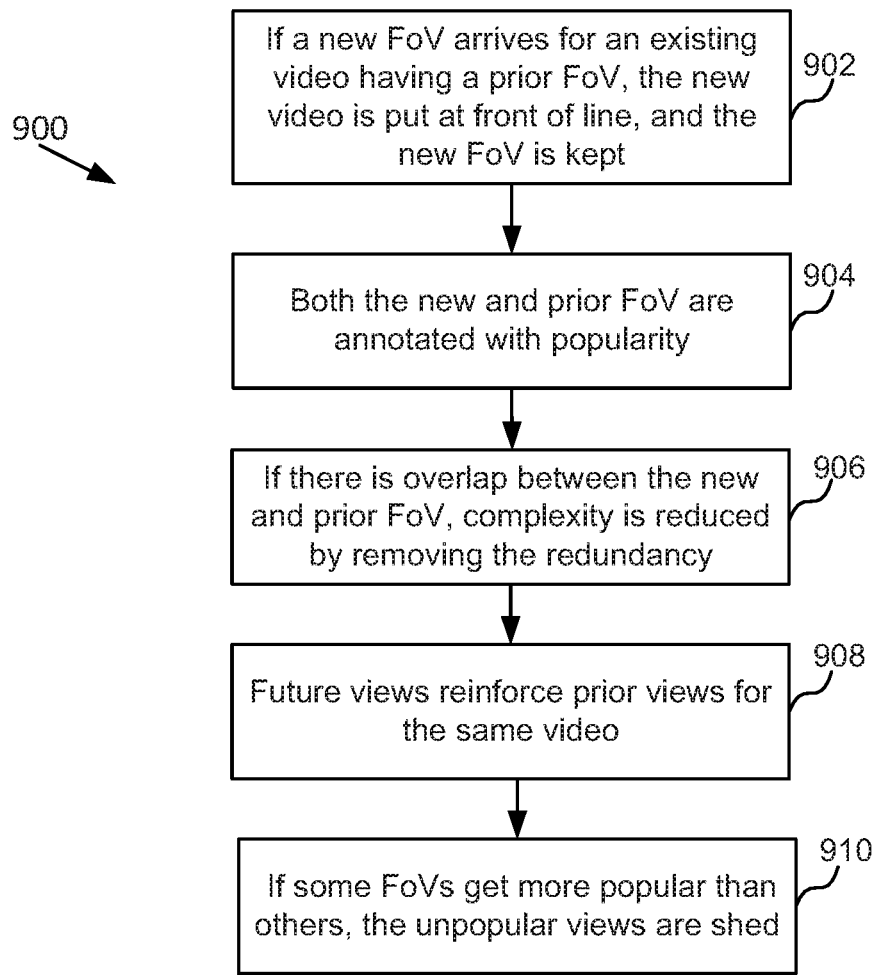
FIG. 9 is a flow diagram of a process for cache updating determined future FoVs for 360 degree video, according to example embodiments.

FIG. 9 is a flow diagram of a process for cache updating determined future FoVs for 360 degree video streams that are cached at nodes of an ICN, according to example embodiments. In some instances, process 900 is for a cache update mechanism that considers the popularity of video streams, evicting less popular views, and least recently used (LRU) views as related to caching or prefetching determined future FoVs for 360 degree video streams at nodes of in an ICN, according to example embodiments.

Process 900 may be applied to or applied by "caching related" function such as function 504 or 704 of FIGS. 5A-C and 7, respectively, or maps 520. In some instances, process 900 is applied to a caching related function such as: how the requested FoVs are collected by function 504, how the maps are created by maps 520, and/or how the determined future FoV is cached at function 704.

At 902, if a new FoV arrives in a request for FoV for an existing video having a prior FoV for that time instant, that video is given priority, such as by functions 704 and 804, and the new FoV is kept, such as by function 504. In some instances, at 902, if new a requested FoV arrives for an existing video of the caching related function, that video is given the highest priority for that function (e.g., it is put at front of line), and that new FoV is collected, added to the maps 520, and/or cached for that caching related function.

At 904, both the new and prior FoV are annotated with popularity (e.g., count or amount to which they are requested by users). In some instances, at 904, that new FoV and any other prior FoV for that video in the caching related function are annotated with the popularity.

At 906, if there is FoV overlap between the new and prior FoV, complexity is reduced by removing the redundancy. In some instances, at 906, if there is an overlap between that new FoV and any other prior FoV for that video in the caching related function, complexity in the caching related function is reduced by removing overlap so that there is one set of data for the FoV and no redundancy.

At 908, future views reinforce prior views for the same video. In some instances, at 908, when a new FoV is the same (e.g., has the same center coordinates) as any other prior FoV for that video in the caching related function, a counter is incremented for that FoV (e.g., for the first and/or second map as appropriate) to reinforce the popularity or number of requests of the prior view by adding that the view was requested in the future (e.g., new) view.

At 910, if some FoVs get more popular than others for the same video, the most unpopular FoV can be deleted or shed. In some instances, at 910, when a FoV becomes requested more frequently than a most unpopular FoV for the same video by more than a threshold, that most unpopular FoV can be ignored or dropped by the caching related function.

Such popularity may be determined by counting the number of requests collected for that FoV as compared to the number of requests collected for another FoV by the users at the same periodic time instant of the time period of the video stream.

According to some embodiments, process 900 may include positioning quantized FoVs requested in the interest messages (e.g., collected as in FIG. 5A or 6A) into counters or bins, and increment a count for that counter or bin for each same FoV (e.g. having the same center coordinates) that is collected. This may apply to creating the first map as described herein.

According to some embodiments, process 900 may include positioning quantized FoVs requested in the interest messages (e.g., collected as in FIG. 5A or 6A) into counters or bins, and increment a count for any of a transitional direction that is left, right, above or below (see FIG. 3) the quantized FoVs for each FoV (e.g. having the same center coordinates that is left, right, top (e.g., above), bottom (e.g., below) (see FIG. 3) the quantized FoVs) that is collected from an immediately prior or a current FoV. In some instances, these transitions can be quantized so that transitions are measured +/−1 in e/w (e.g., right/left), n/s (e.g., top/bottom) and each of these is a bin or counter for a number of views indication a plus for that direction of the transition to the next FoV.

Figure 10:
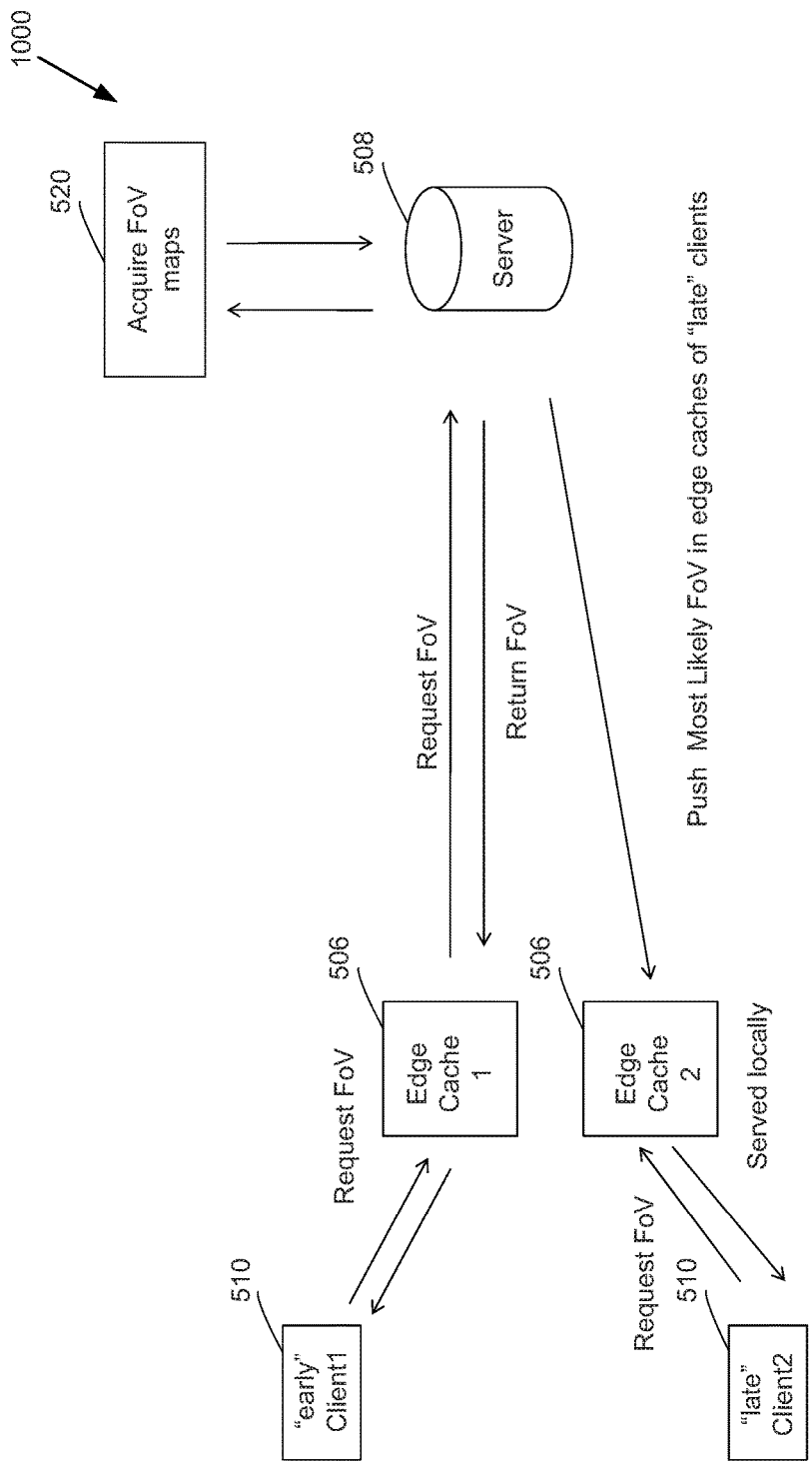
FIG. 10 illustrates an example 360 degree video stream determined future FoV caching for a 360 degree video stream at a live event, according to example embodiments.

According to embodiments, determining a future FoV (and caching it or prefetching it) can be used at a "live" event such as a sports, theater, music or other event. For example, FIG. 10 illustrates an example 1000 of 360 degree video stream determined future FoV caching for a 360 degree video stream in an ICN at a live event, according to example embodiments. At the live event, users (e.g., spectators that are in the event building or arena) may view the event in person (e.g., "live") and will view the event as a 360 degree video stream on a user device (e.g., device 110 or client 510). In some cases, the 360 degree video stream is of a live event being attended by users that include the one or more users as described herein as "early" client 1 users; and the particular or subsequent user as described herein as "late" client 2 users. The "early" client 1 users may be one set of users at the event, while different users at the event are the late" client 2 users. In some instances, the video provider or store determines or selects which users at the event will be are in the "early" client 1 and the late" client 2 users as noted below.

It is considered that in such a setting, a few seconds delay of the 360 degree video stream will be tolerated by the "late" client 2 users, and that these users may desire a view (e.g., FoV) that is customized (e.g., based on their personal behavior). In some instances, producing a determined future FoV for the live event may include functions 504, 704 and/or 804 testing or learning based on collected FoVs from some of the "early" client 1 users, in order to generate maps 520 for the "late" client 2 users at the event.

In some instances, for the live event, functions 504, 704 and/or 804 are server based functions that allow "early" client 1 users to download the video stream, and from the FoVs requested by these users, acquire the maps 520. In some instances, functions 504, 704 and/or 804 may then send the maps 520 to "late" client 2 users, e.g., users who have had their video streams of the event delayed. This may allow for sufficient and efficient prefetching of determined future FoVs for the "late" client 2 users, such as according to the maps 520 (e.g., clustering identified) created based on the interest messages collected from the first batch of users.

In some instances, for the live event, functions 504, 704 and/or 804 are network based functions (e.g., performed at an edge router or video producer of the event) that upon receiving requests for more than a threshold number of 360 degree video streams, create maps 520 at a cache (e.g., edge router or producer) and populate and edge router (e.g., wireless) with the most requested next FoVs of the stream as noted herein.

In some instances, for the live event, functions 504, 704 and/or 804 (at server(s) 508) include a "learning method" that collects the FoV interest messages received from a first batch of "early" client 1 users at 510 at the live event, and sends those FoV interest messages through routers (e.g., edge cache 1 at router 506) to server 508. Based on those messages, server 508 creates maps 520 (e.g., acquires FoV maps such as using function 504). Server 508 may then provide determined future FoVs (e.g., cached at edge cache 2 at 506) for "late" client 2 users at 510 at the live event. In some instances, the "early" client 1 users may be a first batch of users that are a sample group that is served with the streaming video a few seconds ahead of the "late" client 2 users which are a main batch or majority of the users at the event.

In some instances, clients are batched into "early" (served immediately, a small fraction, or a geographically co-located group at client 1 at 510) and "late" (served after a short set up delay at client 2 at 510) by server 508 (e.g., having maps 520), the video provider or store, such as described for providing a determined future FoV based on a first and/or second map of maps 520 as described for functions 504, 704 and/or 804.

In some embodiments, prefetching or caching (e.g., video streams for) the determined future FoVs of future time instants may be done using a "manifest" or "meta-data" sent to the user device. Such an embodiment may be described as "a method for network-assisted delivery of immersive 360 video streaming and virtual reality (VR)" and is now further discussed.

For example, according to embodiments, the first map 532 and/or second map 552 of FIGS. 5A-C; at step 604 and step 606 of FIG. 6A may be extracted by: a) a server (e.g., store 108, producer 425 or server 508, following requests from a specific 360 degree video stream viewing session by a user at device 110, one of users 410 or 415, or client 510); b) the network (e.g., a node 140, edge node or manager 104, if the FoV naming identifies the FoV such as by its center coordinates); c) a client (e.g., a user at device 110, one of users 410 or 415, or client 510). If the first map and/or second map is extracted by client or network, it can be shared back to server (say, at the end of session) or published to the network.

In some instances, the sharing of the first map 532 and/or second map 552 may be done using a 360 degree video streaming "manifest." In some embodiments, this manifest may be used to perform determining a future FoV at step 608 of FIG. 6A, caching at step 612 of FIG. 6B, caching by function 704 in FIG. 7, or prefetching by function 804 in FIG. 8.

In some instances, the first map 532 and second map 552 of maps 520 may include probabilities for each FoV of the sequence of popular FoVs along time instants of the first map 532, and probabilities of each of the FoV transitions along the time instants of the second map 552. In some embodiments, creating the sequence of popular FoVs along time instants at function 504, maps 520, map 532, function 704, or at step 604 may include determining and storing (e.g., as part of the first map 532) a probability for each of the popular FoVs along time instants of the video stream, according to the FoV interest messages from the one or more users. The stored sequence with these probabilities for each FoV of the sequence of popular FoVs of the first map 532 of maps 520 may be described as first map 532 (e.g., of maps 520) "with probabilities."

In some instances, referring to FIG. 5B, the first map 532 of maps 520 with probabilities includes the probability of each of the popular FoVs in the sequence of popular FoVs, such as for periodic time instants (e.g., segments) t1, t2, . . . tn as popular FoVs having centers of FoV (e.g., in direction) $(\alpha,\beta)$ with probability $p(\alpha,\beta)$. For example, in the sequence, the popular FoV 534 (e.g., most frequently requested) FoV1 at time t1 may have center $(\alpha 1,\beta 1)$ with probability $p1(\alpha 1,\beta 1)$, the popular FoV 536 (e.g., most frequently requested) FoV2 at time t2 may have center $(\alpha 2,\beta 2)$ with probability $p2(\alpha 2,\beta 2)$; . . . and popular FoV 538 (e.g., most frequently requested) FoVn at time tn may have center $(\alpha n,\beta n)$ with probability $pn(\alpha n,\beta n)$.

In some instances, these probabilities are percentages of the one or more users who requested that popular FoV of the popular FoVs along time instants of the video stream as indicated in the FoV interest messages. In one particular example providing probability percentages and FoV directions (e.g., using the 6 FoV example of FIG. 3), the popular FoV 534 of the popular FoVs along time instants of the video stream FoV1 at time t1 may have center $(\alpha 1,\beta 1)$ of left tile 320 with probability p1=80% for center $(\alpha 1,\beta 1)$, the popular FoV 536 of the popular FoVs along time instants of the video stream FoV2 at time t2 may have center $(\alpha 2,\beta 2)$ of center tile 310 with probability p2=46% for center $(\alpha 2,\beta 2)$; . . . and popular FoV 538 of the popular FoVs along time instants of the video stream FoVn at time tn may have center $(\alpha n,\beta n)$ of bottom tile 350 with probability pn=62% for center $(\alpha n,\beta n)$.

In some embodiments, creating FoV transitions along time instants at function 504, maps 520, map 552, function 704, or at step 606 may include determining and storing (e.g., as part of the second map 552) probabilities of each of the FoV transitions along time instants of the video stream, according to the FoV interest messages by the one or more users. The stored sequence with these probabilities for each FoV transition of the FoV transitions of the second map 552 of maps 520 may be described as second map 552 (e.g., of maps 520) "with probabilities."

In some instances, the second map 552 of maps 520 with probabilities includes the probability of each of the FoV transitions at each of the time instants, such as for time instants (e.g., segments) t1, t2, . . . tn FoV transitions at each of the periodic time instants to centers of FoV (e.g., in direction) $(\alpha,\beta)$ with transition probability $p(\alpha,\beta)$.

As discussed above referring to FIG. 5C, the second map 552 of maps 520 may include the probabilities for multiple possible FoV1's transitions at time t1, each of those FoV1's 560 and 566 having multiple possible transitions 562, 564 and 567 from that FoV1 at time t1 to a FoV2 563, 565 and 568 at time t2. Similarly, the second map of maps 520 may include the probabilities for multiple possible FoV2's transitions at time t2, each of those FoV2's 565 having multiple possible transitions 572, 575 and 577 from that FoV2 at time t2 to a FoV3 574, 576 and 578 at time t3. This may carry on to second map of maps 520 may including the probabilities for multiple possible FoV(n−1)'s transitions at time tn−1, each of those FoV(n−1)'s 580 having multiple possible transitions 582 and 586 from that FoV(n−1) at time t(n−1) to a FoVn 584 and 588 at time tn.

In some instances, the sharing of the first map 532 and/or second map 552 of maps 520 with probabilities, may be done using a 360 degree video streaming manifest. In some embodiments, this manifest may be used to perform determining future FoVs at step 608 of FIG. 6A, caching at step 612 of FIG. 6B, or caching by function 704 in FIG. 7. In some instances, the manifest may be shared from a server collecting the user interest messages to a client of a particular (e.g., subsequent or new) user who views the video.

FIG. 11 illustrates an example 1100 of a 360 degree video stream determined future FoV manifest function 1104, according to example embodiments. Example 1100 shows FoV manifest function 1104 including client 510, edge router 506 and server 508. In function 1104, client 510 includes video client 1110 such as a 360 degree video display device and prediction agent 1112, such as for determining a future FoV of future time instants at client 510 using a manifest. In function 1104, sever 508 includes manifest 1106 and data 1108. In some instances, data 1108 includes FoV monitoring function 504, such as for creating maps 520.

In some cases, agent 1112 may be capable of determining, caching or prefetching the video streams for the future FoVs of future time instants at a client device using a manifest, where the particular user is viewing the 360 degree video stream, wherein the video streams for the future FoVs are determined, cached or prefetched prior to the future time instants for the particular user viewing the 360 degree video stream.

Example 1100 may be described as a manifest use case example that sends a manifest including the determined future FoVs or FoV transitions with probabilities using first map 532 and/or second map 552 to client 510 so that the client can select or determine which future FoV from the maps to prefetch and/or cache.

In some instances, function 1104 is performed at two of nodes 140 (e.g., a network control plane, such as client 510, edge router 506 and/or server 508). In some instances, function 1104 is performed at 360 degree video stream producer 508 (e.g., producer 425 or store 108) and client computer 510 (e.g., device 110).

In some instances, providing the prefetched determined future FoV centered at $(\alpha 2,\beta 2)$ for time t2 is done by using a FoV interest message requesting this prefetched FoV sent by node 140 which is client 510. In this case, client 510 may have downloaded or been sent (e.g., by function 804 at an edge router 506 or server 508) the first map and/or second map of FIGS. 5A-C; or at step 608 of FIG. 6A.

As previously discussed, maps 532 and 552 may include probabilities of each popular FoV and FoV transition along the time instants. Consequently, in this instance, data 1108 may also contain these probabilities. In some instances, manifest 1106 also includes these probabilities, such as due to function 1100 (e.g., server 508) creating the manifest 1106 with these probabilities. In some descriptions, manifest 1106 may be linked to or have access to data 1108 which includes FoV monitoring function 504, such as for creating maps 532 and 552 with these probabilities. In some embodiments, function 1104, data 1108 or manifest 1106 may include the first map 532 and second map 552 with probabilities.

In some instances, manifest function 1104 includes server 508 delivering manifest 1106 to the client device 510 at a start of transmission or periodically during transmission of the 360 degree video stream to the client. This may be done spontaneously at these time instants by the server or in response to a manifest interest message as noted below.

In general, function 1104 may include performing function 704's caching determined future FoVs for video client 1110 at prediction agent 1112 of client 510. In some cases, function 1104 may include prefetching determined future FoVs for video client 1110 at prediction agent 1112 of client 510. Here, function 1104 may include prediction agent 1112 requesting a manifest using manifest interest message; receiving the manifest in a manifest data message; and using the manifest (having maps 532 and 552 with probability) to determine a future FoV of future time instants for a particular current user (e.g., a user viewing the video stream after the creation of the maps); then sending a FoV interest messages for a determined future FoVs of future time instants (e.g., determined using or based on the manifest) for time instants t1, t2, . . . tn.

In some instances, maps 532 and 552 may be stored in the memory of client 510 (e.g., a memory of or accessible by agent 1112). Determining the future FoVs for time instants t1, t2, . . . tn may include agent 1112 looking up or querying the sequence of popular FoVs of map 532 along time instants t1, t2, . . . tn, or the FoV transitions of map 552 along the time instants t1, t2, . . . tn to predict or determine future FoVs of future time instants for the particular user. Upon receipt of these FoV interest messages, edge router 506 or server 508 may satisfy those messages with FoV data messages having the data for the FoVs requested.

In some examples, FIG. 11 shows function 1104 including client 510 (e.g., agent 1112) sending a manifest interest message, interest(manifest), requesting a manifest (e.g., manifest 1106) from server 508. This message is transmitted from client 510, through edge router 506 and to server 508 as shown by the arrows.

Next, function 1104 includes server 508 sending a manifest data message, data(manifest), having the manifest (e.g., manifest 1106) to client 510 (e.g., agent 1112) in response to the interest message request. This message is transmitted from server 508, through edge router 506 and to client 510 as shown by the arrows.

Here, manifest 1106 may include a video name, such as the name of the video currently being viewed by the particular user at client 510, and for which the manifest has information (e.g., maps 520, etc. as described herein). Also, manifest 1106 may include a name for each time segment (e.g., t1, t2, . . . tn); and the following for each time segment: a name for each tile $(\alpha,\beta)$ FoV (e.g., FoV $(\alpha x,\beta x)$) of the sequence of popular FoVs, a transition probability (e.g., for FoV transition directions up,down,left,right) for each current $(\alpha,\beta)$ FoV of the FoV transitions, or a most likely transition from each current $(\alpha x,\beta x)$ FoV to a next FoV $(\alpha y,\beta y)$ of the FoV transitions. In some cases it may also include resolution of each current $(\alpha x,\beta x)$ FoV of the sequence of popular FoVs and next FoV $(\alpha y,\beta y)$ of the FoV transitions. In some cases it may also include data rate variations from each current $(\alpha x,\beta x)$ FoV to the next FoV of the sequence of popular FoVs; and from each current $(\alpha x,\beta x)$ FoV to a next FoV $(\alpha y,\beta y)$ of the FoV transitions. These data rate variations may be described as data rate variations for the video streams for the determined future FoVs of the future time instants. In some cases it may also include other parameters of a video manifest, such as those for a dynamic adaptive streaming over hypertext transfer (or transport) protocol video (e.g., DASH).

In some instances, manifest 1106 may include a name for and a probability for each of the popular FoVs along time instants (e.g., first map 532 with probabilities); and a name for and a probability for each of the FoV transitions along the time instants (e.g., second map 552 with probabilities). In other instances, manifest 1106 may include a name for and a probability for each of the popular FoVs; or a name for and a probability for each of the FoV transitions.

In some instances, manifest 1106 may include a resolution of each of the popular FoVs along time instants and of each of the FoV transitions along the time instants. In some cases, such a resolution may include a pixel resolution or the number of pixels included in each of the popular FoVs and each of the FoV transitions.

In some instances, manifest 1106 may include data rate variations for the video streams for the determined future FoVs of the future time instants. In some cases, such data rate variations may include future rate variations for joint rate adaptation. In one example, server 508 determines and manifest 1106 includes rate variations that may indicate to client 510 (e.g., agent 1112) that the next 10 seconds in a direction or FoV of a video stream to be sent to the client are high paced action, as compared with the slow paced action of the current part of the stream in terms of actual bandwidth versus resolution. For example, the next X number of seconds of a video stream in a specific direction may have pixels that are changing at a rate over the time instants that is faster or slower than the change in the prior and current time instants for that direction. For instance, in a 360 video stream, there may be no action overhead in the top tile, even though the pace of the action may be changing more quickly on the horizon line in the front, left or right tile.

In some cases, such data rate variations may include a factor that states or identifies that the next FoV will be $\rho$ times current FoV bandwidth requirements where $\rho<1$ means bandwidth reduction while $\rho>1$ means bandwidth increase of the next FoV as compared to the current FoV. In some instances, a rate adaptation mechanism of agent 1112 can then adapt which determined future FoV it will request in a FoV interest message, based upon the current rate, measured bandwidth and potential data variation ($\rho$) for the next FoV. In some cases, such data rate variations are based on the number of pixels in the next FoV (e.g., the determined future FoVs of the future time instants); the number pixels that change from the current to the next FoV; or the bandwidth required in the network to transmit those pixels from the server or an edge router to the client.

In some instances, manifest 1106 may include (1) a coordinate center and resolution of each of the popular FoVs along time instants and each of the FoV transitions along the time instants; and (2) data rate variations for the video streams for the future FoVs of the future time instants. In other instances, manifest 1106 may include (1) a coordinate center and resolution of each of the popular FoVs and each of the FoV transitions; or (2) data rate variations for the video streams for the future FoVs.

FIG. 11 shows function 1104 including client 510 (e.g., agent 1112) using the manifest (having maps 532 and 552 with probability, resolution and data rate variation) to determine a future FoV of future time instants for a particular current user (e.g., a user viewing the video stream after the creation of the maps).

In some instances, manifest 1106 from server 508 is now stored in a memory of client 510 (e.g., a memory of or accessible by agent 1112). Predicting or determining the future FoVs for time instants t1, t2, . . . tn may include agent 1112 looking up or querying the sequence of popular FoVs of map 532 along time instants t1, t2, . . . tn, or the FoV transitions of map 552 along the time instants t1, t2, . . . tn to identify the determined future FoVs of future time instants for the particular user. Determining the future FoVs for time instants t1, t2, . . . tn may also include agent 1112 considering the resolution provided in the manifest for each of the popular FoVs and/or each of the FoV transitions, such as described above. Determining the future FoVs for time instants t1, t2, . . . tn may also include agent 1112 considering the data rate variations provided in the manifest for the video streams for the future FoVs of the future time instants, such as described above.

In some case, determining the future FoVs for time instants t1, t2, . . . tn for a particular current user may be based on map 532 with probability, map 552 with probability, the resolutions, and the data rate variations in the manifest. In some case, it may be based on map 532 or map 552 with probability, the resolutions, and the data rate variations in the manifest. In either of the above cases it may or may not be based on the resolutions in the manifest. In either of the above cases it may or may not be based on the data rate variations in the manifest.

FIG. 11 shows function 1104 including client 510 (e.g., agent 1112) sending a FoV interest messages, interest(t1,α1, β1) for current time instant t1, and interest(t2,α2,β2) for determined future FoV of future time instant t2, requesting two FoVs from server 508. In this case, interest(t1,α1,β1) may be for the view the user currently desires and interest (t2,α2,β2) maybe for a determined future FoV for time instant t2 that agent 1112 has determined using manifest 1106 received from server 508 as described herein.

In one instance, any of these two FoV interest messages that is satisfied by edge router 506 may be transmitted from client 510 to edge router 506 as shown by the arrows. In this instance, FoV data requested by client 510 (e.g., agent 1112) in the FoV interest messages may be satisfied or replied to with responsive FoV data messages supplied by function 1104 in cooperation with function 704 such as where the FoV interest message at t2 is satisfied by edge router 506 due to caching of the determined future FoV as described for function 704. For example, in this case, interest(t2,α2,β2) for a determined future FoV may be satisfied by determined future FoV cached at edge router 506 by function 504 or 704.

In another instance, any of these two FoV interest messages that is satisfied by server 508 may be transmitted from client 510, through edge router 506 and to server 508. In this instances, FoV data requested by client 510 (e.g., agent 1112) in the FoV interest messages may be satisfied or replied to with responsive FoV data messages supplied by function 1104 in cooperation with function 504 such as where the maps 520 include the probability of each FoV and each transition probability of function 1104.

In some embodiments, the sharing of the second map 552 of maps 520 with probabilities, may be done using "meta-data" transmitted to the client along with the video streams for the future FoVs of the future time instants. In some embodiments, this meta-data may be used to perform determining future FoVs at step 608 of FIG. 6A, caching at step 612 of FIG. 6B, or caching by function 704 in FIG. 7. In some instances, the meta-data may be shared from a server collecting the user interest messages to a client of a particular (e.g., subsequent or new) user who views the video.

Figure 12:
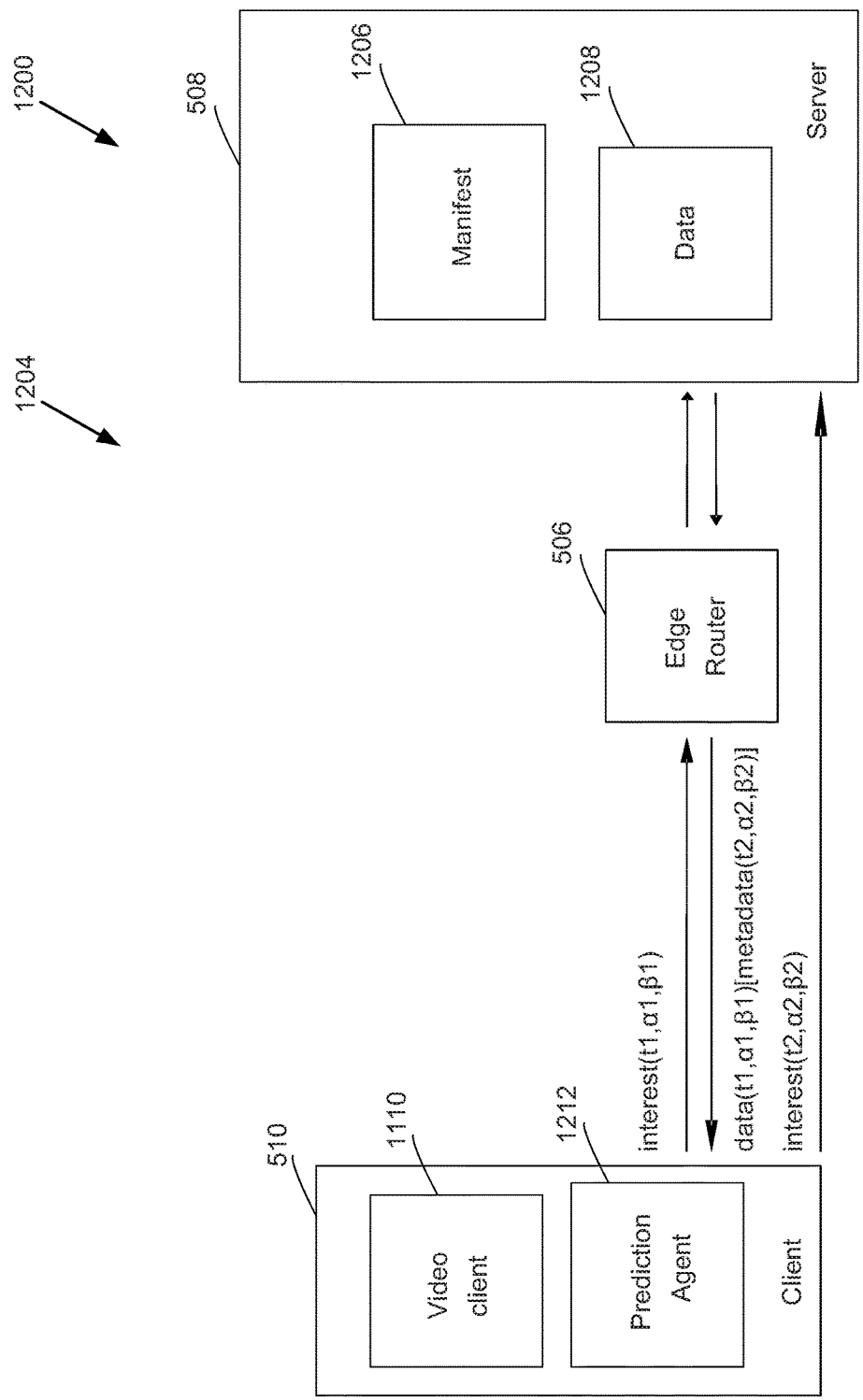
FIG. 12 illustrates an example 360 degree video stream determined future FoV meta-data function, according to example embodiments.

FIG. 12 illustrates an example 1200 of a 360 degree video stream determined future FoV meta-data function 1204, according to example embodiments. Example 1200 shows FoV manifest function 1204 including client 510, edge router 506 and server 508. In function 1204, client 510 includes video client 1110 prediction agent 1212, such as for determining a future FoV of future time instants at client 510 using meta-data. In function 1204, sever 508 includes manifest 1206 and data 1208. In some instances, data 1208 includes FoV monitoring function 504, such as for creating maps 520.

In some cases, agent 1212 may be capable of determining, caching or prefetching the video streams for the future FoVs of future time instants at a client device using meta-data, where the particular user is viewing the 360 degree video stream, wherein the video streams for the future FoVs are determined, cached or prefetched prior to the future time instants for the particular user viewing the 360 degree video stream.

Example 1200 may be described as a meta-data alternative to a manifest use case example that sends meta-data including the determined future FoV transitions with probabilities using second map 552 to client 510 so that the client can select or determine which future FoV or FoV transition from the map to prefetch and/or cache.

In some instances, function 1204 is performed at two of nodes 140 (e.g., a network control plane, such as client 510, edge router 506 and/or server 508). In some instances, function 1204 is performed at 360 degree video stream producer 508 (e.g., producer 425 or store 108) and client computer 510 (e.g., device 110).

In some instances, providing the prefetched determined future FoV centered at (α2,β2) for time t2 is done by using a FoV interest message requesting this prefetched FoV sent by node 140 which is client 510. In this case, client 510 may have downloaded or been sent (e.g., by function 804 at an edge router 506 or server 508) the second map of FIGS. 5A-C; or at step 608 of FIG. 6A, without the first maps.

As previously discussed, map 552 may include probabilities of each FoV transition along the time instants. Consequently, in this instance, data 1208 may also contain these probabilities. In some instances, manifest 1206 also includes these probabilities, such as due to function 1200 (e.g., server 508) creating the manifest 1206 with these probabilities. In some descriptions, manifest 1206 may be linked to or have access to data 1208 which includes FoV monitoring function 504, such as for creating map 552 with these probabilities. In some embodiments, function 1204, data 1208 or manifest 1206 may include second map 552 with probabilities.

In some instances, manifest function 1204 includes server 508 delivering meta-data based on manifest 1206 to the client device 510 with the FoV data messages sent in response to the FoV interest messages sent by client device 510 during transmission of the 360 degree video stream to the client. This may be done automatically by the server in response to the FoV interest message as noted below.

In general, function 1204 may include performing function 704's caching determined future FoVs for video client 1110 at prediction agent 1112 of client 510. In some cases, function 1104 may include prefetching determined future FoVs for video client 1110 at prediction agent 1212 of client 510. Here, function 1204 may include prediction agent 1212 requesting a FoV using a FoV interest message; receiving the requested FoV in a FoV data message that includes meta-data having a mostly requested FoV transition or transition direction; and using the meta-data (having map 552 with probability) to determine a future FoV of future time instants for a particular current user (e.g., a user viewing the video stream after the creation of the maps); then sending a FoV interest messages for a determined future FoVs of future time instants (e.g., determined using or based on the meta-data) for time instants t1, t2, . . . tn.

In some instances, map 552 may be stored in the memory of client 510 (e.g., a memory of or accessible by agent 1212). Determining the future FoVs for time instants t1, t2, . . . tn may include agent 1212 looking up or querying the FoV transitions of map 552 along the time instants t1, t2, . . . tn to predict or determine future FoVs of future time instants for the particular user. Upon receipt of these FoV interest messages, edge router 506 or server 508 may satisfy those messages with FoV data messages having the data for the FoVs requested. It can be appreciated that the FoV data messages may have meta-data for the subsequent or next determined future FoV. In some cases, each FoV interest message and FoV data message reply (with meta-data) may be for a subsequent or next determined future FoV.

In some examples, FIG. 12 shows function 1204 including client 510 (e.g., agent 1212) sending a FoV interest message, interest(t1,α1,β1), requesting a FoV for time instant t1 from server 508. This message is transmitted from client 510, through edge router 506 and to server 508 as shown by the arrows.

Next, function 1204 includes server 508 sending a FoV data message having FoV data, data(t1,α1,β1), and having meta-data, [metadata(t2,α2,β2)], for a subsequent or next determined future FoV based on map 552 (e.g., based on manifest 1206) to client 510 (e.g., agent 1212), in response to the FoV interest message. This message is transmitted from server 508, through edge router 506 and to client 510 as shown by the arrows.

In some embodiments, such meta-data may be include as part of the meta-data of the FoV data message, such as in a specific transport/application header. It may be included as part of the meta-data of the FoV data message, in various ways.

In some instances, the meta-data may include the mostly requested next FoV of the FoV transitions, after the current FoV that is included in the FoV data message. In some cases, it may include a most frequently requested FoV transition from the currently FoV of the FoV data message, in the application header by having data that states that from current FoV (αx,βx) of the FoV data message, FoV(αy,βy) is the most requested next view with probability p'. For FIG. 12 [metadata(t2,α2,β2)] may include meta-data identifying or determining based on the FoV transitions, that from current FoV having data(t1,α1,β1) of the FoV data message, a FoV having data(t2,α2,β2) is the most requested next view with probability p'.

In some instances, the meta-data may include a video name, such as the name of the video currently being viewed by the particular user at client 510, and for which the meta-data has information (e.g., map 552, etc. as described herein). Also, the meta-data may include a name for each time segment (e.g., t1, t2, . . . tn); and the following for each time segment: a transition probability (e.g., for FoV transition directions up, down, left, right) for each current (α,β) FoV of the FoV transitions, or a most likely transition from each current (αx,βx) FoV to a next FoV (αy,βy) of the FoV transitions. In some cases it may also include resolution of each current (αx,βx) FoV and of each next FoV (αy,βy) of the FoV transitions. In some cases it may also include data rate variations from each current (αx,βx) FoV to a next FoV (αy,βy) of the FoV transitions. These data rate variations may be as described for function 1104 and FIG. 11.

In some instances, the meta-data may include a name for and a probability for each of the FoV transitions along the time instants (e.g., second map 552 with probabilities). In some instances, the meta-data may include a resolution of each of the FoV transitions along the time instants. In some cases, such a resolution may include a pixel resolution or the number of pixels included in each of the FoV transitions. In some instances, the meta-data may include data rate variations for the video streams for the determined future FoVs of the future time instants, as described for function 1104 and FIG. 11.

In some instances, the meta-data may include: (1) a coordinate center and resolution of each of the FoV transitions along the time instants; and (2) data rate variations for the video streams for the future FoVs of the future time instants. In other instances, manifest 1106 may include (1) a coordinate center and resolution of each of the FoV transitions; or (2) data rate variations for the video streams for the future FoVs.

FIG. 12 shows function 1204 including client 510 (e.g., agent 1212) using the meta-data (e.g., based on data from map 552 with probability, resolution and data rate variation) to determine a future FoV of future time instants for a particular current user (e.g., a user viewing the video stream after the creation of the maps).

In some instances, the meta-data from server 508 is stored in a memory of client 510 (e.g., a memory of or accessible by agent 1212). Predicting or determining the future FoVs for time instants t1, t2, . . . tn may include agent 1212 looking up or querying the meta-data (e.g., information based on the FoV transitions of map 552 along the time instants t1, t2, . . . tn to identify the determined future FoVs of future time instants for the particular user. Determining the future FoVs for time instants t1, t2, . . . tn may also include agent 1212 considering the resolution provided in the manifest for each of the FoV transitions, such as described above. Determining the future FoVs for time instants t1, t2, . . . tn may also include agent 1212 considering the data rate variations provided in the meta-data for the video streams for the future FoVs of the future time instants, such as described above.

In some case, determining the future FoVs for time instants t1, t2, . . . tn for a particular current user may be based on meta-data including FoV transitions of map 552 with probability, the resolutions, and the data rate variations in the meta-data. In some case, it may or may not be based on the resolutions in the manifest. In some case, it may or may not be based on the data rate variations in the manifest.

FIG. 12 shows function 1204 including client 510 (e.g., agent 1212) sending a FoV interest message, interest(t2,α2,β2) for determined future FoV of future time instant t2, requesting a FoV from server 508. In this case, interest(t2, α2,β2) maybe for a determined future FoV for time instant t2 that agent 1212 has determined using the meta data, [metadata(t2,α2,β2)], received from server 508 with data (t1,α1,β1).

In one instance, this FoV interest messages that is satisfied by edge router 506, as described for function 1104 and FIG. 11. In another instance, this FoV interest messages that is satisfied by server 508, as described for function 1104 and FIG. 11.

As previously discussed, it may be beneficial to reduce the bandwidth of a network consumed by streaming 360 degree video FoV interest messages from a video provider or server, to a user or viewer device. Embodiments described herein can reduce such bandwidth by prefetching or caching (e.g., video streams for) determined future FoVs of future time instants for a particular user viewing the 360 degree video. For example, functions 1104 and 1204 of FIGS. 11 and 12 give examples where based upon network bandwidth and a determined future FoV (from a manifest or meta-data with a current FoV data message), the client (e.g., agent 1112 or 1212) can request the determined future FoV ahead of time (e.g., prior to knowing what it will be based on user behavior), while the previous chunk (e.g., the current FoV) is still in the playback buffer of the user device. In some instances, such prefetching or caching improves quality of experience of the user's viewing of the video since the determined future FoV selected has higher resolution than the rest of the views.

In some instances, functions 1104 and 1204 provide data to the user device to allow the device to effectively predict most likely FoV (e.g., as the determined future FoV). Here, functions 1104 and 1204 are able to download the most requested future FoV ahead of time based upon current view. Downloading the most requested future FoV ahead of time can reduce both FoV prediction error (e.g. for determining future FoVs) and bandwidth consumption over the network.

In some embodiments, predicting, prefetching and caching a determined future FoVs of the video stream may include requesting the FoVs with additional height and width based on movement of coordinate centers in a history of requested prior FoVs by the user may be described as "a method for network-assisted motion-based FoV adaptation for virtual reality (VR) and 360 video streaming" and is now further discussed.

Figure 13:
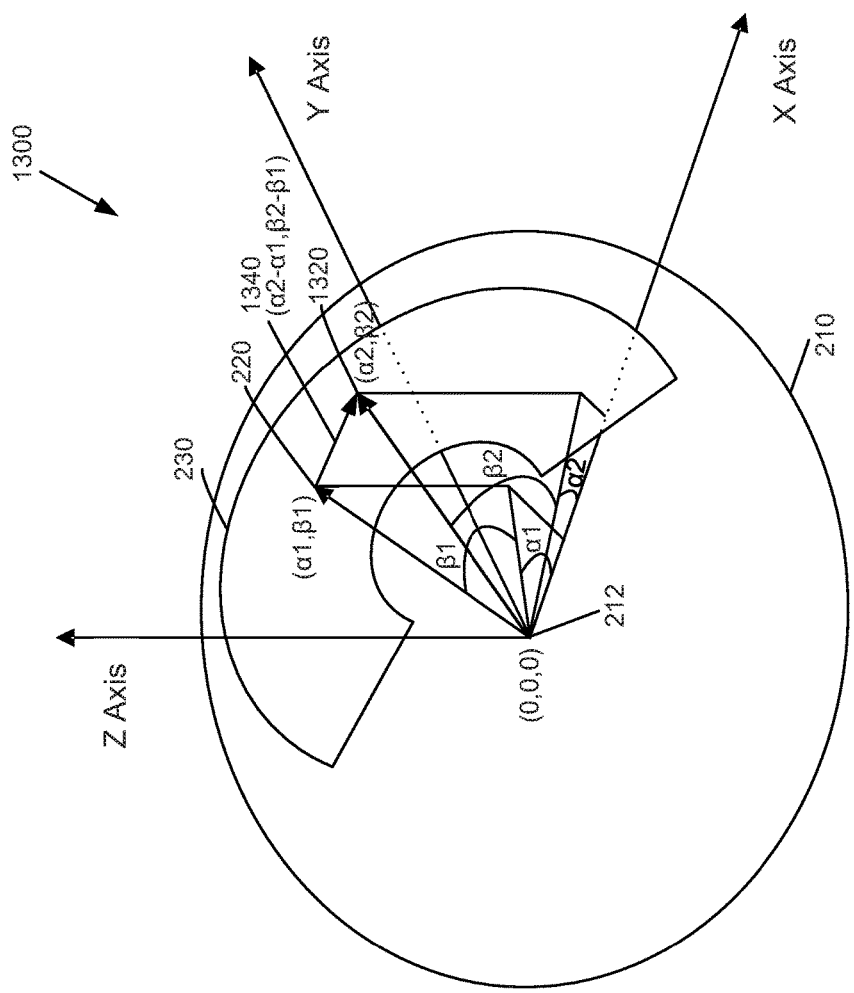
FIG. 13 illustrates an example 360 degree video stream movement of FoV centers, according to example embodiments.

FIG. 13 illustrates an example 1300 of 360 degree video stream movement of FoV centers defined in spherical coordinates, according to example embodiments. Some of the features and descriptions for example 1300 are similar to those of example 200 of FIG. 2.

FIG. 13 includes a different specific FoV (e.g., not shown to avoid confusion in the figure, representing a "next" FoV) having a center 1320 at ($\alpha 2,\beta 2$) defined in spherical coordinates of example 1300. FIG. 13 shows center 1320 defined in spherical coordinates as being at ($\alpha 2,\beta 2$) 1320 for coordinate center 212. It can be said that ($\alpha 2,\beta 2$) points in spherical coordinates to the center of this next FoV. In some instances, this next FoV may be identified or described by the vector in spherical coordinates pointing from the origin (0,0,0) in the direction of center of the FoV at center ($\alpha 2,\beta 2$).

FIG. 13 shows motion 1340 from FoV 230 (e.g., representing a "current" FoV) center 220 at ($\alpha 1,\beta 1$) to different specific FoV (e.g., representing a "next" FoV) center 1320 at ($\alpha 2,\beta 2$). Motion 1340 is shown as ($\alpha 2-\alpha 1,\beta 2-\beta 1$).

It can be appreciated that other coordinate systems may be used, such as described for FIG. 2. Also, in some embodiments, the video stream of FIG. 13 may be a 360 degree video stream in an ICN, such as described for FIG. 2.

In some embodiments, a FoV is defined as the area corresponding to a 90 degree vertical angle (e.g., along $\beta$) and a 120 horizontal angle (e.g., along $\alpha$) such that (0,0) is in the middle. In this example, the FoV may be a rectangle from (−60,60) degree horizontally from center ($\alpha,\beta$) defined at $\alpha=0$, and (−45,45) degree vertically from center ($\alpha,\beta$) defined at $\beta=0$. In this example, current FoV 230 may be a rectangle from (−60,60) degree horizontally and (−45,45) degree vertically from center 220 at ($\alpha 1,\beta 1$). In this example, the next FoV may be a rectangle from (−60,60) degree horizontally and (−45,45) degree vertically from center 1320 at ($\alpha 2,\beta 2$).

In some embodiments, based upon an "amount" (e.g., a direction, and distance or speed) of motion of the FoV current center 220 and next center 1320 requested (e.g., from the prior FoV to the current FoV, such as based on the user's behavior or movement of a headset), future FoV can be determined. For instance, a FoV interest message for a determined future FoV can include a future FoV additional width and height "buffer" which varies with an amount of the motion (e.g., in the width and height directions between the current and next FoVs) (e.g., see at 1610 of FIG. 16). In some instances, the amount of motion of the centers can be calculated or measured by the derivative of the position of the next center as compared to the current center.

In some examples, an increased amount of motion of the current and next centers in a specific direction increases the additional width and height "buffer" of the future FoVs in or towards the direction of that motion. It can be appreciated that, the greater the motion or movement of the FoV centers in the video being watched, the greater the added width and/or height, the more the size of a determined future FoV, and thus the lower the amount of resolution can be and/or the longer the time required for the FoV to reach the client.

In some examples, adding the additional width and height to the future FoVs being requested in interest messages by the user viewing the video stream can be used to prefetch determined future FoVs of future time instants for a particular user viewing the video (and requesting the current next and future FoVs) transmitted or streamed through a network (e.g., ICN), based upon motion prediction at the network layer (e.g., a client device, a user device, an edge router, a network manager, a network controller, or a video stream provider).

Figure 14:
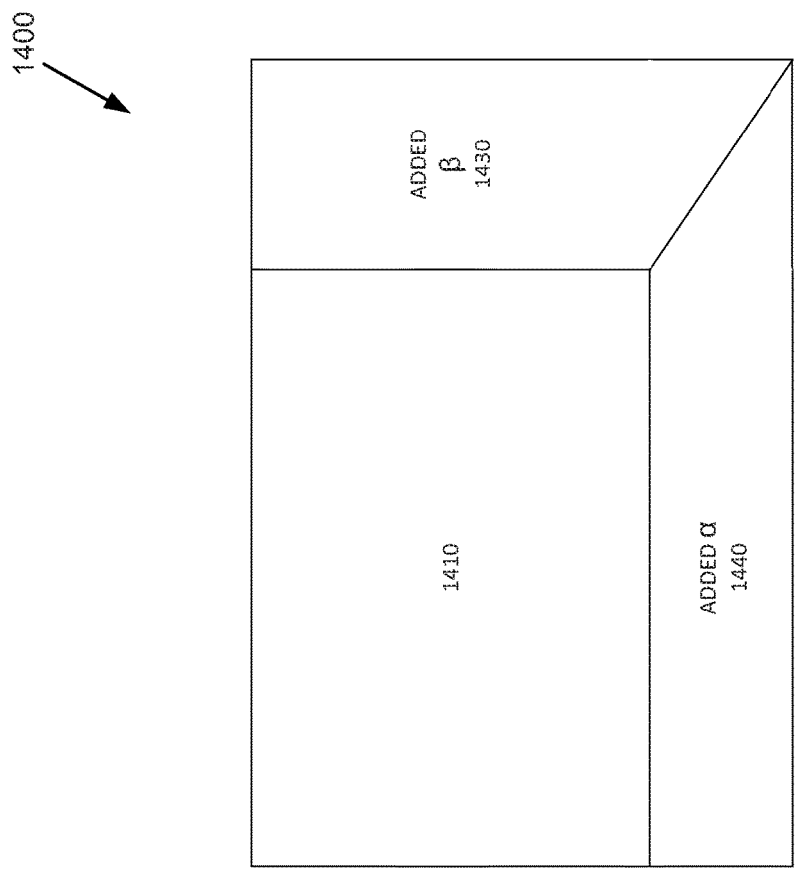
FIG. 14 illustrates an example 360 degree video stream FoV center having added width and height, according to example embodiments.

FIG. 14 illustrates an example 1400 of a 360 degree video stream FoV center having added width and height, according to example embodiments. Example 1400 shows front tile 1410 of a future FoV at a time instant of the 360 degree video stream of FIG. 13, after next FoV having center 1320. In some cases, front tile 1410 represents front tile such at FoV 230 of FIG. 2. In some cases, front tile 1410 represents front tile such at tile 310 of FIG. 3.

In some embodiments, front tile 1410 is a front tile or front FoV of a next FoV, such as a FoV having center 1320. Front tile 1410 may also be a front tile of a determined future FoV of future time instants for a particular user viewing the 360 degree video stream. In some instances, in addition to front tile 1410, the determined future FoV also includes additional width and/or height based on the direction and amount of motion of the current and next FoVs (e.g., based on a history of requested FoVs by the user).

Example 1400 shows added $\alpha$ 1440 as additional width added to front tile 1410, and added $\beta$ 1430 as additional height added to front tile 1410. In some instances, example 1400 shows a determined future FoV of future time instants for a particular user as front tile 1410 with added $\alpha$ 1440 as additional width and added $\beta$ 1430 as additional height. In some cases, due to the direction of the motion, either additional width or height is added. In other cases, due to the direction of the motion, both additional width and height are added.

According to embodiments, it is possible to collect FoV interest messages from one user (e.g., a particular user) viewing the 360 degree video stream, to determine or calculate the amount of motion of the centers of FoVs from the current to the next FoV. This collecting may track the evolution of (α, β) centers of FoVs between consecutive FoV interest message FoV center requests. Based on the direction and amount of motion of the centers, the added α 1440 as additional width added to front tile 1410, and added β 1430 as additional height added to front tile 1410 can be adjusted so that a determined future FoV including the front tile 1410, added α 1440, and added β 1430 may successfully predict and prefetch the future FoV. This future FoV may be successfully predicted and prefetched because the determined future FoV has the added width and height that overlaps or partially overlaps a future FoV the user will actual request after the next FoV.

In some embodiments, the requested tiles in the next FoVs have FoV centers at (α, β), and the additional height (added β 1430) and width (added α 1440) add tiles in the window centered at (α, β)+(∂α/∂t, ∂β/∂t)τ with τ being the time between two requests. In some cases, τ can be the RTT to get the responsive data message back from the server in response to an interest message sent by the user device. In our example where the FoV center tile (e.g., tile 1410) is 120 degrees wide and 90 degrees high, the determined future FoV requested can be for tiles covering the width (α−60−εw,α+60+εw) and the height (β−45−εh,β+45+εh) where (α,β) is the center coordinate of the next FoV requested in the FoV interest message; 60 and 45 are the degrees beside and above/below the center for tile 1410; εw is additional width added to the (e.g., history of the requested) next FoVs based on the calculated motion; and εh is additional height added to the (e.g., history of the requested) next FoVs based on the calculated motion.

In some embodiments, the requested determined future FoVs requested can be for tiles covering (min(α−60,α−60+∂α/∂t τ)−εw,max(α+60,α+60+∂α/∂t τ)+εw) and (min(β−45, β−45+∂β/∂t τ)−εh,max((β+45,β+45+∂β/∂t τ)+εh).

Here, "min" regarding α values indicates the minimum of or smaller value between (α−60) and (α−60+∂α/∂t τ). Here, "max" regarding α values indicates the maximum of or larger value between (α+60) and (α+60+∂α/∂t τ). Here, 60 is degrees width, +∂α/∂t is the derivative of the movement (e.g., motion) in the width direction from the current to the next FoV requested by the user, τ is the time between two interest message requests for FoVs by the user device and εw additional width added to the next FoVs based on the calculated motion (e.g., added α 1440).

Here, "min" regarding 13 values indicates the minimum of or smaller value between (β−45) and (β−45+∂β/∂t τ). Here, "max" regarding β values indicates the maximum of or larger value between (β+45) and (β+45+∂β/∂t τ). Here, 45 degrees height, +∂β/∂t is the derivative of the movement in the height direction from the current to the next FoV requested by the user, τ is the time between two interest message requests for FoVs by the user device and εh additional height added to the next FoVs based on the calculated motion (e.g., added β 1430).

The person skilled in the art will observe that the estimation of the future position of the center of the FoV may be achieved using other methods, such as some interpolation using a parametrization of the previous k positions. For instance, knowing the position of the center at the k previous time instances, one can estimate p(k+1) using other estimators from estimation theory. In one instance, these interpolations and estimators can be used to calculate a motion between coordinate centers of each of the current FoV of one of the time instants and each of the next FoV of the next time instant.

Figure 15:
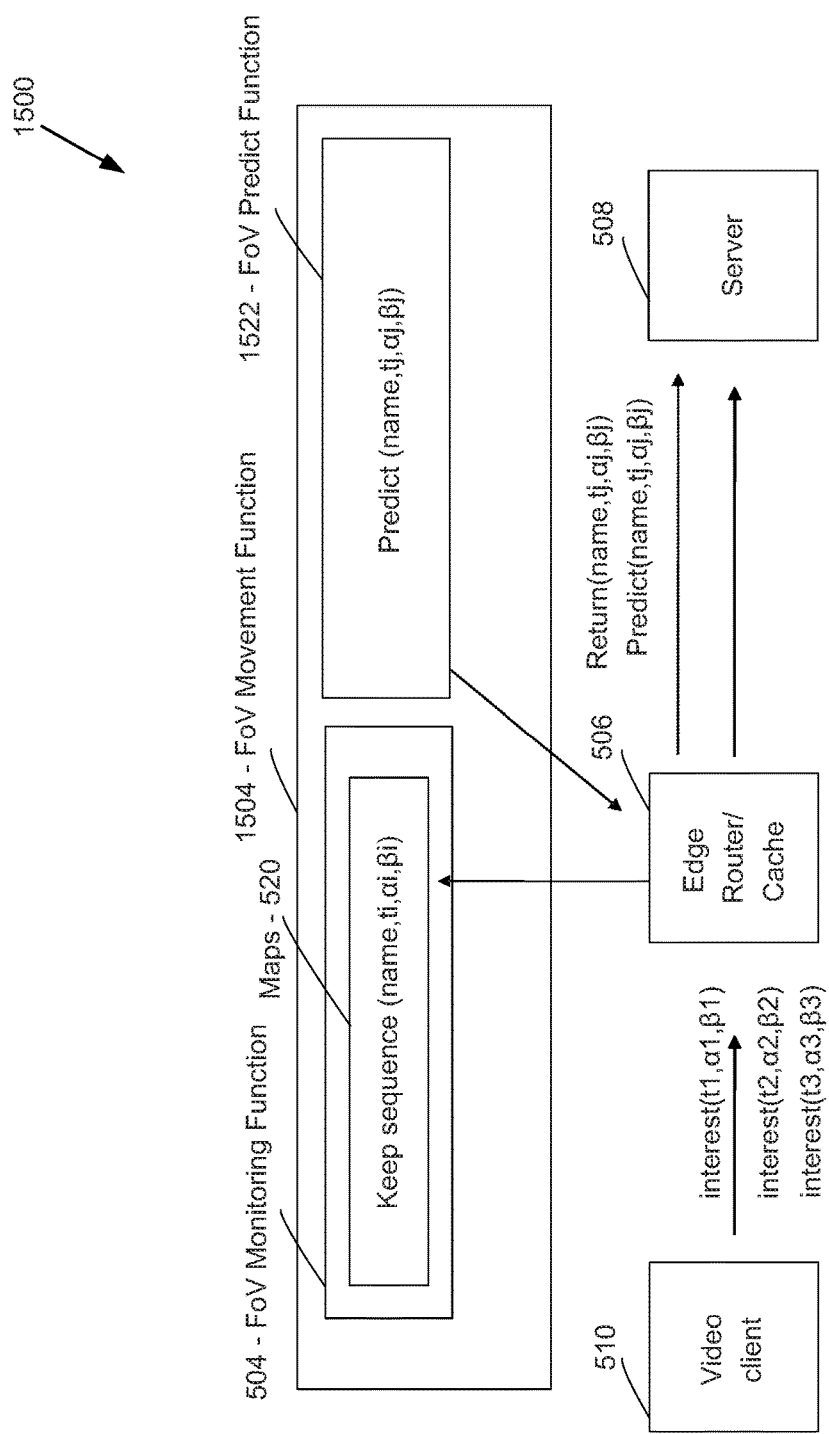
FIG. 15 illustrates an example 360 degree video stream determined future FoV movement of FoV centers function, according to example embodiments.

FIG. 15 illustrates an example 1500 of a 360 degree video stream determined future FoV movement (e.g., amount of motion of FoV centers) function 1504, according to example embodiments. Example 1500 shows function 1504 including FoV monitoring function 504 as described for FIG. 5A, with creating maps 520 (e.g., maps 532 and 552) that track the position of FoV centers as described for FIGS. 5A-C. Function 1504 also includes FoV predict function 1522 for predicting an added width and height for a determined future FoV, such as described for FIG. 14. In some instances, function 1504 includes determining and prefetching the video streams for the future FoVs of future time instants at a client device where the particular user is viewing the 360 degree video stream, wherein the video streams for the future FoVs are prefetched prior to the future time instants for the particular user viewing the 360 degree video stream.

Example 1500 may be described as a motion extraction example that looks up the determined future FoV transition for time t2 based upon the FoV of a subsequent user viewed at time t1 and using motion of (e.g., centers of) FoVs based on second map 552 as described for FIG. 5, 6, or 7.

In some instances, function 1504 is performed at one of nodes 140 (e.g., a network control plane, such as client 510, edge router 506 and/or server 508). In some instances, function 1504 is performed at a 360 degree video stream producer (e.g., producer 425 or store 108), a client computer (e.g., device 110), an edge router of routers 106 (e.g., router 1 430) or a control plane manager (e.g., manager 104).

FIG. 15 shows function 1504 including 3 FoV interest messages being transmitted through the network (e.g. environment 100 or network 102) from client 510, through router 506 and to server 508. These interest messages are shown as "interest(t1,α1,β1)", "interest(t2,α2,β2)" and "interest(t3, α3,β3)". Here, t1, t2, t3 . . . may indicate the (e.g., periodic) time instant at time instants 1, 2, 3, . . . (e.g., in the time ordered sequence) during the time period of the video stream. Here, α1, α2, α3 . . . may be the spherical coordinate α component of the center of the FoV of the video stream for that periodic time instant. Here, β1, β2, β3 . . . may be the spherical coordinate β component of the center of the FoV of the video stream for that periodic time instant.

FIG. 15 shows function 1504 including FoV predict function 1522, such as a function that maps the movement (e.g., amount of motion) of the centers of the collect FoV interest messages from the one particular user viewing the 360 degree video stream at client 508, where each FoV interest message includes a request for a FoV at one time instant of the 360 degree video stream being viewed. Here, each FoV interest message may include a coordinate center of the requested FoV.

In some embodiments, creating FoV transitions of map 552 at maps 520 includes calculating an "amount" (e.g., a direction, and distance or speed) of motion between coordinate centers of each of the current FoV of one of the time instants and each of the next FoV of the next time instant requested by the user.

In other embodiments, based on FoV transitions of map 552, a third map 1520 is created by predict function 1522 that includes a calculated "amount" (e.g., a direction, and distance or speed) of motion between coordinate centers of each of the current FoV of one of the time instants and each of the next FoV of the next time instant requested by the user.

In some instances, the amount of motion is calculated based on the position of the FoV centers of the collected or kept time ordered sequence (name,ti,αi,βi) over the time instants, of the interest messages being transmitted through the network. In some instances, map 552 or a third map created by function 1522 includes the "name" of the video stream, the coordinate center of the next FoV requested for time ordered sequence (name,ti,αi,βi) over the time instants, and an "motion between coordinate centers from the current to the next FoV requested as: (α2–α1, β2–β1), such as shown in FIG. 13, or (∂α/∂t, ∂β/∂t)τ, such as described for FIG. 14.

According to embodiments, function 1522 determines the future FoVs for the user by adding width and/or height to the next FoV requested (e.g., tile 1410) in the next FoV interest message, which is a FoVs requested in the history of requested FoVs by the user). In some cases, the additional width and/or height is proportional to or based on the amount of motion (e.g., from maps 520 or function 1522), such as described for FIGS. 13-14. Here, function 1522 can determine the future FoVs by adding to compensate for motion of centers (α2–α1,β2–β1) such as shown in FIG. 13.

In example 1500, predict function 1522 sends Return (name,tj,αj,βj) and Predict(name,tj,αj,βj) through router 506 an to client 510, such as in response to FoV interest message from client 508 asking for FoV (tj,αj,βj). Router 506 may also send Return(name,tj,αj,βj) and Predict(name, tj,αj,βj) to server 508 as shown by the upper arrow between the router and server. In some instances, Return(name,tj,αj, βj) is the FoV data message for requested FoV (tj,αj,βj), such as having tile 1410 or the FoV centered at (αj,βj) for time tj. In some cases, and Predict(name,tj,αj,βj) is the added width and/or height for FoV data message for requested FoV (tj,αj,βj), such as having added α 1440 and/or added β 1430; or εw additional width and/or εh additional height, such as described for FIGS. 13-14. Here, upon receiving Return(name,tj,αj,βj) and Predict(name,tj, αj,βj), client 510 will have a determined future of future time instants for the user due to the added height and/or width covering or satisfying what the user will actually requests in a future FoV.

In example 1500 "interest(t1,α1,β1)" may be a current FoV interest message, "interest(t2,α2,β2)" may be a next FoV interest message and "interest(t3,α3,β3)" may be a future interest message. In this case, Return(name,tj,αj,βj) may represent be the FoV data message for (name,t2,α2,β2), such as tile 14710, and Predict(name,tj,αj,βj) may be the added width and/or height in a FoV data message based on (α2–α1,β2–β1), such as added α 1440 and/or added β 1430; or εw additional width and/or εh additional height as described for FIGS. 13-14

According to some embodiments, after function 1522 determines the future FoVs for the user, Return(name,tj,αj, βj) and Predict(name,tj,αj,βj) may be provided to client 510 by being prefetched or cached as described for function 704 or 804; included in a manifest as described for function 1104, or included in meta-data as described for function 1204.

Figure 16:
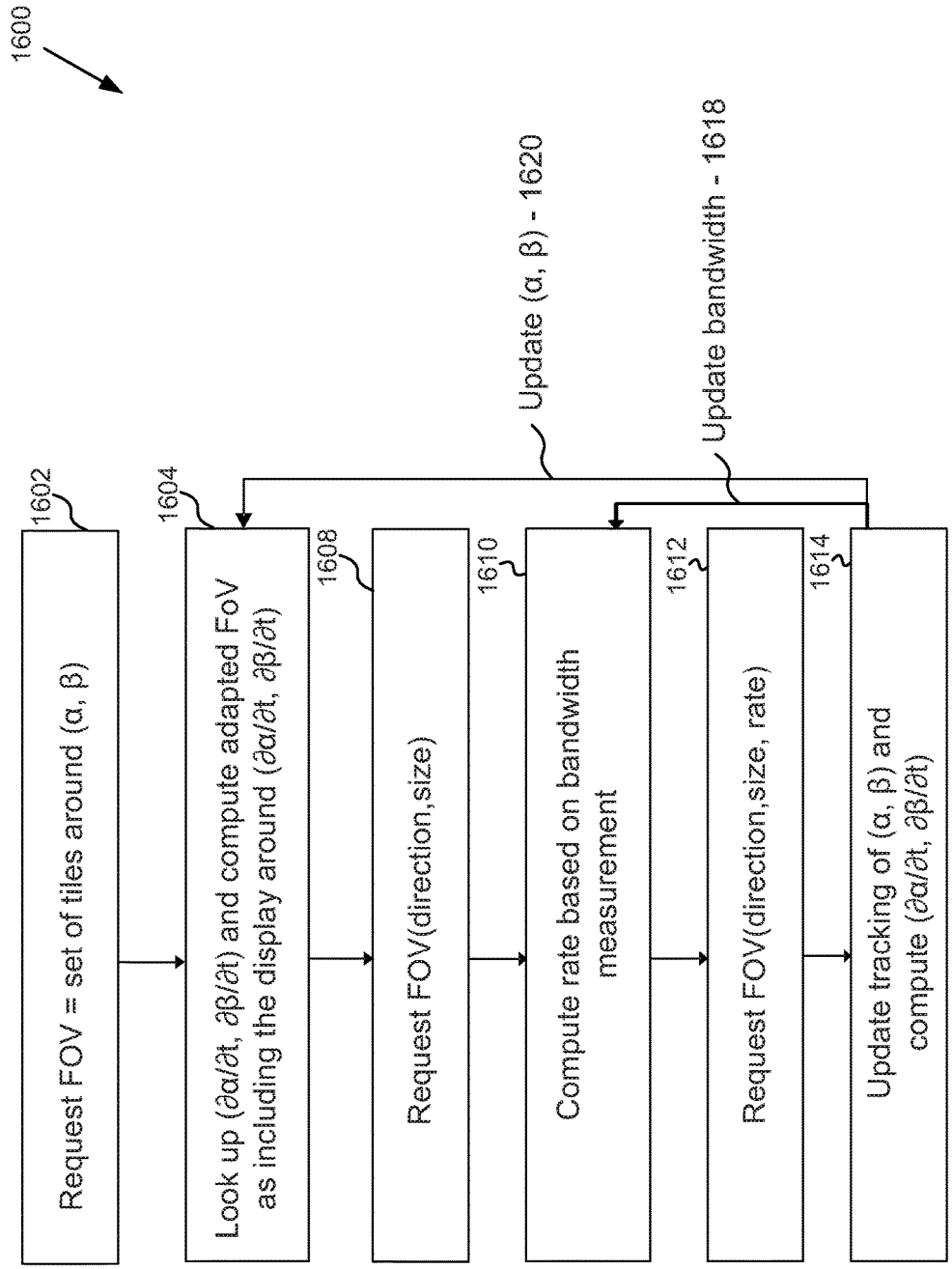
FIG. 16 is a flow diagram of a process for determining a future FoV for a 360 degree video stream using movement of FoV centers, according to example embodiments.

FIG. 16 is a flow diagram of a process 1600 for determining a future FoV for a 360 degree video stream in an ICN using movement (e.g., amount of motion) of FoV centers, according to example embodiments. Process 600 may be a process performed by one of nodes 140 (e.g., a network control plane, such as client 510, edge router 506 and/or server 508). In some instances, process 1600 may be performed by a 360 degree video stream producer (e.g., producer 425 or store 108), a client computer (e.g., device 110), an edge router of routers 106 (e.g., router 1 430) or a control plane manager (e.g., manager 104).

Process 1600 begins at step 1602 where one (e.g., a "next") of a sequence of FoV interest messages from one user viewing the 360 degree video stream is collected. The interest message has a FoV center (α,β) requested in the messages, and the set of tiles of the FoV views is identified that are around the requested FoV center (α,β). In one example, the FoV center requested may be front tile 310 and the set of tiles may be tiles 320, 340, 330, 350 and 360 of FIG. 3. In some cases, step 1602 may include descriptions for (FoV) collecting function 504 of FIG. 5A or at step 602 of FIG. 6A. Step 1602 may include determining Return (name,tj,αj,βj) for the requested next FoV (e.g., which will be used to create the determined future FoV). In some instances, step 1602 includes creating maps 520 of FIG. 5A or a third map by function 1522 at step 1604.

At step 1604 an amount of motion between the center coordinates of the current and next FoV requested by the user is determined by looking up (∂α/∂t, ∂β/∂t) for that movement. In some instances, step 1604 includes looking up (∂α/∂t, ∂β/∂t) in map 552 of FIG. 5A or a third map created by function 1522 at step 1602. In addition or independently, in some cases, the amount of motion can be estimated from previous points using interpolations and/or estimators. For instance, as previously discussed, such as knowing the position of the center at the k previous time instances, one can estimate p(k+1) using estimation theory. Based on the lookup and/or estimation, an adapted (e.g., determined future) FoV can be computed for the requested next FoV, as including the display around (∂α/∂t, ∂β/∂t). The display around (∂α/∂t, ∂β/∂t) may be the added width and/or height as described for FIGS. 14-15. Step 1604 may include determining Predict(name,tj,αj,βj) for the requested next FoV (e.g., which will be used to create the determined future FoV). It can be appreciated the greater the amount of movement of the FoV centers in such motion based prefetching as described for FIGS. 13-16, the larger the window of the determined future FoV (e.g., example 1400).

At step 1608, now that the size of the display around (∂α/∂t, ∂β/∂t), or added width and/or height is known, the determined future FoV can be requested (e.g., determined or created by function 1522) with direction and size. In some instances, step 1608 includes using (∂α/∂t, ∂β/∂t) and map 552 of FIG. 5A or a third map created by function 1522 at step 1602, to determine the future FoV based on the direction of center movement, and the data size (e.g., number of pixels) of the added width and/or height. In some cases, at step 1608, based on the direction and size, the determined future FoV can be computed as the requested next FoV (e.g., Return(name,tj,αj,βj)) and (based on the direction) the added width and/or height (e.g., Predict(name,tj,αj,βj). In some cases, at step 1608, based on the determined future FoV, a size of the determined future FoV can be computed.

At step 1610, now that the determined future FoV is created with a known data size, a network bandwidth rate (e.g., see at step 1618), or time required to transmit this determined future FoV, can be computed based on the known data size and network bandwidth. In some cases, where function 1504 or 1522 exist at the edge router or server, the rate can be measured by using PIT 120 of node 106 or 140 (e.g., see FIGS. 1A-B) to compute RTT. Then, the size of network traffic and RTT can be used to estimate the network bandwidth. Estimating the bandwidth here may be done similarly to how it is done for dynamic adaptive streaming over hypertext transfer (or transport) protocol video (e.g., DASH).

Step 1610 may include altering (e.g., reducing) the known data size of the determined future FoV so that it meets a threshold such as based on a required network bandwidth rate, or time required to transmit. The threshold may be based on an adaptive video stream such as by balancing the amount of resolution (pixels) wanted in the video stream and the time required for the altered determined future FoV through the network and to the client, so that the user is provided with a smooth and sufficiently pixelized video experience. It can be appreciated that the greater the network bandwidth is, the greater the amount of resolution can be and/or the shorter the time required for the FoV to reach the client. It can also be appreciated that the greater the motion or the movement of the FoV centers in the video being watched, the greater the added width and/or height, the more the size of the determined future FoV, and thus the lower the amount of resolution can be and/or the longer the time required for the FoV to reach the client. In some cases, at step 1610, based on altering the known data size an updated network bandwidth rate, or time required to transmit the altered determined future FoV can be calculated.

At step 1612, now that the updated network bandwidth rate is known, the altered determined future FoV can be requested (e.g., determined or created by function 1522) with direction, altered size and the updated rate. In some instances, step 1612 includes determining a future FoV as described for FIGS. 5-14 based on or as the altered determined future FoV at step 1612. According to some embodiments, at step 1612 the altered determined future FoVs for the user may be provided to client 510 by being prefetched or cached as described for function 704 or 804; included in a manifest as described for function 1104, or included in meta-data as described for function 1204.

At step 1614, the new one (e.g., another "next") of a sequence of FoV interest messages from one user viewing the 360 degree video stream is collected. Similar to at step 1602, this new interest message has a FoV center (α,β) of the front tile requested in the messages, and the set of tiles of the FoV views (e.g., see FIG. 3) is identified that are around the requested new FoV center (α,β). Step 1614 may include updating tracking of (α, β) and computing (∂α/∂t, ∂β/∂t) based on the new one of the sequence of FoV interest messages collected. In addition or independently, in some cases, updating tracking of (α, β) can be based on previous points using interpolations and/or estimators, such as noted for step 1604. For example, updating tracking of (α, β) can be based on inputting into a motion estimator the position of the center at the k previous time instances and if the estimator estimates the future positions of the centers as $p(k+1)=f(p1, p2, \ldots pk)$ then the next estimated center for $p(k+2)$ is now $f(p2, p3, \ldots p(k+1))$.

Updating tracking and computing may include descriptions for (FoV) collecting function 504 of FIG. 5A or at step 602 of FIG. 6A. Step 1614 may include determining new Return(name,tj,αj,βj) for the requested new next FoV (e.g., which will be used to create a new determined future FoV). In some instances, step 1614 includes updating maps 520 of FIG. 5A or a third map by function 1522 at step 1604

Based on step 1614, at step 1618 the bandwidth of the network is updated. This may include a calculation based on RTT. RTT may be an ICN round trip time (RTT) between when a FoV interest message is sent by a user (e.g., the message collected at step 1602 or step 1614, and when the user receives a response data message to the FoV interest message sent (e.g., the message sent at step 1612).

Based on step 1614, at step 1620 the requested new FoV provides a new, estimated or updated center (α,β) that is sent to 1604. After step 1620, step 1604-1620 of process 1600 may repeat.

Figure 17:
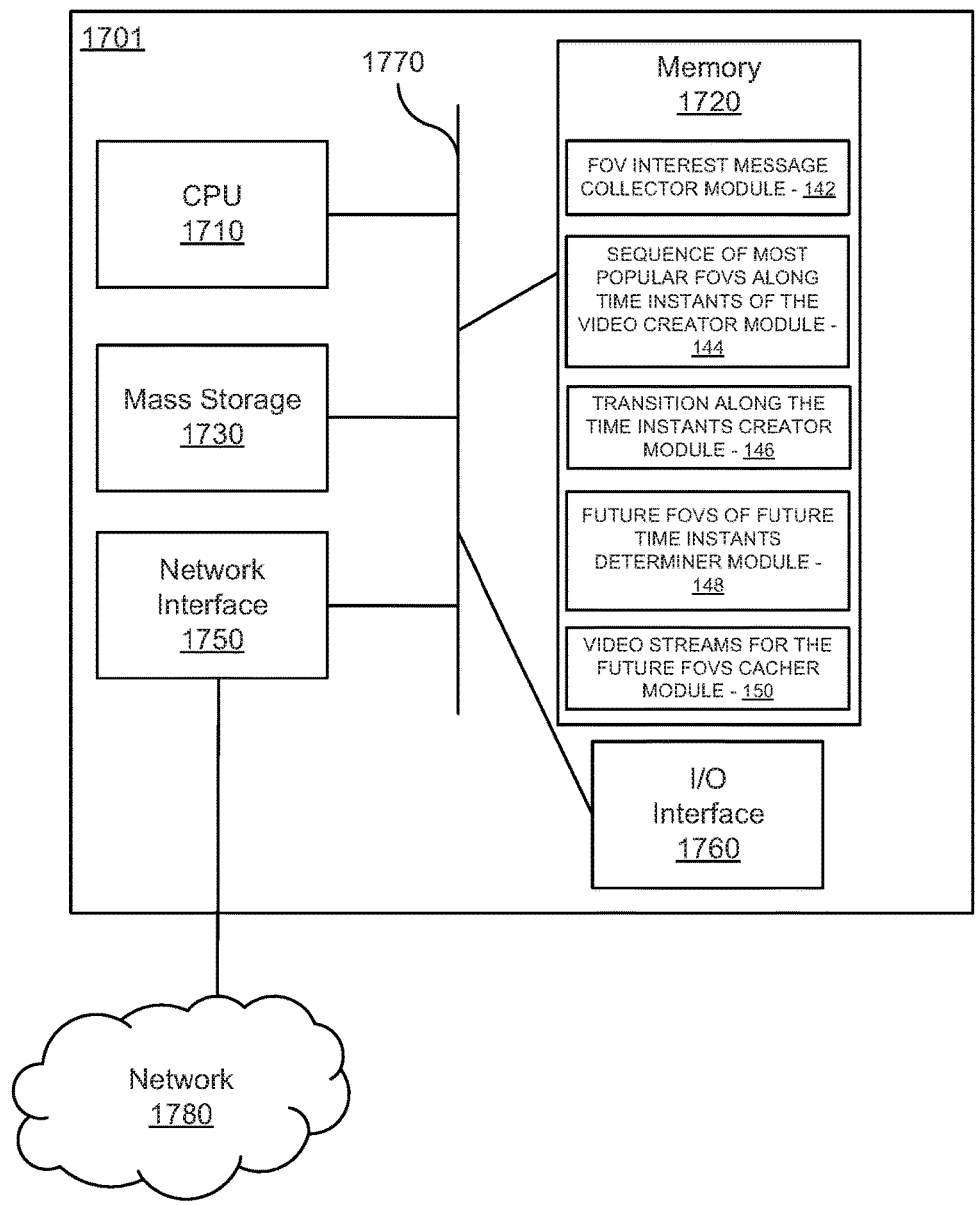
FIG. 17 is a block diagram of a network system that can be used to implement various embodiments.

FIG. 17 is a block diagram of a device that can be used to implement various embodiments. Specific devices may utilize all of the components shown, or a subset of the components, and levels of integration may vary from device to device. Furthermore, the device 1700 may contain multiple instances of a component, such as multiple processing units, processors, memories, transmitters, receivers, etc. The device 1700 may comprise a processing unit 1701 equipped with one or more input/output devices, such as network interfaces, storage interfaces, and the like. The processing unit 1701 may include a central processing unit (CPU) 1710, a memory 1720, a mass storage device 1730, and an I/O interface 1760 connected to a bus 1770. The bus 1770 may be one or more of any type of several bus architectures including a memory bus or memory controller, a peripheral bus or the like.

The CPU 1710 may comprise any type of electronic data processor. The memory 1720 may comprise any type of system memory such as static random access memory (SRAM), dynamic random access memory (DRAM), synchronous DRAM (SDRAM), read-only memory (ROM), a combination thereof, or the like. In an embodiment, the memory 1720 may include ROM for use at boot-up, and DRAM for program and data storage for use while executing programs. In embodiments, the memory 1720 is non-transitory.

In some embodiments, the memory 1720 includes a FoV interest message collector module 142 (optional) for collecting FoV interest messages from one or more users viewing the 360 degree video stream, such as performed according to descriptions of FIGS. 1B-16. In some embodiments, the memory 1720 includes a sequence of most popular FoVs along time instants of the video creator module 144 for creating a sequence of popular FoVs along time instants of the 360 degree video stream according to the FoV interest messages, such as performed according to descriptions of FIGS. 1B-16. In some embodiments, the memory 1720 includes a FoV transitions along the time instants creator module 146, for creating FoV transitions along the time instants according to the FoV interest messages, such as performed according to descriptions of FIGS. 1B-16. In some cases it includes module 144 and 146. In some cases it includes module 144 or 146. In some embodiments, the memory 1720 includes a determining future fovs of future time instants determiner module 148 for determining future FoVs of future time instants for a particular user viewing the 360 degree video stream with a history of requested FoVs of past time instants, such as performed according to descriptions of FIGS. 1B-16. In some embodiments, the memory 1720 includes a video streams for the future FoVs cacher module 150 (optional) for caching video streams for the future FoVs of the future time instants, wherein the video streams for the future FoVs are cached prior to receiving requests for the future FoVs, such as performed according to descriptions of FIGS. 1B-16.

The mass storage device 1730 may comprise any type of storage device configured to store data, programs, and other information and to make the data, programs, and other information accessible via the bus 1770. The mass storage device 1730 may comprise, for example, one or more of a solid state drive, hard disk drive, a magnetic disk drive, an optical disk drive, or the like.

The processing unit 1701 also includes one or more network interfaces 1750, which may comprise wired links, such as an Ethernet cable or the like, and/or wireless links to access nodes or one or more networks 1780. The network interface 1750 allows the processing unit 1701 to communicate with remote units via the networks 1780. For example, the network interface 1750 may provide wireless communication via one or more transmitters/transmit antennas and one or more receivers/receive antennas. In an embodiment, the processing unit 1701 is coupled to a local-area network or a wide-area network for data processing and communications with remote devices, such as other processing units, the Internet, remote storage facilities, or the like.

Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment. Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

Some embodiments herein may be implemented in computer-readable non-transitory media that includes all types of computer readable media, including magnetic storage media, optical storage media, and solid state storage media and specifically excludes signals. It should be understood that the software can be installed in and sold with the collector module 142 (optional), creator module 144 and/or 146, determiner module 148, and cacher module 150 (optional). Alternatively the software can be obtained and loaded into the collector module 142 (optional), creator module 144 and/or 146, determiner module 148, and cacher module 150 (optional), including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer implemented method for providing a 360 degree video stream in a network, the 360 degree video stream comprising multiple video streams corresponding to multiple FoVs, the method comprising:
    collecting FoV interest messages from one or more users viewing the 360 degree video stream, each FoV interest message including a request for a FoV at one time instant of the 360 degree video stream;
    creating a sequence of popular FoVs along time instants of the 360 degree video stream according to the FoV interest messages, each popular FoV representing a frequently requested FoV at a distinctive one of the time instants;
    creating FoV transitions along the time instants according to the FoV interest messages, each FoV transition including a current FoV of one of the time instants and a next FoV of a next time instant next to the one time instant, the next FoV indicating a likely next FoV to be requested subsequent to the current FoV;
    determining future FoVs of future time instants for a particular user viewing the 360 degree video stream with a history of requested FoVs of past time instants, the future FoVs determined based on the history of requested FoVs, the sequence of popular FoVs and the FoV transitions; and
    caching video streams for the future FoVs of the future time instants, wherein the video streams for the future FoVs are cached prior to receiving requests for the future FoVs of the future time instants for the particular user viewing the 360 degree video stream.

2. The computer implemented method of claim 1, further comprising:
    prefetching the video streams for the future FoVs of future time instants at a client device where the particular user is viewing the 360 degree video stream, wherein the video streams for the future FoVs are prefetched prior to the future time instants for the particular user viewing the 360 degree video stream.

3. The computer implemented method of claim 1, further comprising, prior to caching:
    storing the sequence of popular FoVs along time instants and the FoV transitions along the time instants in a memory; and
    querying the sequence of popular FoVs along time instants and the FoV transitions along the time instants stored in the memory to identify the determined future FoVs of future time instants for a particular user.

4. The computer implemented method of claim 1, wherein:
the collecting, the creating the sequence of popular FoVs along time instants, the creating the FoV transitions along the time instants, and the caching are performed at one of an edge router of the network through which the 360 degree video stream is being transmitted or a server of the network that is providing the 360 degree video stream to the network; and
the method further comprising:
receiving the history of requested FoVs; and
in response to the receiving the history of requested FoVs, transmitting reply data messaged that include the cached video streams for the future FoVs of the future time instants.

5. The computer implemented method of claim 1, wherein:
the creating the sequence of popular FoVs along time instants includes determining a probability for each of the popular FoVs along time instants according to the FoV interest messages; and
the creating FoV transitions along the time instants includes determining probabilities of each of the FoV transitions along the time instants according to the FoV interest messages.

6. The computer implemented method of claim 5, wherein the caching comprises performing the caching at one of:
a client device where the particular user is viewing the 360 degree video stream; or
at an edge router of the network through which the 360 degree video stream is transmitted.

7. The computer implemented method of claim 6, wherein the caching comprises delivering a manifest to the client device at a start of transmission or periodically during transmission of the 360 degree video stream to the client, the manifest including:
a name for and a probability for each of the popular FoVs along time instants; and
a name for and a probability for each of the FoV transitions along the time instants.

8. The computer implemented method of claim 7, wherein the manifest includes one of:
(1) a coordinate center and resolution of each of the popular FoVs along time instants and each of the FoV transitions along the time instants; or
(2) data rate variations for the video streams for the determined future FoVs of the future time instants.

9. The computer implemented method of claim 6, further comprising:
receiving the history of requested FoVs;
in response to the receiving the history of requested FoVs, transmitting reply data messages that include the cached video streams for the future FoVs of the future time instants; and
wherein the caching comprises delivering meta-data to the client with the video streams for the future FoVs of the future time instants, the meta-data including:
a name for and a probability for each of the FoV transitions along the time instants.

10. The computer implemented method of claim 9, wherein the meta-data includes one of:
(1) a coordinate center and resolution of each of the FoV transitions along the time instants; or
(2) data rate variations for the video streams for the determined future FoVs of the future time instants.

11. The computer implemented method of claim 1, wherein:
each FoV interest message includes a coordinate center of the requested FoV;
the creating FoV transitions includes calculating a motion between coordinate centers of each of the current FoV of one of the time instants and each of the next FoV of the next time instant; and
the determining includes determining the future FoVs by adding one of:
additional width to the FoVs of the history of requested FoVs based on the calculated motion, or
additional height to the FoVs of the history of requested FoVs based on the calculated motion.

12. The computer implemented method of claim 1, wherein:
the 360 degree video stream is a live streaming 360 degree video stream transmitted over the information-centric network; and
each time instant occurs at one of a periodic period T of time over time or a network round trip time (RTT) between when a FoV interest message is sent by the subsequent user and when the subsequent user receives a response data message to the FoV interest message sent by the subsequent user.

13. The computer implemented method of claim 1, wherein:
the 360 degree video stream is of a live event being attended by the one or more users and the particular user.

14. A 360 degree video stream in an information-centric network (ICN) provider device, the 360 degree video stream comprising multiple video streams corresponding to multiple FoVs, the device comprising:
a memory storage comprising instructions; and
one or more processors in communication with the memory, wherein the one or more processors execute the instructions to:
collect FoV interest messages from one or more users viewing the 360 degree video stream, each FoV interest message including a request for a FoV at one time instant of the 360 degree video stream;
create a sequence of popular FoVs along time instants of the 360 degree video stream according to the FoV interest messages, each popular FoV representing a frequently requested FoV at a distinctive one of the time instants;
create FoV transitions along the time instants according to the FoV interest messages, each FoV transition including a current FoV of one of the time instants and a next FoV of a next time instant next to the one time instant, the next FoV indicating a likely next FoV to be requested subsequent to the current FoV;
determine future FoVs of future time instants for a particular user viewing the 360 degree video stream with a history of requested FoVs of past time instants, the future FoVs determined based on the history of requested FoVs, the sequence of popular FoVs and the FoV transitions; and
cache video streams for the future FoVs of the future time instants, wherein the video streams for the future FoVs are cached prior to receiving requests for the future FoVs of the future time instants for the particular user viewing the 360 degree video stream.

15. The provider device of claim 14, and further comprising the one or more processors executing the instructions to, prior to caching:
- store the sequence of popular FoVs along time instants and the FoV transitions along the time instants in a memory; and
- query the sequence of popular FoVs along time instants and the FoV transitions along the time instants stored in the memory to identify the determined future FoVs of future time instants for a particular user.

16. The provider device of claim 14, wherein:
the collecting, the creating the sequence of popular FoVs along time instants, the creating the FoV transitions along the time instants, and the caching are performed at one of an edge router of the ICN through which the 360 degree video stream is being transmitted or a server of the ICN that is providing the 360 degree video stream to the ICN; and
the method further comprising:
- receiving the history of requested FoVs; and
- in response to the receiving the history of requested FoVs, transmitting reply data messaged that include the cached video streams for the future FoVs of the future time instants.

17. The provider device of claim 14, wherein:
- the creating the sequence of popular FoVs along time instants includes determining a probability for each of the popular FoVs along time instants according to the FoV interest messages; and
- the creating FoV transitions along the time instants includes determining probabilities of each of the FoV transitions along the time instants according to the FoV interest messages.

18. A non-transitory computer-readable medium storing computer instructions for providing a 360 degree video stream in an information-centric network (ICN), the 360 degree video stream comprising multiple video streams corresponding to multiple FoVs, that when the instructions are executed by one or more processors, cause the one or more processors to perform the steps of:
- collecting FoV interest messages from one or more users viewing the 360 degree video stream, each FoV interest message including a request for a FoV at one time instant of the 360 degree video stream;
- creating a sequence of popular FoVs along time instants of the 360 degree video stream according to the FoV interest messages, each popular FoV representing a frequently requested FoV at a distinctive one of the time instants;
- creating FoV transitions along the time instants according to the FoV interest messages, each FoV transition including a current FoV of one of the time instants and a next FoV of a next time instant next to the one time instant, the next FoV indicating a likely next FoV to be requested subsequent to the current FoV;
- determining future FoVs of future time instants for a particular user viewing the 360 degree video stream with a history of requested FoVs of past time instants, the future FoVs determined based on the history of requested FoVs, the sequence of popular FoVs and the FoV transitions; and
- caching video streams for the future FoVs of the future time instants, wherein the video streams for the future FoVs are cached prior to receiving requests for the future FoVs of the future time instants for the particular user viewing the 360 degree video stream.

19. The non-transitory computer-readable medium of claim 18, and prior to caching, further comprising computer instructions, that when executed by one or more processors, cause the one or more processors to perform the steps of:
- storing the sequence of popular FoVs along time instants and the FoV transitions along the time instants in a memory; and
- querying the sequence of popular FoVs along time instants and the FoV transitions along the time instants stored in the memory to identify the determined future FoVs of future time instants for a particular user.

20. The non-transitory computer-readable medium of claim 18, wherein:
the collecting, the creating the sequence of popular FoVs along time instants, the creating the FoV transitions along the time instants, and the caching are performed at one of an edge router of the ICN through which the 360 degree video stream is being transmitted or a server of the ICN that is providing the 360 degree video stream to the ICN; and
the method further comprising:
- receiving the history of requested FoVs; and
- in response to the receiving the history of requested FoVs, transmitting reply data messaged that include the cached video streams for the future FoVs of the future time instants.

21. The non-transitory computer-readable medium of claim 18, wherein:
- the creating the sequence of popular FoVs along time instants includes determining a probability for each of the popular FoVs along time instants according to the FoV interest messages; and
- the creating FoV transitions along the time instants includes determining probabilities of each of the FoV transitions along the time instants according to the FoV interest messages.

* * * * *